Setting Gallons Counter to zero.

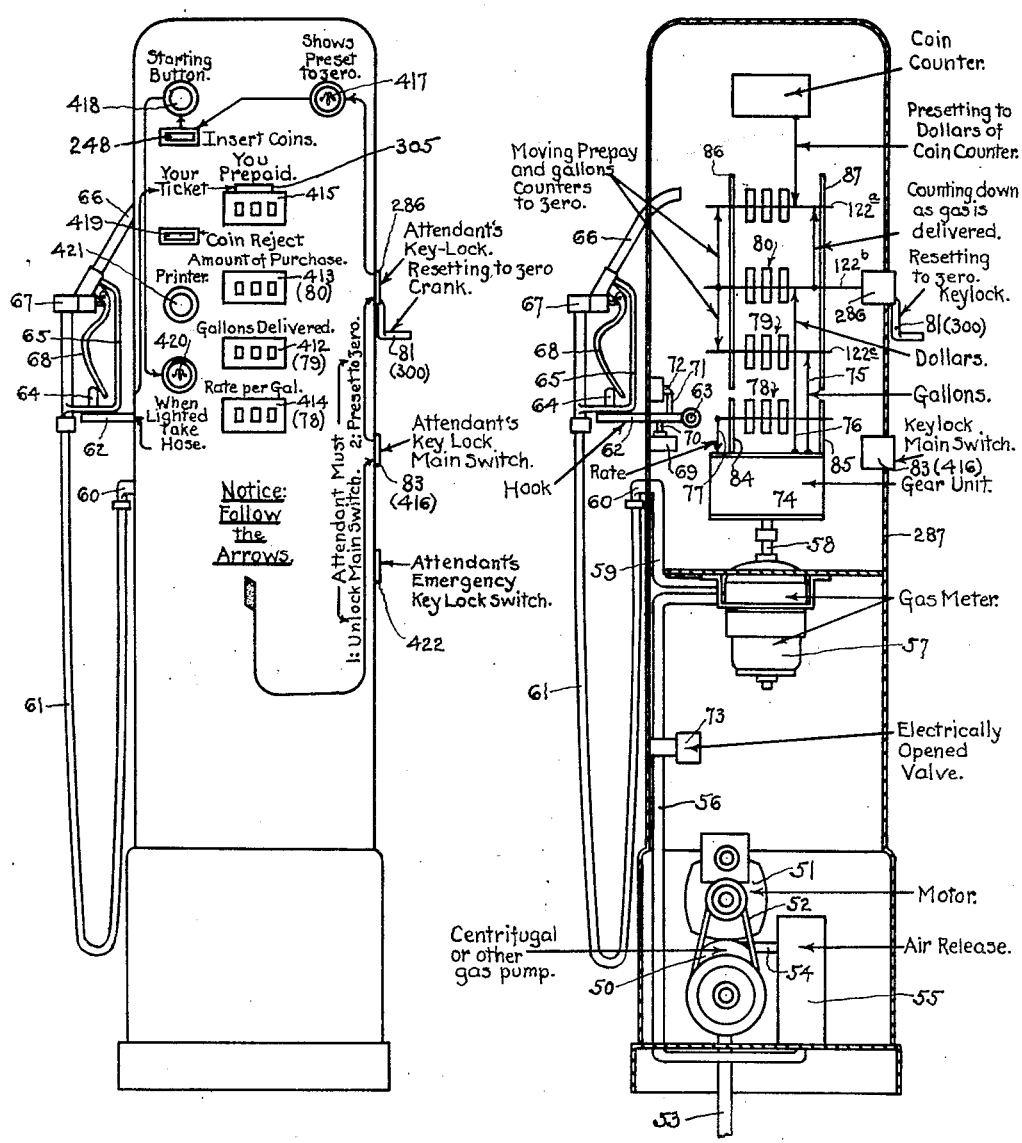

Driven by "Dollars" shaft of Gear Unit.

Inventor:

Inventor:
Thos. A. Banning Jr.

Jan. 15, 1957  T. A. BANNING, JR  2,777,555
COIN CONTROLLED LIQUID DISPENSING APPARATUS AND THE LIKE
Filed Oct. 13, 1950  17 Sheets-Sheet 7

Inventor:
Thos. A. Banning Jr.

Jan. 15, 1957  T. A. BANNING, JR  2,777,555
COIN CONTROLLED LIQUID DISPENSING APPARATUS AND THE LIKE
Filed Oct. 13, 1950  17 Sheets-Sheet 9

Inventor:
Thos. A. Banning Jr.

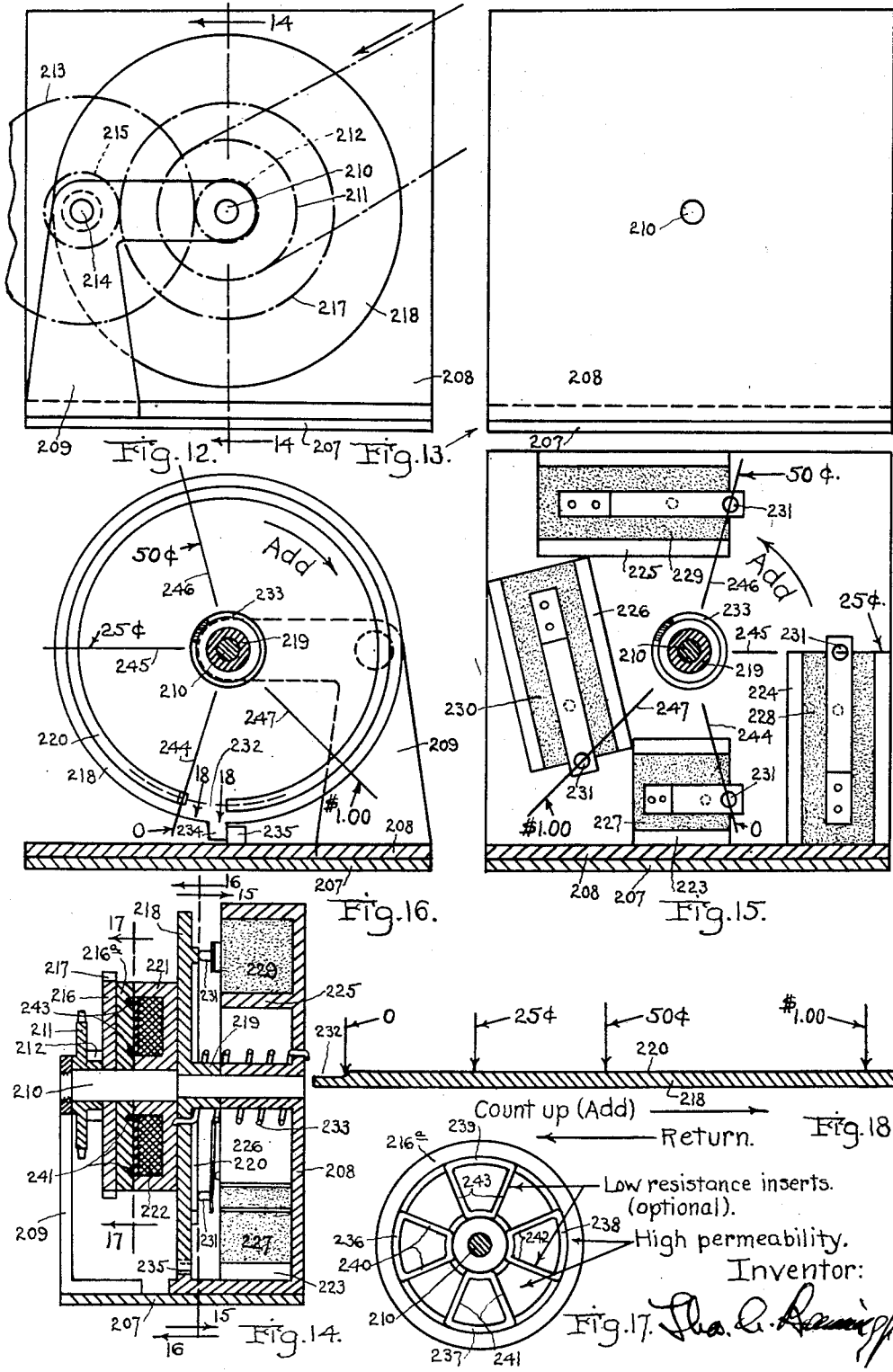

Jan. 15, 1957   T. A. BANNING, JR   2,777,555
COIN CONTROLLED LIQUID DISPENSING APPARATUS AND THE LIKE
Filed Oct. 13, 1950   17 Sheets-Sheet 12
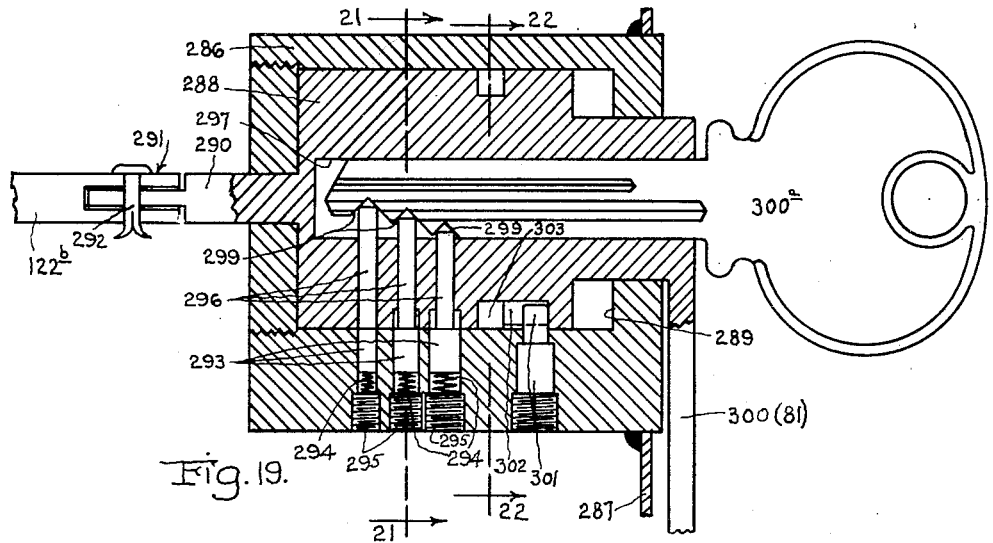
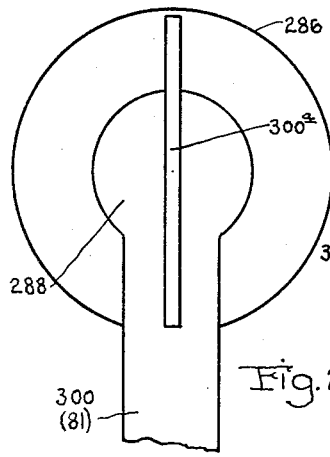
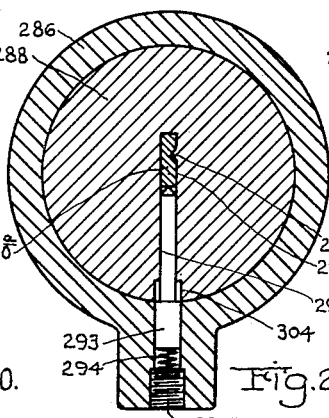
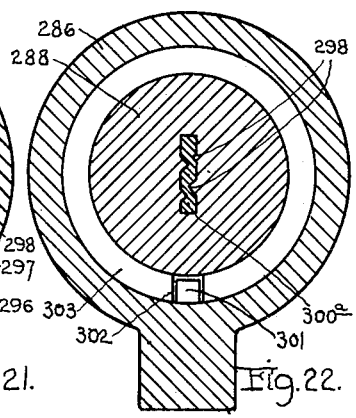
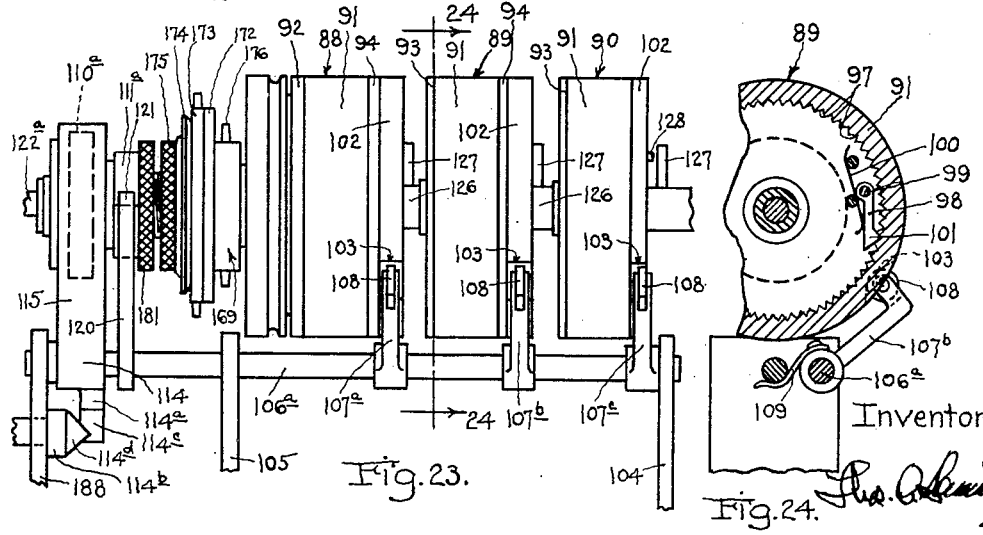
Inventor:

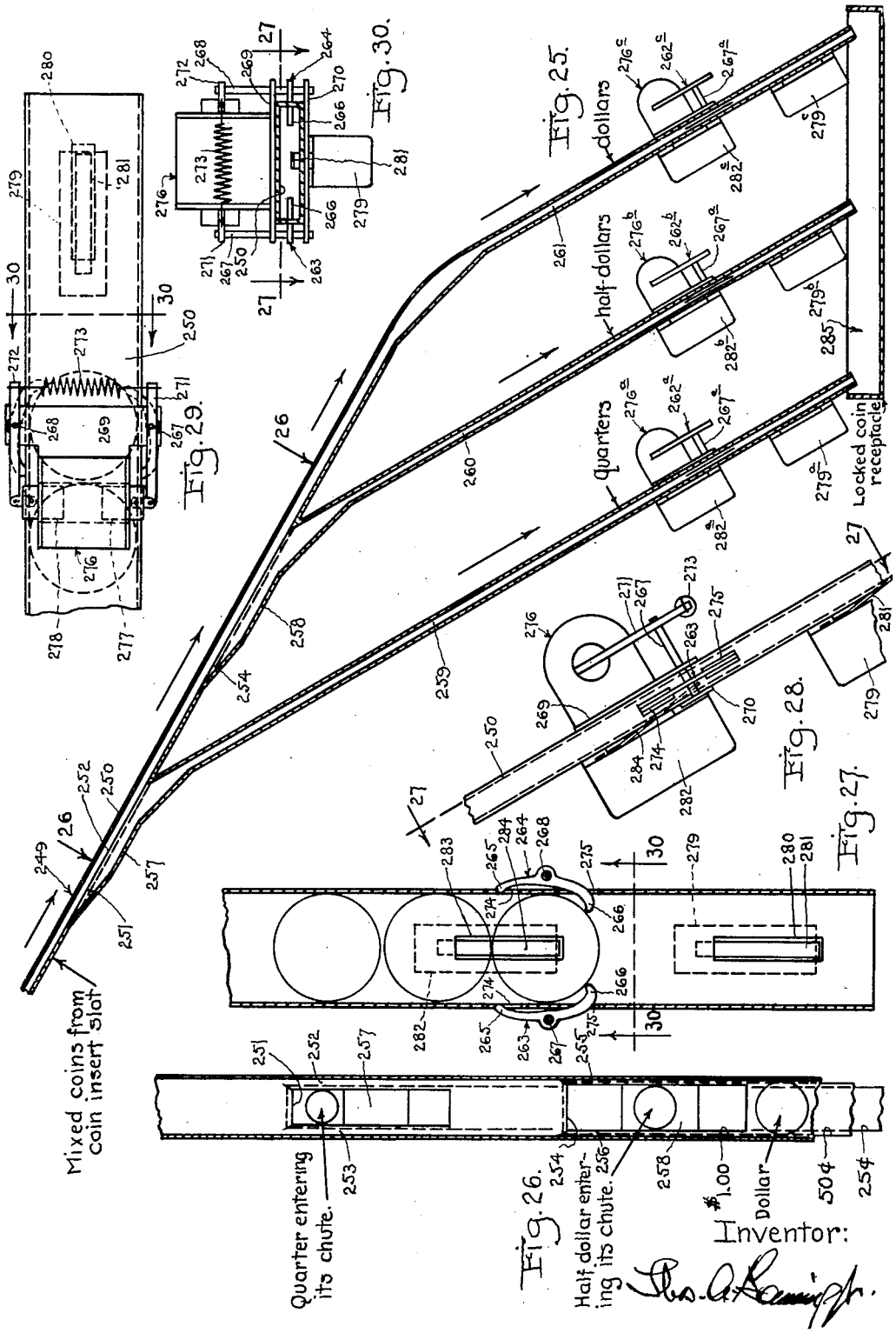

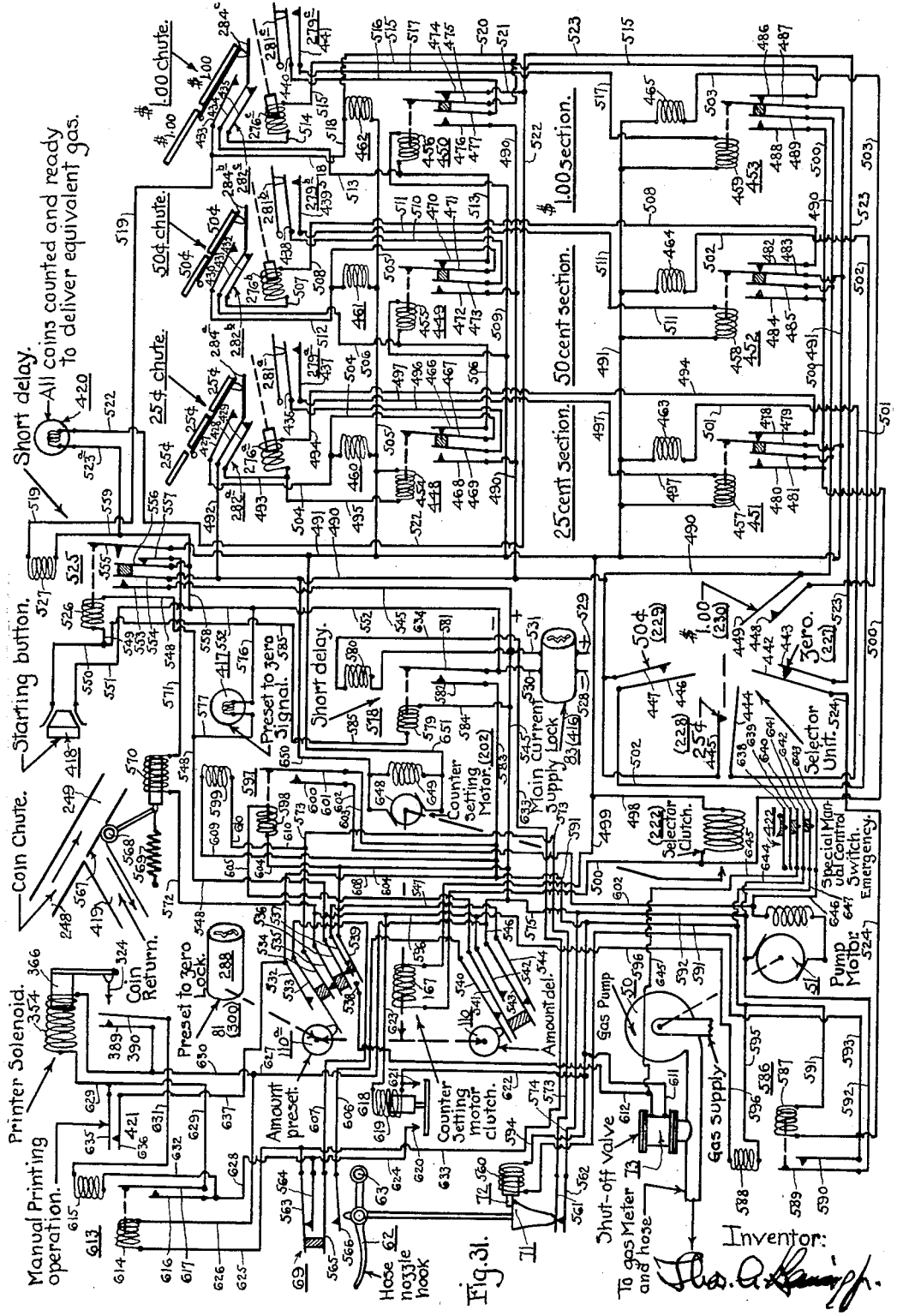

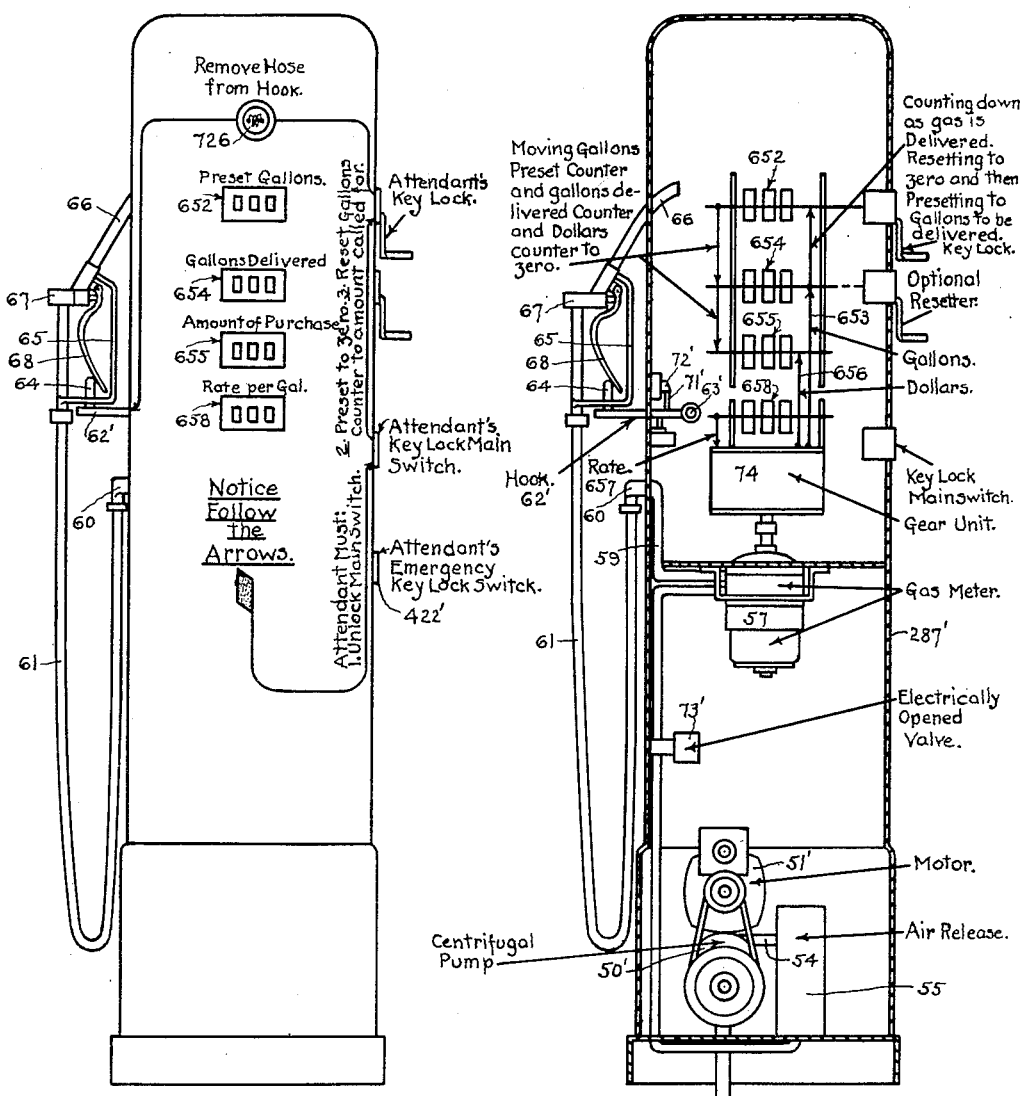

Jan. 15, 1957 T. A. BANNING, JR 2,777,555
COIN CONTROLLED LIQUID DISPENSING APPARATUS AND THE LIKE
Filed Oct. 13, 1950 17 Sheets-Sheet 16

Inventor:

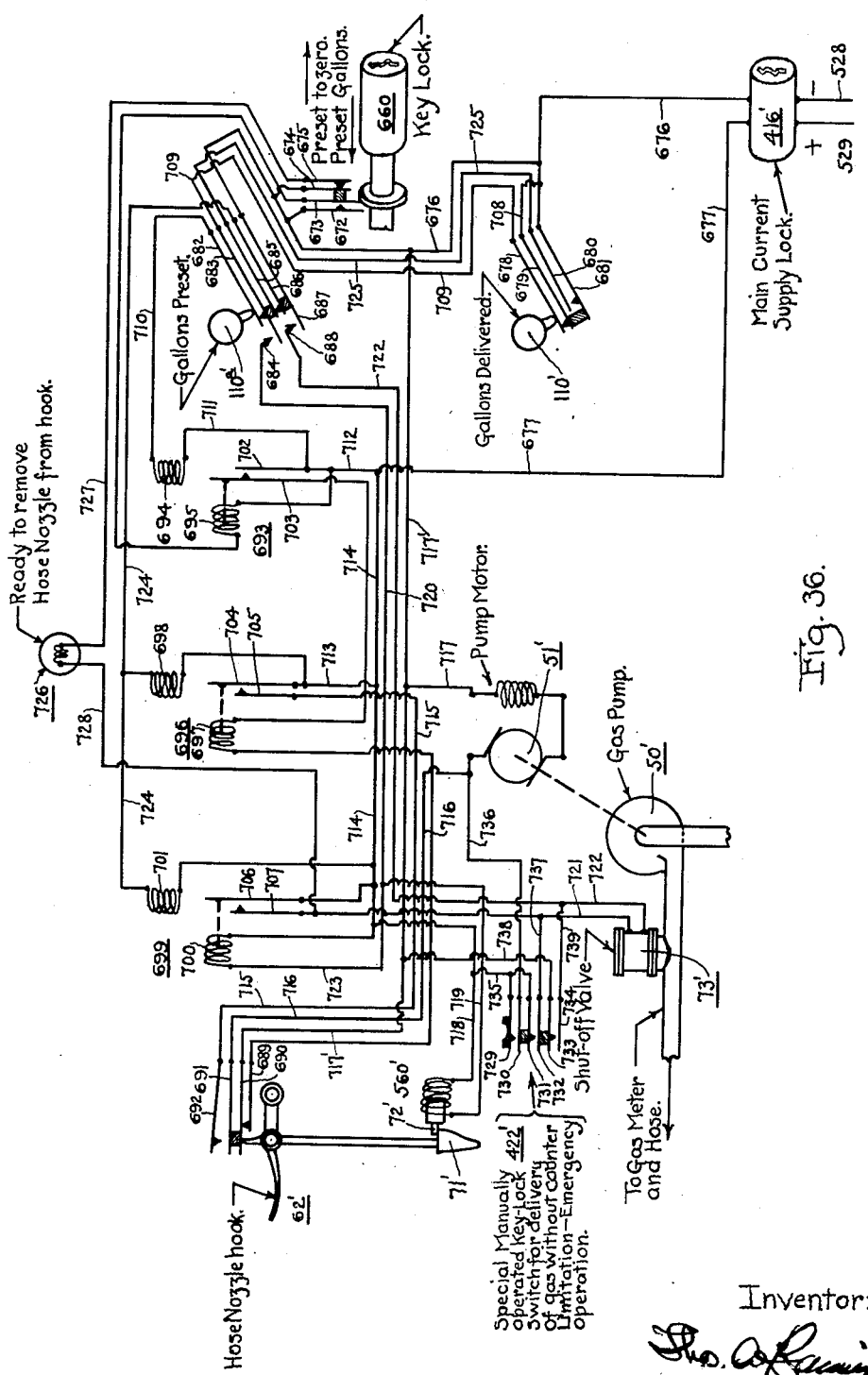

United States Patent Office 2,777,555
Patented Jan. 15, 1957

2,777,555

COIN CONTROLLED LIQUID DISPENSING APPARATUS AND THE LIKE

Thomas A. Banning, Jr., Chicago, Ill.

Application October 13, 1950, Serial No. 189,928

70 Claims. (Cl. 194—13)

This invention has to do with improvements in liquid dispensing apparatus, and the like. Specifically, the improvements herein disclosed have been devised to provide improvements in gasoline dispensing stands and like apparatus, but it will appear from the following disclosures that they are not limited to such specific applications as gasoline dispensing stands, but many of said features are also useful and applicable for other liquid dispensing uses and applications than such specific use. I do not intend to limit myself to the application of said features to gasoline dispensing stands and the like, except as I may so limit myself in the claims to follow. Nevertheless, the embodiments hereinafter disclosed have been devised specially to meet the requirements and conditions imposed in the dispensing of gasoline, kerosene, and other motor fuels; and said embodiments incorporate various elements and features specially intended to meet the requirements imposed in the dispensing of such fuels. Various of said requirements are imposed by legal and other regulations, and also to meet safety conditions, and other special conditions, all as will hereinafter appear in detail.

Since said features have been devised specially to meet the conditions imposed in connection with the dispensing of gasoline and other liquid fuels, I shall first mention briefly certain conditions and requirements in connection with the dispensing of such liquids, and shall thereafter state some of the principal objects which the present improvements are designed to fulfill.

At the present time it is the more or less universal custom to dispense gasoline and other motor fuels for general public consumption, and for use in motor vehicles, trucks, etc., by the use of stands which are conveniently placed and attended for such purposes. These stands are provided with pumps (generally of the centrifugal type) and driving motors therefore, with gear ratio changers, with liquid meters through which the liquid passes during dispensing operations, the gear ratio changers being primarily driven by such meters, with delivery hoses and manually operated (sometimes semi-automatically operated) delivery nozzles through which the liquid is delivered, and with hooks or like supports whereby the nozzles may be supported when not in use. Furthermore such stands are provided with various counters, generally visible to the operator and purchaser of the fuel, and generally serving to indicate the number of gallons of fuel delivered, the cost of the same to the purchaser, and the rate of such fuel per gallon. Customarily, also such stands are provided with suitable totalizing counters for total gallons, and for total purchase price or amount. The gear ratio changers are so designed and built that the "Amount of Purchase" will be correctly indicated on the proper counter according to whatever rate per gallon may be specified, and for which the gear ratio changer has been adjusted and set. To this end such stands are customarily built with driving connections from the meters to such gear ratio changers, and with outgoing driving connections from the gear ratio changers to the "Amount of Purchase" counters. Driving connections between the liquid meters and the "Gallons" counters may be effected either directly, or through the gear ratio changers; but in either case such "Gallons" counters correctly indicate the gallons as metered by the meters, and irrespective of changes made in the rate per gallon, which changes are effected in the gear ratio changer itself.

The counters of such dispensing stands are generally if not universally of some re-setting type so that the "Gallons" counter and the "Amount of Purchase" counter may be re-set to zero, either individually or otherwise prior to commencing each dispensing operation. Usually, also interlocks are provided between such counters or the re-setting means, and other elements, so that said counters must be re-set to zero prior to commencing a new dispensing operation. Such re-setting operations should be effected without need of reversing the metering element, and may be of various forms.

When the nozzles have been removed from their hooks, the counters having been re-set to zero, the liquid is allowed to discharge by manual operation or control of the nozzles, and during such discharging operations the meters function to meter quantity of fuel delivered, with corresponding advancement of the "Gallons" counter and the "Amount of Purchase" counter.

Generally the motor fuel is delivered to the purchaser's vehicle either to supply a specified amount of fuel, such as a specified number of gallons, or in amount to comply with a specified "Amount of Purchase," such as $3.50 worth of fuel, on the basis of the rate per gallon then current and as adjusted by the setting of the gear ratio changer of the stand in question. In the former case the nozzle is retained in open condition until the "Gallons" counter indicates the specified number of gallons delivered; in the latter case the nozzle is retained in open condition until the "Amount of Purchase" counter indicates the specified monetary value. In either case, however, the operator may discontinue flow of the liquid by releasing the nozzle lever to allow the nozzle to close. Frequently the purchaser may specify that the tank shall be filled up, in which case the desired number of gallons cannot be pre-specified exactly.

Although it is customary to so construct the hose nozzles that when manually released they will automatically close and stop the discharge of fuel, still it frequently happens that attendants will jam or otherwise modify the nozzles so that they will not thus automatically function to close. This malpractice has frequently been used in locations where there are numbers of dispensing stands under a single supervision, so that the attendant must attend to all of such stands, delivering fuel from one stand at a time, and thus working under pressure when the traffic is heavy. In such a case it frequently happens that the attendant will place the jammed nozzle in the inlet opening of the vehicle tank, so that the fuel will run into such tank without need of presence of the attendant who will then attend to other work while the vehicle tank is being filled. When such tank has filled the fuel will overflow and will continue to overflow until the attendant again tends such stand. Such a condition is extremely hazardous as well as resulting in considerable loss of overflowed fuel. Additionally, when such a condition occurs there is created a dispute between the purchaser and the owner of the stand, since there is uncertainty as to exactly how much fuel has been actually delivered into the vehicle tank since the reading of "Gallons" on the stand does not correctly show the amount of fuel delivered into the tank of the vehicle.

It is a prime object of the present invention to provide the liquid dispensing stand or station with counting means operable according to a variable which is proportionate to the amount of liquid delivered, or according to the purchase price of such liquid based on the selected rate per gallon, which counting device is pre-settable to a selected amount or value of such liquid which is to be delivered, and which counting device or a related part is provided with zeroizing means operable to signal when such pre-set amount or value of liquid has been delivered; and to provide in connection therewith means to discontinue the further delivery of such liquid when such pre-set amount or value thereof has been so delivered. Specifically, in the case of gasoline vending stands for motor vehicles it is a prime object of the invention to provide such counting means in connection with the gas metering means so that such counting and zeroizing element will be functioned according to the quantity of gas delivered as determined by such metering element. Still more specifically, it is an object, when the said counter operates on the basis of "Purchase Amount" to combine said counter with the gear ratio change unit in such manner that said counter will function on the basis of dollars value of the fuel delivered, and will thus function at all times regardless of the setting of such gear ratio change unit, or the changing of such setting from time to time according to varying rates per gallon of the sales price of the fuel.

Still more specifically, it is an object of the invention to provide means to interlock various units of the stand in such manner as to make it necessary to re-set such counter element to zero position prior to pre-setting it to the amount of gallons or the "Amount of Purchase" which is to be metered. The desirability of such provision will be understood when it is considered that in some cases it will be found desirable or necessary to discontinue the delivery of the liquid prior to actual delivery of the pre-set gallons or purchase price amount, in which cases said counter will not have been returned to its zero position or reading when delivery of the liquid is actually terminated. Such a condition might occur, for example, in a case where the previous purchaser had ordered delivery of a specified amount or value of fuel, to which amount or value the counter was then pre-set; but when, actually it was found impossible to accommodate such amount or value of fuel in the tank. In such a case the delivery of the fuel would be discontinued by use of the nozzle, leaving an unconsumed amount or value still showing on the counter.

In preferred embodiments of the invention I provide a counter supplemental to those counters heretofore generally provided for showing gallons, rate per gallon, and amount of purchase, such supplemental counter showing, by its pre-setting, the demanded amount or value of fuel to be delivered. I then provide means, generally under the control of the attendant, for pre-setting such supplemental counter to the gallons, or to the amount of purchase demanded by the customer. I also provide re-setting means for preliminarily setting the gallons counter, the amount of purchase counter, and the "Prepay Counter" (or the demanded gallons counter, as the case may be), to zero positions prior to instituting the new operation, such re-setting means generally being also under control of the attendant. Having first re-set these several counters to their respective zero positions or readings, and having then pre-set the gallons counter (or the "Prepay Counter," as the case may be) to the demanded amount or value, I have provided means whereby as liquid is delivered the reading of the pre-set gallons counter (or the pre-set "Prepay Counter") will move towards the zero position harmoniously with movement of the "Gallons Delivered" counter (or the "Amount of Purchase counter") to higher readings, until finally, when the pre-set gallons counter (or the "Prepay Counter") reaches its zero position the operation will be automatically discontinued. Since the delivery of liquid is at all times under manual control by manipulation of the hose nozzle, it is evident that the delivering operation may be discontinued at any time prior to the zeroizing of the supplemental counter, and under control of the person actually delivering the fuel into the receiving tank.

It is desirable, either on account of legal requirements, or regulations, or otherwise, that provision be made such that the regular attendant of the filling station must be present at or close to the stand prior to commencement of a setting and delivering operation. It is also desirable, for similar reasons, to make provision for ensuring that the attendant personally re-set the counters to zero positions, prior to beginning of a delivering operation. It is a further feature of the present invention that I have provided key lock operated means to re-set said counters. In certain embodiments of the invention I have also made such provision that the attendant shall also, by use of his key, pre-set the counter or counters to the amount or value of the liquid which it is desired to have delivered. Thus it is necessary that the attendant shall personally attend to these setting operations prior to commencement of a delivering operation.

Various interlocks are also provided in the arrangements hereinafter described whereby various functions must be performed in a specified sequence. By reason of these interlocks there is assurance that the performance of certain functions shall have been preceded by the performance of other functions, either by the attendant or by the person actually delivering the fuel into the receiving tank. Included in these interlocks is provision whereby the replacement of the nozzle on the hook of the stand will automatically terminate supply of current to the pump motor (and close the shut-off valve in the fuel delivery line); together with provision whereby subsequent removal of the nozzle from its hook will nevertheless not cause resumption of current supply to the pump motor (or re-opening the shut-off valve), even though the supplemental counter had not yet have reached its zero position. This provision will make it necessary when once the nozzle has been replaced on the hook, for the attendant to again come to the stand and perform certain operations in case further delivery of liquid is desired. A further interlocking provision is one which makes it necessary that the "Gallons" counter (or the "Prepay Counter," as the case may be) shall be re-set to zero before other operations can be performed, thus avoiding error in various settings and readings thereafter to be effected. Other interlocking provisions will appear hereinafter from full disclosure of the features of the present invention.

I have herein disclosed two forms of embodiment of the features of the present invention. In one case the embodiment is one in which the supplemental counter functions according to the amount of "Prepay" in dollars and cents; in the other form the embodiment is one in which the supplemental counter functions according to the number of gallons demanded for delivery, and regardless of the cost thereof, although the actual cost is also shown on a suitable counter, as determined by the rate per gallon, and according to present standard practice in such stands.

In connection with the "Prepay" embodiment certain features and objects may be here mentioned as follows:

In order to provide a completely automatic self-service stand I have provided an arrangement such that coins of proper denominations and in whatever amount (total value) may be desired, within the capacity of the machine, may be indiscriminately inserted through a receiving slot or opening, the counters having been previously re-set to their zero positions, as already explained. The insertion of such coins will automatically ensure, after certain other interlocking operations have been performed that the "Prepay Counter" shall be advanced to a reading corresponding to the total amount of such so inserted coins, so that said counter will then indicate the amount in value of the coins so inserted. Preferably, and as illustrated, the arrangement is such (the prepay or similar counter having first been re-set to zero) that all coins are first inserted through the receiving slot without corresponding advancements of the counter. Provision is then made, in the form of a "Starting Button" for causing said coins to be successively passed through a selecting mechanism whereby the "Prepay Counter" is successively advanced by stages according to the coins successively released through such mechanism until all coins have been counted, and the "Prepay Counter" has been advanced to a reading equal in amount to the value of all coins thus previously inserted. During this preliminary operation certain interlocks are effective to prevent commencement of operation of the pump motor, and to prevent opening of the cut-off valve, and for certain other functions and objects, so as to protect the stand and the user from improper operations and consequences, and to ensure correct functioning to eventually deliver the desired and prepaid amount of fuel.

In connection with the foregoing preliminary operations I have also provided a coin return chute which is normally open but may be closed by a solenoid. Such solenoid is only energized when the "Prepay" counter has been set back to zero. This coin return chute is also interlocked with the nozzle hook in such way that said hook must be in its nozzle supporting position in order that the coin return chute shall be closed. It is thus necessary that the "Prepay" counter shall be in its zero reset position and (when the nozzle hook interlock is used) that the nozzle hook shall be in its nozzle supporting position in order to be able to insert the coins without having them immediately returned through the return chute.

In connection with the insertion and subsequent functioning of the coin selecting and counting mechanisms above referred to I have made provision for use of several coin denominations, such as quarters, half-dollars, and silver dollars which may be indiscriminately inserted into the receiving slot. The arrangements are then such that as these various denominations of coins are inserted they will individually move to suitable and proper receiving chutes wherein they will be collected in accordance with the several denominations mentioned. Upon thereafter depressing the "Starting Button" the so-sorted coins will be individually released, one at a time, commencing with one denomination, for example the quarters, counting these and advancing the "Prepay Counter" by steps as such quarters are released until all quarters have been counted and added into the counter. Then the half-dollars will be likewise released, one at a time, with corresponding advancements of the "Prepay Counter" so that when all half-dollars have been accounted for the counter will read an amount equal to the sum of all quarter and all half-dollars. Then the silver dollars will be likewise released, with corresponding advancements of the counter until all silver dollars have been accounted for. Thereupon said counter will read an amount equal to the sum of all quarters, all half-dollars, and all silver dollars which have been previously inserted through the slot. In case of absence of any coins of a given denomination the operations just referred to will skip such coin denomination mechanism and proceed to the next denomination of which coins are present in the mechanism.

During the foregoing pre-setting operations by coins various interlocks are in effect so that improper functions may not occur. For example, no liquid can be delivered until all coins have been counted with corresponding pre-setting of the counter to the proper total value position. This will ensure that when liquid delivery commences there may be delivered an amount corresponding exactly to the total value of such inserted coins.

Provision is made in the form of suitable interlocks so that when the "Amount of Sale" counter stands at its zero position to which it was re-set by the attendant, and with the "Prepay" or like counter moved away from its zero position, corresponding to some amount of prepay, the movement of the nozzle hook to its nozzle unsupported position will supply current to the pump motor and will open the valve (if one be provided) in the liquid delivery line. The aforesaid re-setting of the "Amount of Sale" counter to zero, and the movement of the "Prepay" counter to some digital reading preceded the introduction of the coins as already explained.

When the coin counting operation has been completed a suitable signal is given, such as the lighting of a signal lamp which is located in position readily visible to the person operating the stand. Upon the giving of such signal the operator of the stand will be informed that the nozzle may properly be removed from its hook. Since at this time the pump motor is also in operation, and the shut-off valve is opened, fuel may be delivered into the receiving tank by removing the nozzle from its hook, allowing said hook to rise, and then by proper manipulating the nozzle itself. Such delivering operation may be continued with corresponding progressive increase in the reading of the "Amount of Purchase" counter and increase in the reading of the "Gallons" counter, and with corresponding and harmonious reduction of the reading of the "Prepay Counter." The reading of the "Amount of Purchase" counter at any time during the operation will indicate what value of fuel has already been delivered; and the reading of the "Prepay Counter" at such time will indicate the value of fuel which may still be taken from the stand. When the "Prepay Counter" reaches its zero position the shut-off valve (if provided) closes and the pump motor is stopped, with discontinuance of fuel supply even if the nozzle on the hose is retained open. At this point the "Amount of Purchase Counter" will read an amount equal to the amount of the original setting of the "Prepay Counter." The operation has been completed.

As previously explained, the starting of the pump motor and the opening of the valve (if provided) are contingent on the need of the "Amount of Sale" counter being at zero, and on the need of the "Prepay" counter being at a position other than zero, so that the raising of the nozzle hook (the nozzle being removed) can close contacts comprising portions of the pump motor and valve circuits. It is evident that as soon as any amount of liquid has been delivered the "Amount of Sale" counter will have moved away from its zero position so that one of the conditions precedent to a motor "starting" operation has now been destroyed. I have included a "holding relay" in the motor supply circuit. When the conditions needed to "start" the pump motor have been met this "holding relay" is moved to its closed position where it is "set," so that supply of current to the motor will continue even after the "Amount of Sale" counter has moved from its zero position. This holding relay is provided with a releasing solenoid, and contacts and connections are provided such that depression of the nozzle hook will excite this releasing solenoid thus releasing the holding relay and cutting off the current from the pump motor and the valve.

After having inserted a given amount and value of coins with corresponding pre-setting of the prepay counter (the "Starting Button" having been operated), and after having delivered only a portion of the fuel corresponding to such prepaid amount it may be desired to discontinue the delivering operation manually by merely allowing the nozzle to close and replacing the nozzle on its hook. Under these conditions the shut-off valve will close and the pump motor will stop, leaving the prepay counter reading an amount equal to the difference between the amount prepaid and the amount (in value) of fuel delivered. Such difference will be indicated as the reading of the prepay counter at such time. This amount is a credit to the purchaser and provision must be made for return or credit of such amount to him.

As a further feature and object of the invention I have provided means to deliver to the purchaser the amount of any credit due to him by reason of his having made an overpayment of coins into the machine. The specific means hereinafter disclosed includes a printing means in connection with the counters so that any such credit will be automatically printed on a suitable slip or card delivered to the purchaser automatically upon completion of the operations. Such credit slip may be redeemed by the purchaser at his convenience or retained for future use in a future transaction. In this connection I have so arranged the parts that the replacement of the nozzle on the hook institutes the printing function aforesaid and delivers such credit slip without special attention by the purchaser. I do not, however intend to limit myself to such a printed slip or card credit element except as I may do so in the claims to follow.

Sometimes it may also be desired to provide the purchaser with a printed slip showing the amount of his pre-payment and prior to delivery of any of the fuel. I have made provision whereby this result may be readily ensured under manual control in the form of a conveniently located "Customer's Printer" button and by use of the same printing and related mechanisms as are used for the printing of the credit slip previously referred to. This manual printing button control is so arranged that it is not necessary to replace the nozzle on the hook in order to effect the manually controlled printing. Therefore, it is possible, after making a manually controlled printing operation to resume delivery of liquid under nozzle control until the full amount has been delivered for which pre-payment was made. Additionally it is to be noted that if desired the customer may produce a printed slip after the coins which he has inserted have been counted and the "Prepay" counter has been pre-set, but before he commences to withdraw liquid under nozzle control, thus providing him with printed evidence showing the amount of his expenditure.

It may also be desired to provide a continuous and permanent recording of all transactions handled by the stand, which record may be of use in future accounting and other operations. I have therefore made provision for production of a duplicate record by the printing operation, which duplicate record is retained within the stand instead of being delivered to the purchaser.

After the starting button has been operated to institute the counting of coins and pre-setting of the preset counter to corresponding amounts provision should be made to prevent insertion of additional coins, or for rejection of any such further or additional coins, as the counting and pre-setting operation should be allowed to proceed uninterruptedly to conclusion. Accordingly I have made provision for rejection of any such after inserted coins, and for immediate return of them to the purchaser. This provision includes the coin return chute to which I have already referred.

It is here noted that when the pre-setting supplemental counter is pre-set to an amount of purchase value desired by the purchaser, such pre-setting may be effected either automatically by the insertion of suitable coins as already explained, or by a manual operation. In either case, however, when such supplemental "Amount of Purchase" counter is connected to the proper shaft or operating element of the gear ratio change unit the returning operation of the said supplemental counter will be on the basis of dollars and cents, and not on the basis of gallons. On the other hand, when such pre-set supplemental counter is to operate on the basis of gallons delivered it is connected to the gallons shaft of the gear ratio change unit or directly to the metering unit.

As a safety feature and to ensure against improper and possibly unsafe operations I have made the provision that restoration of the nozzle to the hook with corresponding depression of the hook to its "nozzle supported" position will terminate all operations including terminating the delivery of liquid by stopping the supply of current to the pump motor and closure of the valve in the liquid delivery line and releasing various relays so that no further operations can be conducted by the customer even though he may not have taken the full measure of liquid for which he made payment. But these terminating operations will include the delivery to the customer of the credit to which he may be entitled, as already explained. These terminating operations also include the provisions such that even though the customer may again take the nozzle from the hook he cannot then receive any further liquid by nozzle manipulation even though he may not have taken his full complement of liquid for which pre-payment was made.

Due to the foregoing operational provisions it is necessary that the attendant of the service station shall come to the dispensing stand and, by use of his proper key or keys re-set the necessary parts, including re-setting the counters to zero, before any further dispensing operation can be conducted, even by the same customer who may be entitled to a credit on his previous operation, as shown by his printed credit slip. The return of the attendant to the dispensing stand as above explained will assure proper compliance with requirements for safe operation, as well as compliance with laws and local regulations in many areas.

In some cases it may be desirable for the attendant at the stand to be able to operate such stand under conventional operating conditions in which the "Prepay" and other automatic features are not used. Such a non-automatic operation might be desirable in case it were necessary to deliver a large amount of liquid, more than the maximum amount for which pre-pay operation was possible with the pre-pay counter included in the operation. Or such a non-automatic operation might become necessary in case of the disablement of some portion of the automatic pre-pay equipment. To meet such conditions as well as others, I have made provision whereby the attendant can, by use of a special key inserted into a special control lock, place the stand in what may be called the "Non-Automatic Operation" condition. The operation of this special control lock will serve to ensure opening of the valve in the liquid delivery line so that liquid may flow from the pump to the delivery nozzle, and will also ensure supply of current to the pump motor so that said pump will develop liquid pressure of proper value for supply through the meter to the nozzle as long as the special key controlled lock is in its "Non-Automatic Operation" condition. When thus operating in the non-automatic manner the "Amount of Sale" counter and the "Gallons Delivered" counter will function in normal manner, and the stand may be used substantially as a conventional liquid dispensing stand.

It must be noted, however, that when operating as above it is necessary for the meter shaft or movable element to rotate or move proportionately to the amount of liquid dispensed, and in the direction for increasing count of the "Amount of Sale" counter and the "Gallons Delivered" counter so as to make proper count of those items. But at the same time the "Prepay" counter will not rotate but will remain locked at its zero position. Acordingly, it is necessary to make provision such that these special conditions of operation may be met and complied with. To meet this condition, among others, I have provided a friction drive coupling or element in the connections from the meter shaft to the "Prepay" counter first drive element. This coupling is of sufficient torque transmitting strength to effect proper drives to the "Prepay" counter for intended operations of such counter, but is nevertheless able to yield when the "Prepay" counter is locked in its "zero" position against further down count. This friction drive coupling is also able to yield to enable the "Prepay" counter's first drive element to be moved in the increased counter reading direction during the pre-setting operations, and while the shaft from the meter is not rotating. This friction drive coupling is also adjustable as to its torque transmitting capacity so that damage will not be done to any operational part when the coupling is required to slip under either of the conditions outlined above or other operational conditions which may be encountered.

It is a further feature and object of the invention to provide simple means to effect the various features and objects hereinbefore referred to. Also to so arrange the parts that such new features and objects may be accomplished by the addition of relatively few and simple parts to previously existing units or stands. In this connection it is noted that one of these additional parts comprises the supplemental counter and its zeroizing and/or zero locking and signalling elements. This counter is properly related to and connected to the proper shaft or movable element of the gear ratio change unit (or to the meter), and is also properly connected to and related to the gallons counter or the "Amount of Purchase" counter previously and heretofore well known and widely used, and is also properly related and connected to various other units of the stand, such as the pump motor, the nozzle hook, the re-setting devices, and other elements. In this connection it is a further feature and object to so arrange the parts thus added that my present improvements may be readily incorporated into liquid dispensing stands of present day constructions and designs with relatively small and easily made changes or modifications thereof.

Other objects and uses of the invention will appear from a detailed description of the same, which consists in the features of construction and combinations of parts hereinafter described and claimed.

BRIEF DESCRIPTION OF THE DRAWINGS

In the drawings:

Figure 1 shows a front elevation of a dispensing stand incorporating the features of my present invention, and wherein said features are such as to enable the pre-setting of the stand for delivery of a prescribed value of liquid, based on the setting of the stand for a specified price per gallon of the liquid delivered; and in this embodiment provision has been made for a fully automatic dispensing operation, the pre-setting of the supplemental counter being automatically accomplished according to the number and value of various coins inserted into the insert slot; and in this embodiment provision has been made for printing any remaining credit, automatically upon conclusion of the dispensing operation, and also for printing the value or amount of coins originally inserted into the machine and for providing a duplicate record of such printing operations, if desired; and in this embodiment of the invention provision has been made for various interlocks between elements or units of the stand, as will presently appear; and provision has been made for locking various parts under lock control of the authorized attendant, so that, if desired it is necessary that such attendant should make certain preliminary operations, prior to use of the stand by the purchaser, thus ensuring added safety in the self-service operation of the stand, and ensuring personal inspection of the stand prior to operation thereof by the purchaser;

Figure 2 shows a vertical elevation, somewhat schematic in form, of the stand shown in Figure 1, with the front cover plate removed; and it shows the relative positions of various of the principal operating parts within the stand; the nozzle being placed on the hook according to well understood practice;

Figure 12 shows a left-hand side elevation of the selector unit, this unit serving to receive signals of successive coins being counted, and transmitting controls for such coins to the pre-setting counter, under actuation of the counter motor, and ensuring counter advancement each time proportionate to the denomination of such coin, this selector unit being properly connected to the several coin chutes, to the counter, and to various relays whereby the signals are controlled;

Figure 13 shows a right-hand side elevation corresponding to Figure 12;

Figure 14 shows a vertical section taken on the line 14—14 of Figure 12, looking in the direction of the arrows;

Figure 15 shows a vertical section taken on the line 15—15 of Figure 14, looking in the direction of the arrows, and it shows the microswitches for the zero position, and for the 25 cent position, the fifty cent position, and the silver dollar position, corresponding to advancements of the counter by corresponding amounts under control of this selector;

Figure 16 shows a vertical section taken on the line 16—16 of Figure 14, looking in the direction of the arrows, and it shows the raised cam surface of the rotatable disk whereby the microswitches are actuated at proper times;

Figure 17 shows a fragmentary cross-section taken on the line 17—17 of Figure 14, looking in the direction of the arrows, and it shows the armature element of the magnetic clutch whereby the disk of Figure 16 is rotated, said armature being shown as provided with low resistance closed circuit inserts to improve the operation and secure extremely prompt response when the stand is operated by alternating current supply;

Figure 18 shows a developed section taken on the line 18—18 of Figure 16, looking in the direction of the arrows, and it shows the form of the cam surface which actuates the microswitches;

Figure 19 shows, on double scale a typical form of key-locked unit for actuating the re-setting of the counters to their zero positions prior to commencement of a new dispensing operation; this figure being a longitudinal section through the body of the lock unit;

Figure 20 shows a right-hand end view of the locking unit of Figure 19, the outer portion of the crank being broken away to reduce the size of the figure, and a key being present in the lock;

Figure 21 shows a cross-section taken on the line 21—21 of Figure 19, looking in the direction of the arrows, a key being present in the lock, and the locking pin at the plane of the section being thereby brought into registry with the cylindrical surface so that the lock cylinder can be turned;

Figure 22 shows a cros-section taken on the line 22—22 of Figure 19, looking in the direction of the arrows, a key being present in the lock, and this figure shows the encircling groove of the lock cylinder which groove must be brought into registry with the guide pin by pulling the lock cylinder outwardly, when unlocked, to thereby bring the several orders pins of the re-setting mechanism into engagement with their respective orders disk studs, such encircling groove ensuring that proper engagement of the several orders pins with their studs will be maintained throughout a complete rotation of the re-setting lock, to thereby bring all orders disks to zero positions;

Figure 23 shows a fragmentary elevational view of one of the zeroizing counters, including three orders disks, and this figure shows the zeroizing notches in the several disks, and it shows the rock arms carrying the rollers which must register with such notches in order to permit the rock shaft to rock into the zero signalling position; and this figure also shows the contact or microswitch element in back face view, and the locking hook also in back face or edge view, the orders disk notches being registered with their respective rock arm rollers for zeroizing;

Figure 24 shows a cross-section taken on the line 24—24 of Figure 23, looking in the direction of the arrows; and this figure shows how one of the rock arms co-operates with the edge portion of the corresponding orders disk, and with the notch in said edge portion for zeroizing; and this figure also shows a typical form of engagement between the order drive disk for its order and the body element of the order element, said engagement comprising a spring pressed dog engaging with teeth formed on the inner cylindrical surface of the element, so that during normal counting operations proper drive is ensured, but so that during re-setting operations each orders disk may be brought to its zero position without interference from adjacent orders disks;

Figure 25 shows more or less schematically a simple form of coin selecting unit, wherein there is provided a common chute of size large enough to accommodate the largest coins to be handled (for example, silver dollars), into which large chute all coins are introduced indiscriminately through the insert slot, together with gates of progressively smaller sizes leading downwardly away from such large chute to corresponding sub-chutes for the coins of successively smaller sizes, said gates being of size to pass their respective sized coins, but not being of sizes large enough to pass larger coins, so that at the position of each gate the coins of corresponding size are passed down into the corresponding sub-chute, and the coins of larger sizes are compelled to pass along until reaching their proper gates; and this figure also shows, more or less schematically, the escapement device for each sub-chute, and the microswitches for such sub-chute, there being a microswitch for testing the presence of further or remaining coins within the sub-chute, and another microswitch for detecting the passage of each coin as it is released by such escapement device, to thereby pass a corresponding signal to the selector unit shown in Figures 12 to 18, inclusive;

Figure 26 shows a fragmentary plan view of a portion of the chute arrangement shown in Figure 25, and Figure 26 shows the several gates of progressively larger size along its length;

Figure 27 shows a fragmentary, substantially horizontal, or longitudinal section, on enlarged scale as compared to Figures 25 and 26, showing one of the escapement devices, and the microswitch tongues extending upwardly into the chute from beneath so as to respond to the presence or the passage of coins along the chute;

Figure 28 shows a fragmentary side elevation, corresponding to Figure 27, and it shows the escapement solenoid above the chute, and by which the escapement is operated against the force of its spring, to permit release of a single coin along the chute;

Figure 29 shows a fragmentary plan view of the escapement device, being a view looking down onto the top of the chute;

Figure 30 shows a cross-section taken on the line 30—30 of Figures 27 and 29, looking in the directions of the arrows;

Figure 31 shows a typical wiring diagram corresponding to the embodiment shown in Figures 1 to 30, inclusive, which wiring diagram makes full provision for fully automatic operation of the stand wherein coin pre-pay operation is provided for, together with the various functions and operations hereinbefore referred to, as well as various other operations, all as will presently appear;

Figure 32 shows an elevational view of another embodiment of stand incorporating various features of the present invention, said view being similar to that of Figure 1, but provision being made in the case of Figure 32 for pre-setting and dispensing operations on the basis of gallons instead of on the basis of "Amount of Purchase," and the pre-setting arrangement shown in Figure 32 being manually effected by the attendant;

Figure 33 shows a view similar to that of Figure 2, but Figure 33 corresponds to the arrangement and embodiment of Figure 32;

Figure 36 shows a typical wiring diagram corresponding to the arrangement of Figures 32, 33, 34 and 35.

Figure 3:
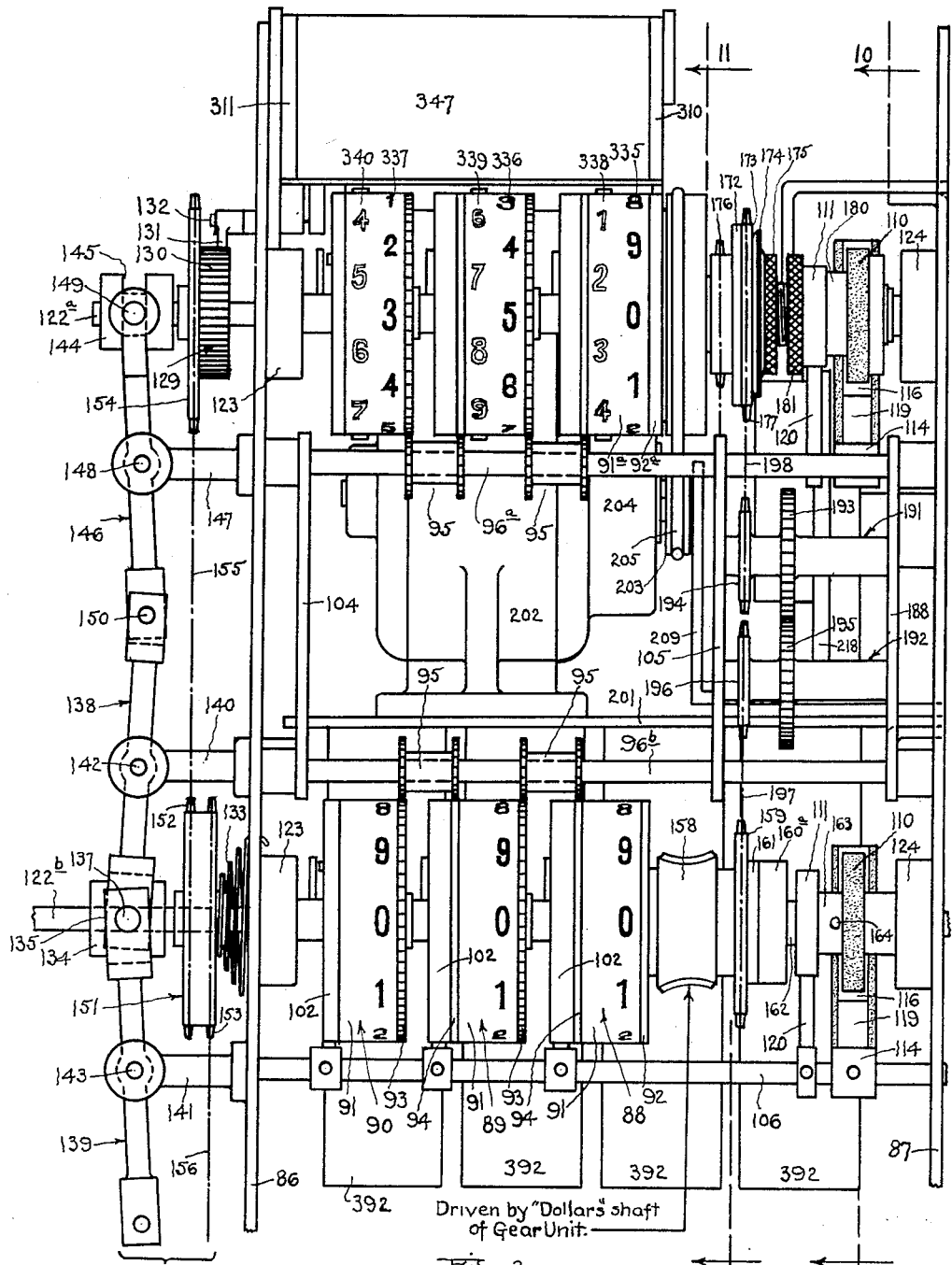
Figure 3 shows a front elevational view of the upper portion of the counter section of the stand; and this figure shows a counter for "Amount of Purchase" and a related counter "Amount Prepaid," together with proper interconnections between these two counters, the zeroizing signal contacts and locks, the re-setting to zero elements, and various other parts directly related thereto.
Figure 4:
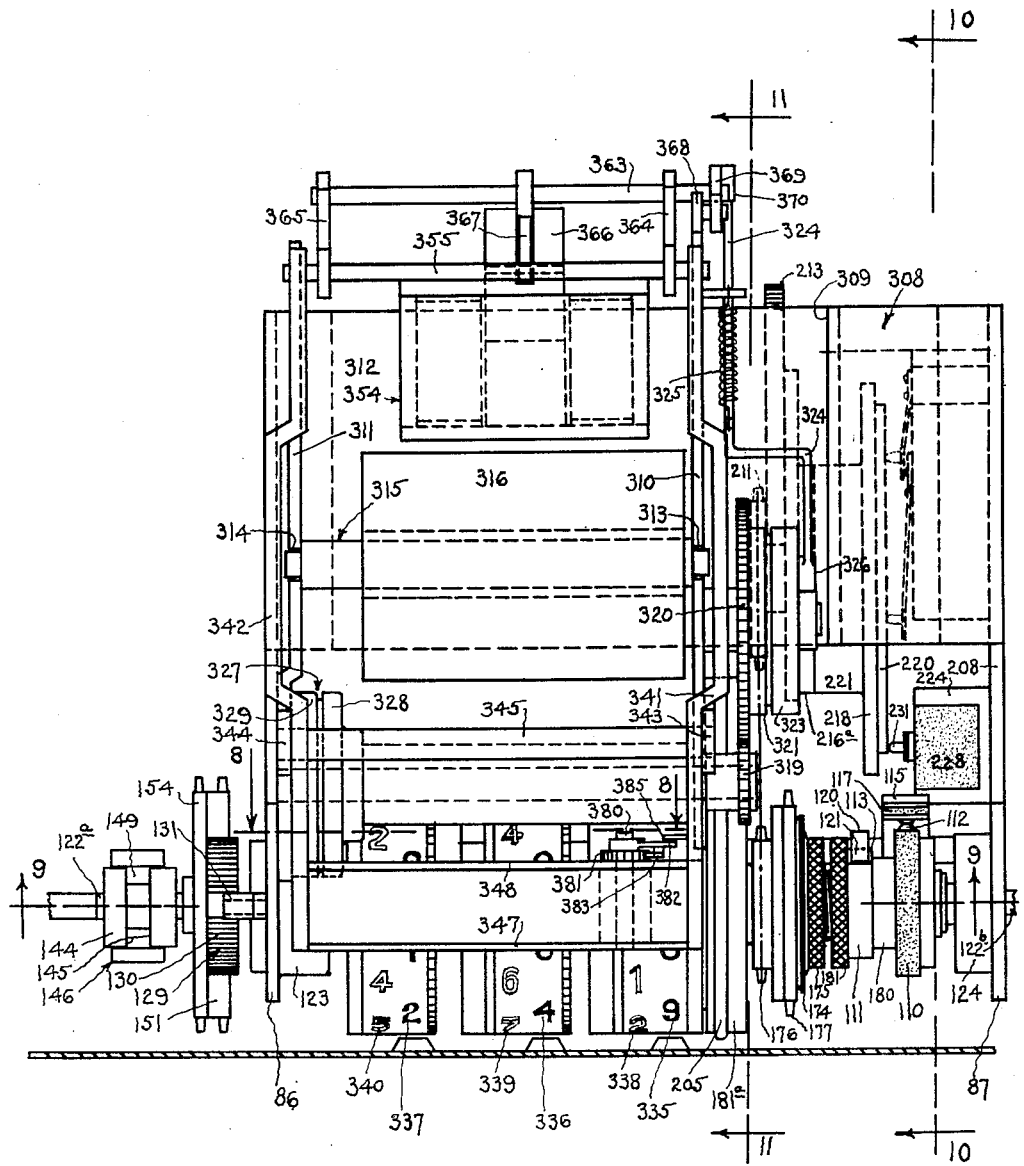
Figure 4 shows a plan view corresponding to Figure 3, and it shows the printing elements and related parts in plan.

Generally speaking, Figures 1, 2, 32, 33, 25 to 30, inclusive, are on reduced scale, and Figures 19 to 22, inclusive are on double scale; and all other figures are on substantially full scale, for a gasoline dispensing stand of such form and design as would meet commercial needs.

GENERAL STATEMENT

In the drawings I have shown two specific embodiments of my present invention. Each of these illustrates said invention as embodied in a liquid dispensing stand of the gasoline dispensing type, but it will presently appear that the features of the invention are not limited in their usefulness to such gasoline dispensing stands, and I do not intend to limit myself thereto except as I may do so in the claims to follow.

In each of the two illustrated embodiments I have shown liquid pumping means in the form of a pump driven by a suitable electric motor, said pump delivering the liquid through a suitable meter to the delivery hose, with a valved nozzle for control of the delivery from such hose into the vehicle tank or to other receiver. Thus the actual delivery of the liquid is at all times under manual control of the operator. Usually the valve of such nozzle is self-closing, and actual liquid delivery will occur only as long as such valve is purposely retained open; but frequently these hose nozzles are mal-operated, the operator plugging the valve handle so that delivery of liquid will continue even without manual holding thereof. In such cases it frequently happens that excess delivery of liquid will occur, with corresponding spillage of highly inflammable liquid, and great fire hazard. Such hazards will be largely overcome and prevented by use of the present invention.

In each of the embodiments illustrated there is shown a gear ratio change unit which is driven by the meter, in accordance with well understood present practice. This unit is provided with various gears, and the means to change the ratio between the driving shaft (meter driven) rotations, and the driven shaft, so that said driven shaft will rotate proportionately to "Amount of Purchase" in dollars and cents, based on any selected cost of the liquid per gallon, generally by variations of tenths of a cent per gallon. Each of said embodiments also shows a counter driven by such driven shaft of the gear ratio change unit, such counter thus showing the value of the liquid delivered in dollars and cents, based on such adjusted setting of the gear ratio change unit. Said counter thus shows directly the "Amount of Purchase." Each of said embodiments also shows another counter which is driven by the meter, either directly, or through the medium of a suitable connection into the gear ratio change unit, so that said counter shows directly the number of gallons delivered. The readings of this counter, therefore, are not dependent on the ratio setting of the gear ratio change unit. In each of the embodiments illustrated both of these counters are settable to zero positions prior to commencing a dispensing operation, so that their readings are indicative exactly of the amount of liquid dispensed by such dispensing operation, and the value thereof.

Each of the illustrated embodiments also shows a typical hook on which the hose nozzle is engaged when the equipment is not in use; and in each case such hook is movable, and placement of the nozzle on the hook moves the hook from its operating or nozzle non-supported position to its non-operating or nozzle non-supported position. Such hook movements are in each case interlocked and interconnected with other controls and functions of the stand, according to well understood present practices. In the present embodiments I have also incorporated certain additional interlocking functions not heretofore known or used, to my knowledge.

In each of the embodiments herein disclosed I have provided a supplemental counter, properly connected and related to one of the counters previously referred to, and which supplemental counter is pre-settable to a function of one of the other counters, either the "Amount of Purchase Counter" or the "Gallons" counter. Such supplemental counter is so connected that it counts backwardly, that is, to lower values, as the dispensing delivering operation proceeds. Such supplemental counter may thus be pre-set to that initial setting which may be desired, either to the specified "Amount of Purchase" which is desired, or to the specified number of gallons which it is desired shall be delivered. In either case, as the delivering operation proceeds such supplemental counter moves to lower readings as the delivering operation proceeds, until finally it reaches its zero reading position. In the meantime the other counter, either the "Amount of Purchase" counter or the "Gallons" counter as the case may be, moves to higher reading positions, and when the supplemental counter comes to its zero position the other and conventional counter reads an amount, either of dollars and cents, or of gallons delivered, which is the true value or the true amount delivered, and would, in either case be the same as the pre-setting of the supplemental counter prior to beginning of the delivering operation.

In each embodiment I have also, in the connections between the conventional counter and such supplemental counter, made the necessary provisions to enable re-setting both of said counters to zero positions prior to commencing a delivering or a pre-setting operation; and in each case I have also made provision for enabling the necessary relative movements and operations to occur in the conventional counter and such supplemental counter during all operations.

In each embodiment I have also interconnected the supplemental counter, and other functions of the equipment with suitable locking devices whereby an operation may not be instituted without prior attention to the equipment by an authorized attendant having a suitable key.

In each case, also, the supplemental counter is of zeroizing characteristics and functions, so that when it has been returned to its zero position suitable signals are given which may be transmitted to other units and controls. Each of these supplemental counters is also provided with zero locking means whereby definite assurance is given that it will function exactly and accurately at such zero position. Such zeroizing supplemental counters are provided with signalling means, generally in the form of electrical contacts which are functioned at the zero position; and the interconnections between such contacts and other elements include means to discontinue liquid supply to the hose and its nozzle when the zero position is attained. I have shown means to effect such discontinuance both by terminating current supply to the pump driving motor, and also by closing a suitable valve in the liquid supply line between the pump and the nozzle.

In the case of the embodiment which incorporates a supplemental counter operating according to the "Amount of Purchase" shaft of the gear ratio change unit, I have also shown coin operated means to pre-set the supplemental counter automatically to a reading equal to the value of coins which are inserted into the machine, and without special operations or functions to be manually performed by the operator.

Various other features are also incorporated in the two embodiments illustrated, as will presently appear in full detail.

Referring first to the embodiment shown in Figures 1 to 31, inclusive, and to the stand shown in Figures 1 and 2, said stand includes the pump (generally centrifugal) 50 driven by the motor 51, by means of the pulley and belt drive 52. This pump draws liquid from the supply line 53 and delivers liquid over the delivery line 54, generally to the air trap or separator, 55. From this air trap the liquid is delivered over the line 56 to the meter 57 which meter is provided with the driven shaft 58 rotating proportionately to the volume of liquid metered. The liquid flowing from this meter passes over the line 59 to a fixture 60 in the housing of the stand, the hose 61 being connected to this fixture.

There is provided the hook arm or lever 62, pivoted at the point 63 for slight up and down rock, a suitable spring being provided which urges this lever upwardly at all times. This lever is shown as provided with the upstanding pin 64 onto which the nozzle handle 65 may be engaged when the nozzle is not being used for liquid delivery, and from which pin the handle is very readily removed when delivery of liquid is to be made. The handle 65 carries the nozzle element 66 which is connected to the hose 61 through the medium of a valve 67. This valve is normally closed either by a spring or by liquid pressure; and a suitable hand-grip 68 is provided in the handle so that by merely gripping such hand grip in convenient manner the delivery of liquid is permitted in such volume and for such length of time as manually permitted, but subject to the automatic controls presently to be explained. Generally the stand is provided with an opening into which the end portion of the nozzle may be inserted when such nozzle is not in use, as shown in Figures 1 and 2.

The weight of the nozzle and connected and supported hose is sufficient to lower the hook against its spring to the non-use position shown in Figures 1 and 2, but when the nozzle is removed from the hook the spring action is sufficient, in the absence of other restraining element, to raise the hook to its limited elevation, which raised position it will then retain until the nozzle is replaced on the hook. In Figure 2 I have shown a contact or switch box 69 in position to be controlled by the hook movements, this switch including the stud 70 which is shown as projecting upwardly and in position for actuation by the up and down hook movements. When the nozzle is replaced on the hook the switch contacts of this switch element are moved into one position; when the nozzle is removed from the hook these switch contacts move to another position. This switch will be referred to hereinafter.

I have also, in Figure 2 shown the hook lock element including the stud 71 carried by the hook arm 62 and in position to be engaged by the latch element 72 carried by the stand in proximity to such stud's movements. This arrangement is such that when the hook is lowered against its spring urging the stud 71 will move under such latch 72 and the latch will then snap out into locking position, such that the stud cannot rise, and the hook will be locked in its lowered position. This latch element includes a solenoid which may be energized to withdraw the latch 72 from interference with the stud, and then the hook may rise under urging of its spring when the nozzle is removed. I shall hereinafter refer to this latch element and the solenoid whereby it is moved to non-interfering position, on occasion. This solenoid controlled latch is interlocked with various other elements as will hereinafter appear.

I have also shown, in Figure 2, the solenoid operated valve 73 in the liquid line between the pump and the nozzle, which valve is electrically operated under control of certain other elements. Conveniently this valve is one which is normally closed, and is electrically opened, so that its closing function is not dependent on maintaining current through its solenoid. I shall refer to this valve hereinafter.

The driven or delivery shaft 58 of the meter 57 connects to a suitable element of the gear ratio change unit 74. This unit may be of conventional and well understood construction, and various such units are widely used at the present time. As examples of such devices I may mention Letters Patent of the United States, No. 2,111,996, issued March 22, 1938, on the application of Edward A. Slye, for Liquid Dispensing Apparatus, and No. 2,151,239, issued March 21, 1939, on the application of Edward A. Slye, et al., for Gearing for Liquid Dispensing Apparatus, said patents showing typical gear arrangements whereby the ratios may be changed from time to time; but I wish it clearly understood that in mentioning these patents I do not intend to limit the usefulness of my present improvements to combinations in which the structures of these particular patents, nor of any other patents or arrangements are used, since manifestly any form of gear changer may be used in my present combinations or for that matter, in case it is not desired to change the "Rate per Gallon" a drive direct from the meter to the counter may be used, the counter for "Amount of Purchase" being permanently geared in fixed ratio to the liquid meter. In Figure 2 I have also shown, schematically, the two outgoing or delivery shafts from this unit 74, numbered 75 and 76, respectively. The shaft 75 rotates proportionately to actual gallons metered through the meter 57, and said shaft 75 may, in fact, comprise a direct drive from the meter without going through the gears of the unit 57. On the other hand the shaft 76 shown in Figure 2 is driven from the gear change unit input shaft 58 (the meter shaft), through the gearing of such unit 74 with the gears thereof adjusted to whatever "Rate per Gallon" is desired, so that said shaft 76 will rotate proportionately to dollars and cents corresponding to the volume of liquid metered, such shaft 76 driving the "Amount of Purchase Counter" under such gear ratio setting at a rate to cause the said counter to correctly translate number of gallons or volume of liquid into dollars and cents, and to indicate such dollars and cents correctly. Such arrangements are well known in this metering art. In Figure 2 there is also shown a shaft or adjustment element 77 extending from a counter or indicator of the stand downwardly into the unit 74. This connection 77 is such that when the attendant of the stand desires to do so he may set the indicator to whatever rate per gallon is required for the day or time at which sales are to be made, which rate per gallon will then be reflected through such connection 77 into the unit 74, setting the gear ratio thereof so that the shaft 76 will correctly rotate proportionately to the number of gallons metered, and on this selected rate per gallon, to thus correctly indicate and count dollars and cents on the basis of such selected rate per gallon. Such devices are also well understood and widely used in this metering art.

I have also shown in Figure 2 more or less schematically the rate per gallon indicator 78, the gallons counter 79, and the amount of sale counter 80; these three elements being connected to the shafts or connections 77, 75, and 76, respectively, as indicated in Figure 2. Such connections will be hereinafter referred to, and will be shown more in detail wherever necessary for a correct and full understanding of my present improvements, and the relation of the same to such earlier units.

In Figure 2 I have also shown the hand re-setting crank 81 in alignment with the counter 80. This crank is provided with means to re-set the counter 80 to zero prior to a dispensing operation. A cross-connection 82 is provided from the counter 80 or directly from this crank 81, so that manipulation of the crank 81 will also re-set the counter 79 to zero prior to the commencement of such dispensing operation. Generally both of the re-setting operations for the counters 80 and 79 will be effected simultaneously.

Such re-setting means are in wide use at the present time, and it is now customary to re-set both of the counters for gallons delivered, and for amount of purchase prior to commencement of a new dispensing operation. I have, as will presently appear in detail, provided key-lock means to lock the re-setting device just referred to against unauthorized operation, the intention being that the attendant shall possess the key therefor, thus making it necessary for such attendant to come to the stand in question and personally attend to the re-setting to zero. Such personal attendance of the authorized attendant at the stand will ensure his inspection of the same and assurance that the stand is in proper working condition, and that the person who is to actually dispense the liquid shall be competent to do so, and that the proper conditions for safe operation exist.

I have also, in Figure 2 shown schematically, the key-lock main switch element 83 convenient to the attendant. This switch can only be unlocked for supply of current for the various functions of the stand, by use of the attendant's key, so that a further protection is thus assured against operation of the stand prior to the presence of the attendant at the stand to bring said sand into operating condition.

According to a principal feature of my present invention I provide a supplemental counter which may be pre-set to show either the desired quantity of liquid to be purchased, in gallons, or the like, or, alternatively, to show the amount of the intended purchase directly in dollars and cents, based on the rate per gallon to which the gear ratio change unit has been adjusted. In Figures 1 to 31, inclusive the illustrated arrangement is that in which the pre-setting is on the basis of amount of sale in dollars and cents; in the arrangement of Figures 32 to 36, inclusive the illustrated arrangement is that in which the pre-setting is on the basis of actual gallons, and irrespective of rate per gallon.

The pre-setting of the "Dollars and Cents" supplementary counter may be effected either manually, as by a crank, or automatically, as by a coin operated mechanism. The latter type of arrangement has been illustrated herein, as will be presently described.

The pre-set supplemental counter, whether on the basis of gallons or amount of purchase, is interconnected with the corresponding conventional counter so that as liquid is delivered such supplemental counter counts downwardly towards zero. When such zero position is reached a signal is automatically given to thereby discontinue delivery of further liquid. Such discontinuing of delivery may be either by stoppage of the pump or by closing of a valve in the liquid line or by both functions. In the present case I have disclosed equipment including both functions.

Various other interconnections are also provided, all as will presently appear.

In both of the embodiments previously mentioned I have availed myself of certain conventional forms of construction as widely used in gasoline dispensing stands. Included in such conventional forms of structure is the general arrangement shown in Figure 2 and 33. In these cases it will be seen that there is provided in the stand a frame including the vertical side plate 84 and 85 supporting the unit 78 for rate per gallon, and the side plates 86 and 87 which support the gallons counter and the amount of purchase counter. These side plates serve to retain such counters in proper relation to each other while providing a convenient support for various elements required for the re-setting devices, etc.

According to conventional arrangements presently widely used the amount of purchase counter is placed above the gallons counter, which arrangement is that shown in Figure 2 and other figures based thereon. When the pre-setting is to be on the basis of dollars and cents this conventional arrangement may well be retained, and the supplemental counter for pre-set dollars and cents may then be placed directly above the conventional counter for amount of purchase; when the pre-setting is to be on the basis of gallons it may be desirable to locate the "Gallons Delivered" counter above the "Amount of Purchase" counter so as to bring such gallons counter to the top of the conventional group of counters, and then the supplemental counter for pre-set gallons may be located directly above such re-located gallons delivered counter, bringing the two close together. Such arrangement is shown in Figure 33.

With the counter locations just referred to it will be seen that in both embodiments of the invention the two counters which are related to each other (including one of the conventional counters and the corresponding supplemental counter in each embodiment) are brought close together so as to facilitate and simplify the inter-connections between them. This will appear more fully hereinafter.

THE COUNTER CONSTRUCTIONS

In Figures 3 to 31, inclusive the dollars and cents counter includes three numerical orders disks or elements 88, 89 and 90, for units, tens, and hundreds digits. Each of these elements includes the cylindrical element 91, and the adjacent disk element 92, or also the right-hand carrying disk element 93 and the left-hand carrying disk element 94 (the right-hand carrying disk being eliminated in the case of the units order, and the left-hand carrying disk being eliminated in the case of the hundreds order). Each of the carrying disks (94) at the left-hand side of the units and tens orders elements, is provided with a single carrying tooth; and each of the carrying disks (93) at the right-hand side of the tens and hundreds orders, is provided with completely encircling teeth. Carrying wheels 95 are provided between the units and tens orders, and between the tens and hundreds orders, such carrying wheels being provided with complete sets of teeth. These carrying wheels are journalled on the rod 96ᵇ carried by the side plates 86 and 87 as well shown in Figure 9. The inner surface of each of the cylindrical elements 91 is provided with numerals rather fine teeth 97 adjacent to the corresponding disk 93 (or 92) and such disk is, in turn provided with the dog or pawl 98 journalled to such disk on the stud 99, as well shown in Figure 24. A rather stiff leaf spring 100 serves to retain the tooth 101 of the dog firmly in engagement with the teeth 97, and with sufficient force to ensure drive between the cylindrical element and the corresponding disk under normal conditions. It is noted that the tooth of the dog is rather squared, and that the teeth are of corresponding form, so that such drive will be ensured for rotation in either direction. Nevertheless, with this arrangement it is possible to reset either the disk or the cylindrical element when necessary, with corresponding slip movement between the disk and the cylindrical element.

The foregoing general arrangement of the counters is typical of each of the counters herein illustrated and which is subject to re-setting, so detailed description of the constructions of all counters is not needed.

In addition to the elements just described for the several counters, there is also provided a shallow cylindrical element 102 at the left-hand side of each orders element, and against the disk 94 for each of the units and tens orders, and against the cylindrical element 91 for the hundreds order. Conveniently the adjoining cylindrical elements 91, carrying disks 94, and shallow cylindrical elements 102 are riveted together, as well shown in Figure 9 so as to provide very rugged elements, and to facilitate manufacturing operations. Each of these shallow cylindrical elements 102 is provided with a zeroizing notch 103, shown in Figures 23 and 24 into which the roller of the zeroizing arm may move when zeroizing, as will presently appear. This zeroizing means is further described as follows:

The cross-wise extending rods 98 on which the carrying wheels 95 are journalled (said rods being designated as 96ᵃ and 96ᵇ, respectively), carry the side plates 104 and 105. These plates support various elements to be presently described. A rod 106 is journalled in these plates 104 and 105 corresponding to each counter which is provided with zeroizing means. This rod has secured to it an arm 107 corresponding to each numerical order of the counter, these arms being conveniently numbered as 107ᵃ, 107ᵇ and 107ᶜ for the units, tens, and hundreds orders, respectively. Each of these arms carries the small roller 108 which normally rides on the cylindrical surface of the shallow cylindrical element 102 corresponding thereto, so that as long as any one of the orders elements is away from its zero position the corresponding roller 108 will retain its arm 107 at maximum distance from the axis of the counter. When, however, all of the orders disks are simultaneously at their zero positions, all of the rollers 108 will register with the corresponding notches 103, allowing the arms 107 to all rock slightly towards the axis of the counter, with corresponding rock of the rod 106. Thus said rod rocks under the influence of its spring 109 when the counter has zeroized.

Figure 10:
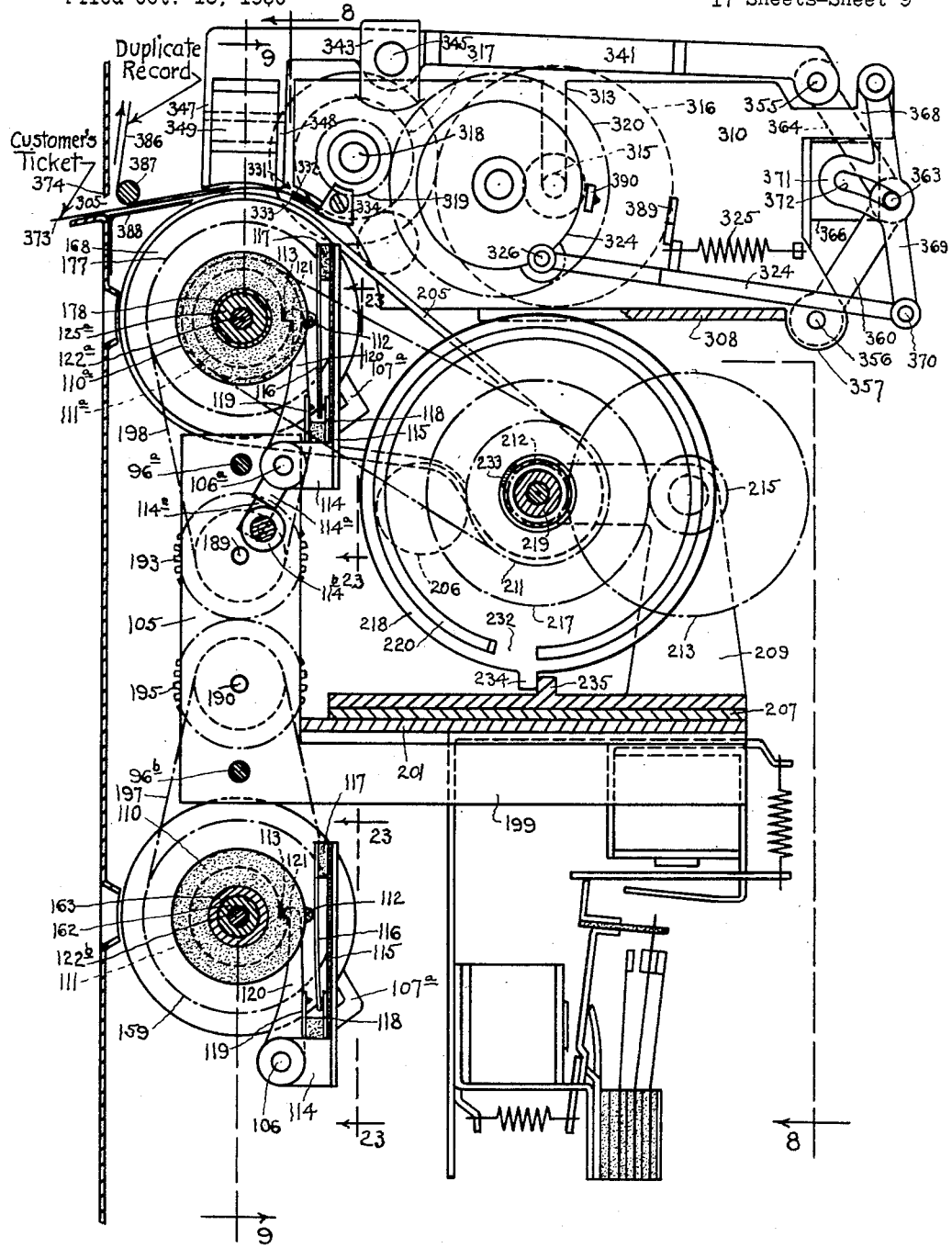
Figure 10 shows a vertical cross-section taken on the lines 10—10 of Figures 3, 4, 5, 8 and 9, looking in the directions of the arrows; the zeroizing contacts, and the locking hooks being in their zero position, corresponding to zero readings of the respective counters.

The counter shaft, presently to be described, by which the units order of such counter is operated, carries the two disks 110 and 111, the former being for operating the signalling contacts, and the latter being for the zeroizing locking means. The disk 110 is conveniently made of insulating material, and is provided with an enlargement 112 which is so located angularly with respect to the counter orders that said enlargement will engage a contact element to reverse electrical contacts at the same time that the rod 106 is rocked due to engagement of the rollers 108 with the notches 103. The disk 111 is preferably made of hard metal, and is provided with a notch or shoulder 113 facing in the direction of shaft rotation when counting downwardly, and which shoulder is so positioned angularly that it will engage with a hook element when the counter reaches its zero position, counting downwardly. Reference to Figure 10 will show the contacts and the zeroizing hook just referred to. In this figure the rod 106 carries the block 114 having the upstanding arm 115. A biased leaf contact element 116 is carried by the upper end of this arm 115, being insulated therefrom by the insulation 117; and the lower end of this leaf contact is positioned for engagement with either of the two oppositely placed stationary contacts 118 and 119 which are suitably insulated from the block 114 and the arm 115 to which said contacts are secured. The biased leaf 116 is preferably of "microswitch" form, being so formed that when engaged at a point such as that at which the enlargement 112 is shown in engagement therewith in Figure 10, said leaf will suddenly reverse its form, and will snap into engagement with the contact 118, as shown in Figure 10. On the contrary, when the enlargement 112 moves away from its angular position shown in Figure 10 said leaf 116 will suddenly reverse its position, snapping into engagement with the opposite contact 119. Such an arrangement is very accurate in its functioning, and is also very rugged, so that it is dependable for great numbers of operations. The contacts above referred to comprise a portion of the control elements presently to be described.

Now it is noted that with the arrangement of contacts thus far described the leaf 116 would be thus operated at completion of each full rotation of the units order counter shaft. It is desired that such operation shall only occur at the zeroizing position, and when there are several numerical orders to be accounted for, as shown herein, it is necessary that provision be made for preventing operation of the said contact element at completion of all shaft rotations except the final rotation in the zeroizing direction. The block 114 is carried by the rock rod 106, and whenever said rod is rocked outwardly by riding of one of the rollers 108 on the cylindrical surface of the corresponding shallow cylindrical element 102 the arm 115 by which the leaf contact 116 is carried is swung outwardly sufficiently to prevent engagement of the enlargement 112 with such leaf contact at completion of the shaft rotation, so that change of the contact engagements is not effected; but as the last rotation in the zeroizing direction approaches completion the rollers 108 will all drop into their respective notches prior to completion of such final rotation, and then when such final rotation is completed the arm 115 will stand closer to the block 110 and when the enlargement 112 comes into exactly zero position the leaf contact will be engaged, with reversal of the contacts. Contrarily, when counting up the rock rod will be swung away just after commencement of such first rotation in upward counting direction, so that during all up counting rotations there will be no engagements of the enlargement 112 with the leaf contact, and thus no change of circuits attendant thereon.

The rock rod 106 also carries the hook element 120 having the sharp hook 121 which faces in direction to be engaged by the shoulder 113 of the block 111 just at the zero position of the counter. Thus, any tendency for the counter shaft to ride past the zero position when counting downwardly will be effectively resisted, since the holding ability of such hook when engaged with the shoulder will resist any such possible tendency. Since the hook 120 is carried by the rock rod 106 it is seen that said hook will move into position to be engaged by the shoulder shortly prior to completion of the final shaft rotation in the counting down direction, but will be rocked out away from the path of rotation of the shoulder during all shaft rotations other than during the final portion of the final rotation, so that improper interferences between the hook and the shoulder will be avoided.

The foregoing description is typical of the means to control zeroizing of each of the counters which is provided with zeroizing means; and therefore duplicate descriptions of the other zeroizing counters are not deemed needful. It is here noted, however, that in each of the embodiments of my invention illustrated herein I have provided such zeroizing means for each of the counters, either for gallons or for amount of purchase, of such embodiment, and the corresponding supplemental counter. That is, in the case of pre-setting the amount of purchase counter and the supplemental counter, there is provided such a zeroizing means for such supplemental counter and also for the amount of purchase counter; whereas in the case of pre-setting to specified gallons, there is provided such a zeroizing means for the gallons counter, and another such zeroizing means for the corresponding gallons supplemental counter. The desirability of such provisions will appear hereinafter when the electrical circuits are considered.

THE RE-SETTERS FOR THE COUNTERS

Figure 9:
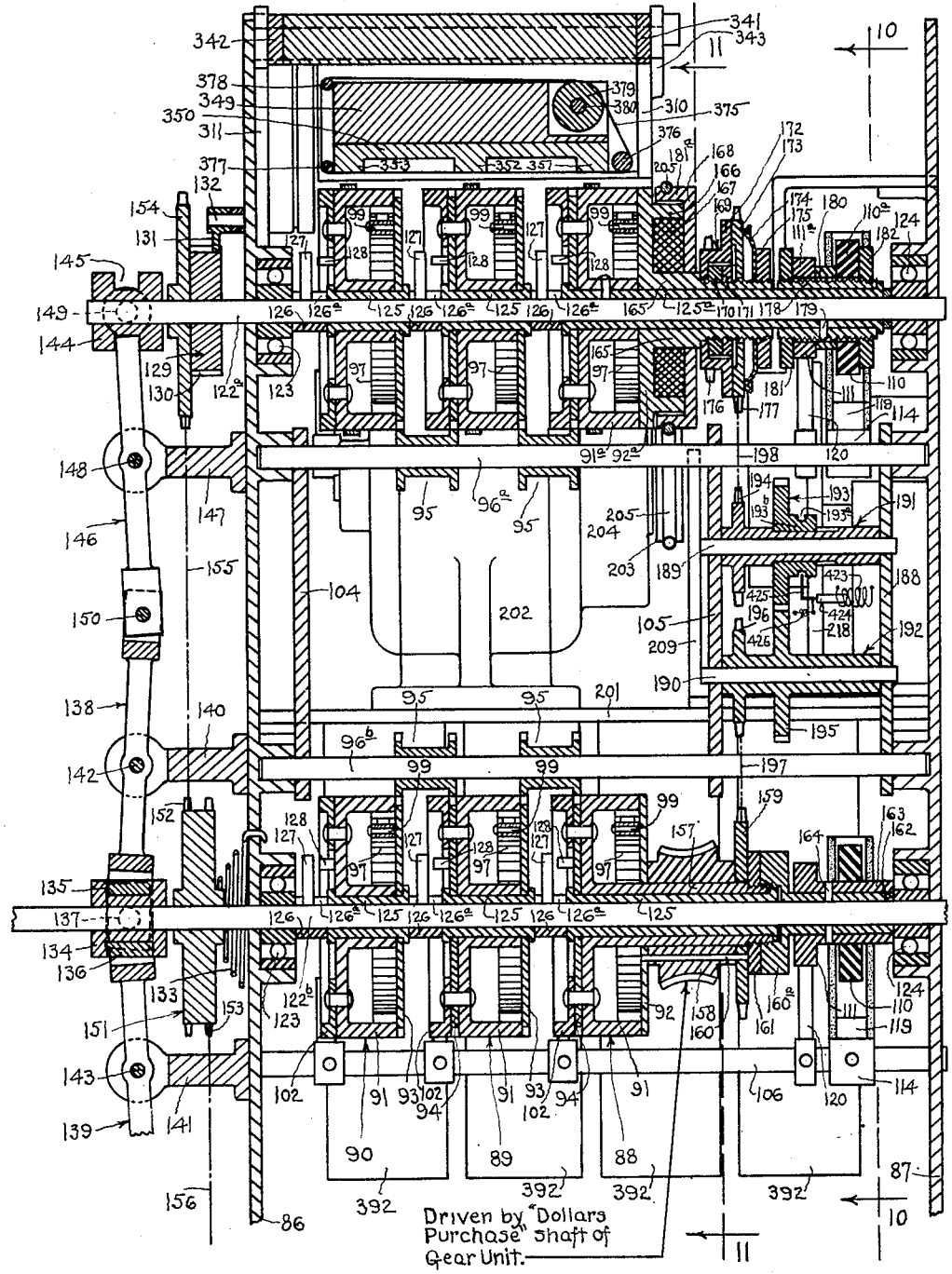
Figure 9 shows a vertical section taken on the lines 9—9 of Figures 6, 7, 10 and 11, looking in the directions of the arrows; the re-setting elements being in their normal or un-operated position; and this figure shows the adjustable friction drive from the meter driven shaft to the "Pre-Pay" counter drive shaft.

Provision is made for re-setting each of the counters to zero prior to commencing a new dispensing operation. Referring to Figure 9, each of the counters is carried by a shaft or rod 122 whose end portions are journalled in the ball bearings 123 and 124 carried by the side plates 86 and 87, respectively. Conveniently the shafts 122 for the conventional counter (either dollars and cents or gallons) and for the supplemental operations, are designated as 122$^a$ and 122$^b$, respectively. Description of the re-setting means for one counter is as follows:

The elements comprising each orders unit, being the cylindrical element 91, the right-hand disk 92 for the units order, the carrying disks 93 and 94, and the zeroizing disk 102, are carried as a group by a short tubular element 125, which in turn is journalled on the shaft 122$^a$ or 122$^b$, the ends of these tubular elements being riveted as shown in Figure 9 so as to retain the elements of the unit together, but such riveting is effected loosely, without jamming or binding the several elements together.

Short tubular spacers 126 are set on the shaft 122$^a$ or 122$^b$, as the case may be, and against the ends of the several elements 125, so as to retain all of the orders units in proper spacing along the shaft. These spacers are slotted lengthwise as shown at 126$^a$, and radial pins 127, secured to the shaft adjacent to the left-hand portions of the respective orders units, extend out through such slots and adjacent to the left-hand faces of the several orders units. Each of the left-hand elements of each orders unit is provided with a leftwardly extending stud 128 which will be engaged by the corresponding radial pin 127 when the first is first drawn towards the right in Figure 9; but when said shaft stands in its leftward or normal position, as shown in said figure, these pins 127 lie to the left of said studs 128, so that each orders unit is then free to rotate without interference from such pins 127. It is here noted that each shaft 122$^a$ or 122$^b$ is free to be shifted endwise sufficiently to bring its pins 127 into planar registry with the corresponding studs, when a re-setting operation is to be effected; but normally the shaft stands in its leftward position as shown in Figure 9.

By drawing one of the shafts towards the right sufficiently to bring its pins 127 into registry with the corresponding studs 128, and then rotating the shaft slightly less than 360 degrees, each pin 127 will pick up its stud 128 at some portion of such rotation, and carry said stud along during the remaining portion of the rotation, to thus re-set the orders unit to zero, it being noted that each stud 128 connects directly to the cylindrical element 91 of its orders unit. During this re-setting operation the shaft will generally be rotated forwardly, that is, in the same direction as up counting is effected; and as each orders unit is picked up and carried forwardly it will act on the carrying elements in normal manner, if need be. Due to the fact that each of the right-hand disks 92 (or 93) is drivingly connected to its cylindrical element 91 through the medium of the pawl 98 engaging the teeth 97, any necessary relative movement between the disk and the cylindrical element during such re-setting operation, will be properly accommodated, and each orders unit will be restored to its exact zero position at conclusion of the rotation or sweep of the shaft. Thereupon the shaft may be allowed to move leftwardly, out of alignment of the pins 127 with the studs 128, and then the shaft may be allowed to return rotatively backwardly, to its initial position.

In order to ensure a complete re-setting operation, and to avoid partial re-setting to zero of any orders unit, I have provided a "full-stroke" device in connection with the re-setting mechanism. This full-stroke device includes the disk 129 secured to one of the shafts 122, and provided around its edge with fine teeth 130; together with a dog 131 journalled on the pin 132 extending leftwardly from the plate 86, said dog being provided with a sharp edge to engage the teeth. The teeth on the disk are mutilated at the location where the dog registers with such teeth when the shaft has been returned to its normal position (unrocked), so that in this position the rotation of the shaft can be commenced in either direction; but when such rotation has been started it must be carried to conclusion, through approximately 360 degrees. Therefore, when a re-setting operation is commenced, the shaft rotation must be carried through substantially a full rotation, thus ensuring complete re-setting of all orders units, before return of the shaft to its zero or normal position can be started. It is noted that since the shaft 122 must be shifted endwise as already explained, I have shown the disk 129 as being of sufficient width to accommodate such endwise movement, while ensuring engagement of the dog with the teeth for all such endwise movements.

From the explanation previously given it is seen that I provide, in addition to the "Amount of Purchase" counter or the "Gallons Delivered" counter of conventional stands, a supplementary counter, either for dollars and cents or for gallons, as the case may be; and it is further evident that such supplemental counter is pre-set to such amount, either dollars and cents or gallons, as may be specified by the purchaser, both of the counters having been previously re-set to zero positions. During such pre-setting to such specified amount position, of the supplemental counter, the conventional counter remains in its zero position. Then as liquid is delivered the conventional counter's reading will increase, and the supplemental counter's reading will decrease until the delivering operation is completed. If the operation is carried to its entirety the supplemental counter will come to its zero position, and at the same time the conventional counter will come to a reading of value the same as the pre-setting to which the supplemental counter had been set. Under these conditions the supplemental counter will read zero for all of its orders disks, and no re-setting to zero will actually be needed prior to commencing a new delivering operation. Nevertheless, the conventional counter will have to be re-set to zero, so that such a re-setting operation will be needed.

In case the delivery of liquid should be terminated prior to delivery of the full amount for which the supplemental counter had been pre-set it is evident that both counters would require re-setting to zero positions prior to commencement of a new delivering operation. Thus, provision must be made for re-setting both counters to zero; and I have made provision to ensure this result in each case, and by a single re-setting movement by the operator, and without special operations on the part of the operator. In this connection, it is also noted that when the conventional counters for "Gallons" and for "Amount of Purchase" are both provided, as is presently customary, both of these counters must be re-set to zero before beginning a new operation. Therefore, it is necessary to re-set three counters to zero, namely, both of such conventional counters, and the supplemental counter herein referred to. In order to ensure such re-setting of all counters to zero by a single operation, and simultaneously, I have provided the following mechanisms:

In the arrangement of Figures 1 to 31, inclusive, the manual re-setting element is connected to the shaft 122$^b$ for the conventional "Amount of Purchase" counter. This means is shown as comprising the crank 81 connected to the shaft 122$^b$ by a connection such that said shaft may be drawn towards the operator (towards the right in Figures 1 and 2), and such that when thus drawn to the right said crank may be given a full turn clockwise (when viewed as towards the right-hand side of the stand). A spiral spring 133 is provided at the left hand end portion of the shaft 122$^b$, one end of said spring being connected to said shaft and the other end connected to the side plate 86. This spring is placed under some degree of pre-tension so that the spring will ensure complete return of the shaft to its zero position, at which position its rotation may be arrested by a pin or otherwise (not shown). This spring is also of such form that it will always urge the shaft toward the left, thus tending to carry the pins 127 away from registry with the orders studs 188.

Figure 7:
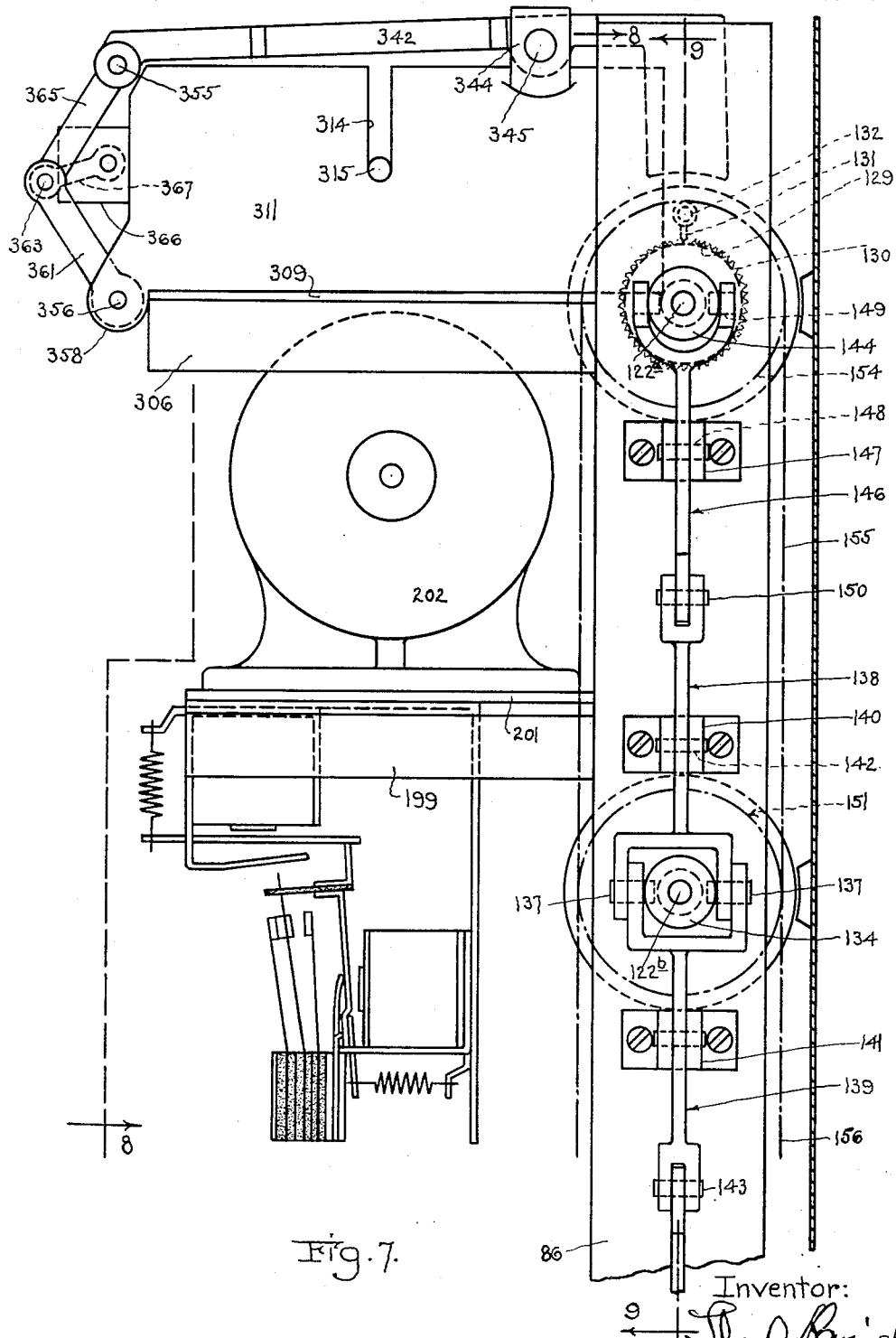
Figure 7 shows a left-hand side elevation corresponding to Figures 3, 4, 5 and 6.
Figure 8:
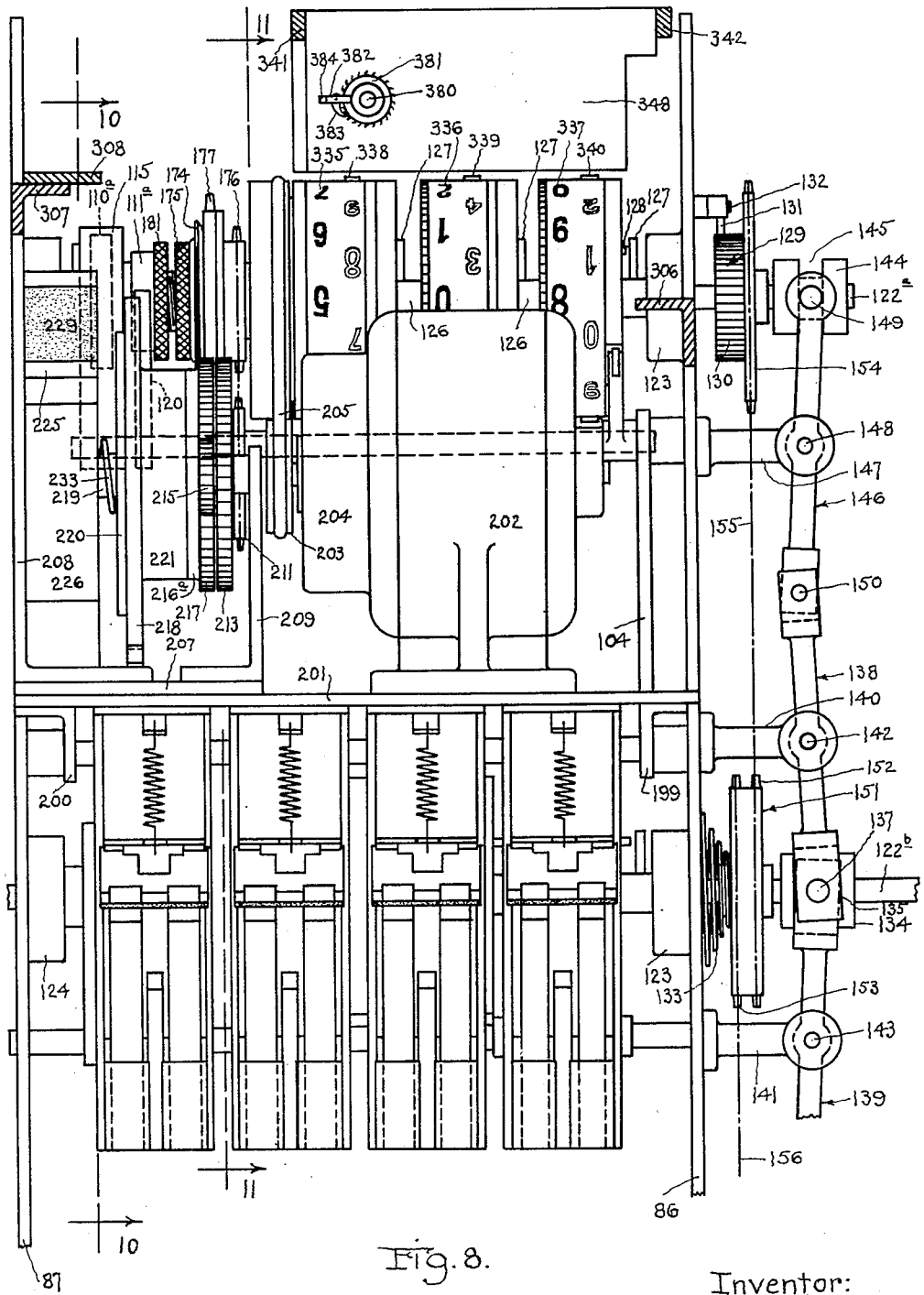
Figure 8 shows a vertical elevational section taken substantially on the lines 8—8 of Figures 4, 7, 10 and 11, looking in the directions of the arrows.

Interconnections are provided between the shaft 122$^b$ and both of the shafts 122$^a$ for the supplemental counter, and 122$^c$ (for the conventional counter, already referred to). In the arrangement shown such interconnections include the following elements; A collar 134 is secured to the shaft 122$^b$, said collar being provided with the encircling groove 135 into which is set the ring 136 having the laterally extending studs 137. The lever elements 138 and 139 are pivoted to the brackets 140 and 141 projecting leftwardly from the side plate 86, on the pivotal pins 142 and 143. The shaft 122$^a$ is provided with a collar 144 having the encircling groove 145; and a second lever 146 is pivoted to a bracket 147 extending leftwardly from the side plate 86, such pivotal connection being shown at 148. The upper end of this lever is forked as shown in Figure 7 and is provided with the studs 149 which set into the groove 145. The proximate ends of the two levers 138 and 146 are connected together by a pin 150, the end of one lever being forked to receive the end of the other lever, and the pin openings being slightly enlarged vertically to take care of such angularity as may be necessary, due to the slight rocking of the levers in use. The shaft 122$^c$ for the third or other conventional counter is connected to the lever 139 by means similar to that just described for connection of the shaft 122$^b$ to the shaft 122$^a$, so that right and left hand directional movements are communicated simultaneously to all three shafts.

The shaft 122$^b$ carries a sprocket 151 of double width, and having the two sets of teeth 152 and 153 for two chains. The shaft 122$a$ carries the sprocket 154 which lies in alignment with the set of teeth 152, so that a chain 155 may drivingly connect the shafts 122$^b$ and 122$^a$ together. The shaft 122$^c$ is provided with a sprocket having teeth in alignment with the teeth 153 of the sprocket 151, and a chain 156 drivingly connects the sprocket 151 with the sprocket on said shaft 122$^c$. It is to be noted that since all three shafts move endwise in harmony and by equal amounts of movement, the sprockets will retain proper alignment with each other, and the chains may thus effect rotary drive from the shaft 122$^b$ to both of the shafts 122$^a$ and 122$^c$ for re-setting purposes when the shafts have been moved to the right. Furthermore the single spring 133 will effect return of all shafts to their initial or normal positions, both endwise and in rotary direction.

The conventional counter (either "Amount of Purchase" or "Gallons," as the case may be) is driven directly by the shaft or connection 76 from the meter or the gear ratio change unit 74, as the case may be. In the arrangement of Figures 1 to 31, this conventional counter is the "Amount of Purchase" counter. Referring to Figure 9, and other figures, the units order unit cylindrical element 91 is provided with the rightwardly extending sleeve 157 which works nicely on the tubular element 125. The spiral gear 158 works freely on this sleeve 157, the sprocket 159 is placed at the right-hand end of this spiral gear, and both the spiral gear and said sprocket are connected to the right-hand disk 92 of the units order unit by the pin 160 so that all three of said elements are retained at all times in permanent angular fixed relationship. These elements also work freely on the sleeve or tubular element 125. The right-hand end of the sleeve 157 is threaded. A block or nut 160ª of cap form is threaded onto this end of the sleeve 157, and preferably a lock nut 161 is also located inside of such block 160ª and is then threaded backwardly to lock said block securely to the sleeve. This block 160ª is provided with the rightwardly extending sleeve 162. The zeroizing lock block 111 is provided with the sleeve 163 which works or is set onto the sleeve 162 and is pinned thereto by the pin 164, and the zeroizing insulating block 110 is rigidly mounted on the sleeve 163. Thus both said zeroizing lock block and said zeroizing contact block are locked to the cylindrical element 91 of the units order unit, and likewise both of said elements are locked to the zeroizing shallow cylindrical element 102 of the units order unit. Accordingly, the proper zeroizing relations are produced between all of these parts. The drive from the units order disk to the units order elements just referred to is of course effected through the medium of the pawl 98 engaging the teeth 97, as shown in Figure 24 and as already explained.

THE DRIVE FOR THE UNITS ORDER DISK OF THE PRE-PAY COUNTERS

With the foregoing arrangement the following further comments are in order:

During normal forward drive due to rotation of the meter shaft (or the shaft 75 for dollars and cents), the spiral gear 158 is being driven forwardly, and due to the fact that this gear is pinned directly to the disk 92 of the units order and to the sprocket 159 it is evident that both of the units order element and the sprocket are driven forwardly proportionately to gallons or dollars and cents, as the case may be. Also, that the proper relationship is always maintained between the cylindrical element 91 for the units order and the zeroizing elements, and such latter relationship is always maintained, even when the relationship between the disk 92 and the cylindrical element 91 is modified due to any re-setting operation. It is also evident that during re-setting operations the cylindrical element 91 is advanced (if need be), to bring such element to its zero position, without having to forcibly advance the gear 158; and this is important since that gear is at all times in direct connection with the meter shaft or the shaft 75 from the gear ratio change unit. Such advancement will occur by movement of the teeth 97 of the cylindrical element 91 past the dog or pawl tooth 101 (see Figure 24).

Considering now the supplemental counter element, as shown at the upper part of Figure 9 the cylindrical element 91 of said counter is pinned to the corresponding sleeve 125ª which reaches over a considerable distance to the right. Mounted on the said sleeve 125ª is the disk element 92ª for the units order of this supplemental counter, with a nice fit but without locking the parts together. This disk element 92ª is provided with the sleeve 165 which extends to the right over part of the length of the sleeve 125ª, and fits nicely on said sleeve but is free to rotate with respect thereto. The disk 92ª is also provided with a circular flange 166 which extends to the right far enough to provide an annular coil receiving space for accommodation of the coil 167 of an electromagnetic clutch, presently to be described in further detail. Just beyond the said flange 166 is located the disk element 168 which is free to rotate with respect to the flange 166, and with respect to the sleeve 165, until the coil is energized by flow of current therethrough, whereupon said disk element 168 is strongly drawn against the flange 166 to establish an electromagnetic drive from the disk to the flange as long as such current is sustained. Immediately upon discontinuing current supply such engagement is terminated and the parts are again free to rotate with respect to each other. The purpose and function of this arrangement will appear presently.

Just beyond the location of the disk element 168 the sleeve 165 is shouldered, and beyond such shoulder said sleeve is threaded. A cup shaped element 169 is set over such threaded sleeve portion and against such shoulder, and the two nuts 170 and 171 are then threaded tightly onto the sleeve to lock such cup shaped element to the sleeve. This cup shaped element 169 is provided with the radially extending flange 172 which lies slightly to the right of the nuts 170 and 171, so that a disk element 173 may be firmly pressed against the right-hand face of the flange 172, to thus provide a friction drive from the disk element 173 to the flange, and thus to the cup-shaped element 169, and from the latter to the sleeve 165 and thus to the units disk element 92ª. This friction drive is effected by the cup shaped spring element 174, set against the right-hand face of the disk element 173, and brought to adjusted frictional engagement by the nut 175 threaded onto the sleeve 165. This cup shaped spring element is preferably slotted radially at several locations, so as to improve its spring quality, in well understood manner. The cup shaped element 169 is provided with sprocket teeth 176 on its outer cylindrical surface; and the disk element 173 is provided with sprocket teeth 177 on its periphery, as shown in various figures. Here is may be stated that the sprocket 177 is driven from the sprocket 159 of the conventional counter section, during delivery of liquid, but such drive is in reverse direction, the supplemental counter counting down as the conventional counter counts up during liquid delivery. The frictional drive effected through the medium just above described is at all times sufficient to effect such driving action to the supplemental counter, even to cause said counter to carry through all of its numerical orders; but still said friction drive is not great enough to prevent necessary pre-setting operations to be performed prior to commencing liquid delivery. Such presetting operations include the rotation of the sleeve 165 and the cup-shaped element 169 and flange 172 while the shaft of the meter is stationary since such pre-setting operations occur while no liquid is being delivered. Also the meter shaft 58 is capable of developing sufficient torque due to flow of liquid through such meter for delivery of liquid when the nozzle is open, to cause the train of sprockets and chains, including the sprocket element 173 to rotate, even though the "Prepay" counter may be locked at its zero position. Such rotation of the sprocket 173 must then be against the drag caused by the friction caused by the adjustable disk spring element 174 under setting of the nut 175. Such a special operation might occur when the stand was being used for "Non-Automatic" operation under control of the special emergency key lock 422. This operation will be explained more fully hereinafter, and in that later explanation I shall show means to break the driving connection from the meter shaft to the sprocket 173 during such "Non-Automatic" operation. That is, it is possible to drive the cup shaped element 169 during pre-setting operations, without backward drive of the sprocket 159 of the conventional counter, or, for that matter, without drive of the sprocket disk element 173 at such time, the friction drive slipping during such operations.

A short sleeve 178 is nicely mounted on the right-hand portion of the sleeve 125ª, and beyond the location of the sleeve 165, and said sleeve 178 is drivingly connected to the sleeve 125ª, as by the pin 179. The outer surface of this sleeve 178 is threaded, and the zeroizing blocks or disks 111ª and 110ª are non-threadingly set onto this sleeve with a suitable ring shaped spacer 180 between them, as shown in Figure 9. End nuts 181 and 182 are threaded onto the sleeve and press the elements just referred to tightly together, so that, in effect the zeroizing disks or blocks are locked to the sleeve 125ª, and thus to the cylindrical element 91ª of the units order unit.

Thus the needed relation between the zeroizing elements and the cylindrical element of the units order unit is maintained.

At this point it should be mentioned that the pre-setting arrangement for the supplemental counter shown in Figures 1 to 31 is one in which such pre-setting is effected automatically according to the coins which have been inserted into the stand, and furthermore, that in such arrangement the pre-setting operation is effected by a small motor and under various controls, including control effected through the medium of the electro-magnetic clutch already referred to. The flange or disk element 168 is provided with the cylindrical flange 181$^a$ which is grooved to receive a light driving belt driven by the motor, presently to be described, and said element 168 may be continuously driven by such motor, as long as the pre-setting process is going on, but drives from the element 168, as thus continuously driven by the motor, to the disk element 92$^a$ of the units order element or unit, will occur only when the electro-magnetic clutch is energized, and as long as such energization continues for each pre-setting operation or advancement of the counter. The details of these controls will appear presently. The coil 167 of the electro-magnetic clutch is carried by the disk element 168 and rotates with the same. I have provided the thin insulating circular plate 183 on the right-hand face of the element 168, which insulating plate carries the two slip rings 184 and 185 whereby current is supplied to said coil, the brushes shown schematically at 186 and 187 in Figure 11, engaging such slip rings and supplying current to them.

It has been mentioned that drive is made from the sprocket 159 to the sprocket teeth 177, but in reverse direction, during delivery of liquid. This reversal of direction of drive is needed because during delivery of liquid the conventional counter counts up, whereas the supplemental counter counts down towards zero, so that the pre-selected amount or value of liquid will be delivered. The plates 104 and 105 are supported by the rods 96$^a$ and 96$^b$. A third plate 188 located at the right-hand side of the unit, and also carried by the rods 96$^a$ and 96$^b$ is provided. The short rods 189 and 190 are extended between the plates 105 and 188, and are located in vertical alignment with each other. The gear and sprocket units 191 and 192 are journalled on these rods 189 and 190; the unit 191 includes the gear 193 and the sprocket 194, and the unit 192 includes the gear 195 and the sprocket 196. The gears 193 and 195 are of the same size and pitch diameters, and they mesh directly together, to thus reverse direction. The sprocket 196 is driven from the sprocket 159 by the chain 197; and the sprocket 194 drives the sprocket 177 by the chain 198. The sizes of the sprockets are such that the drive ratio between the sprocket 159 and the sprocket 177 is one to one, so the supplemental counter elements are driven at the same rate as the conventional counter elements, but in reverse direction during liquid delivery. During pre-setting of the supplemental counter to the prescribed amount of gallons or dollars and cents, as the case may be, said counter must be rotated in forward or increasing reading direction, from its zero position, and due to the just described drive between the two counters such forward driving of the supplemental counter during pre-setting would require corresponding backward drive of the conventional counter. At the time of pre-setting the supplemental counter just referred to the conventional counter has been re-set to its zero position, and therefore its hook element 113 is engaged with its disk or block 111, so that backward rotation of the conventional counter is prevented. Furthermore, the drive shaft or connection to the meter or to the gear ratio change element would resist such backward rotation of the conventional counter. The friction or slip drive connection betwen the units orders unit of the supplemental counter and the sprocket disk 173 enables the needed pre-setting of the supplemental counter without need of movement of the conventional counter from its re-set zero position during such pre-setting operation.

Extending rearwardly from the two plates 104 and 188 which are supported by the rods 96$^a$ and 96$^b$ are the horizontal bracket arms 199 and 200 which support the plate 201 on which certain elements now to be described are carried. This plate, and such elements are thus carried rearwardly of the counters.

Figure 11:
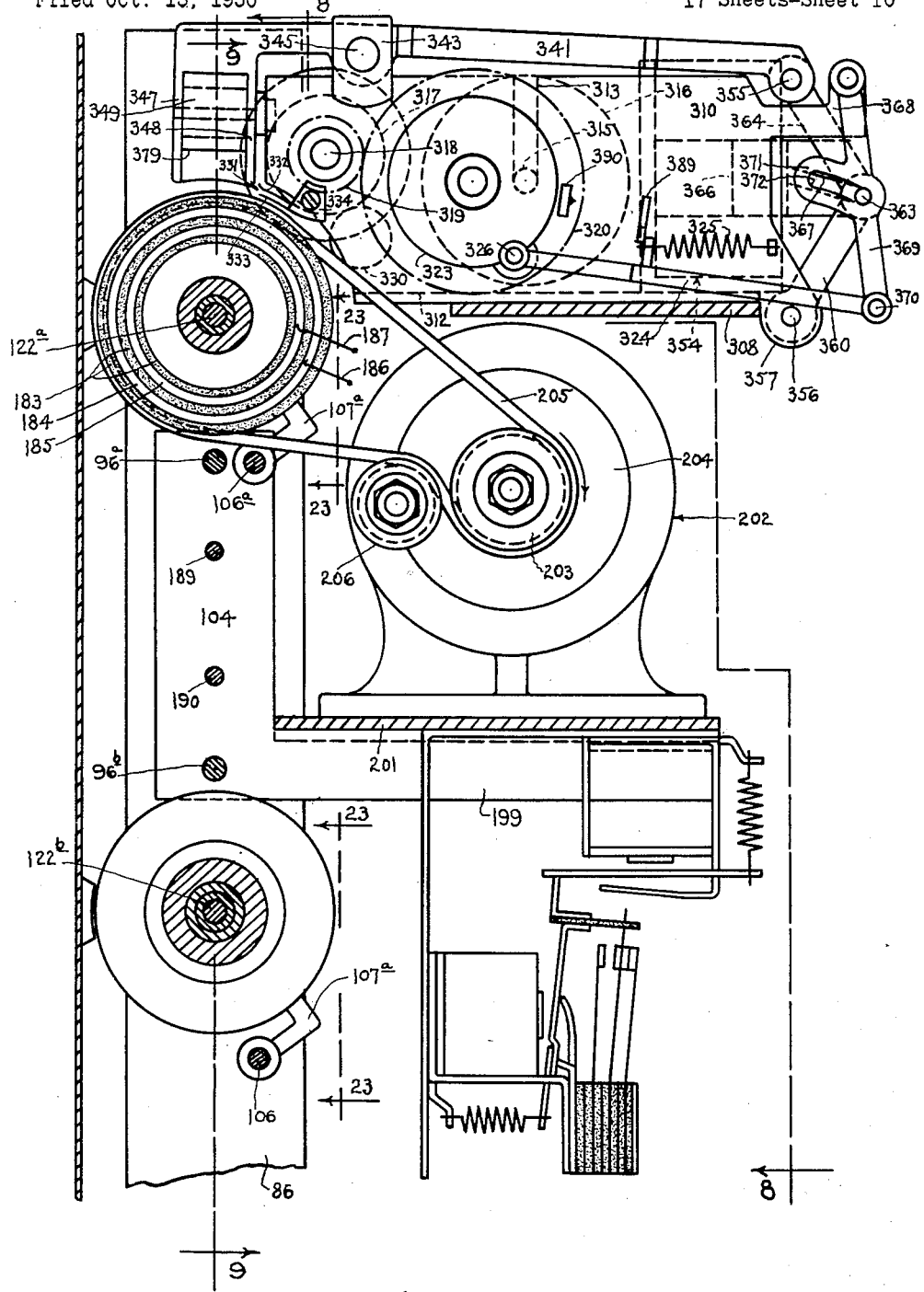
Figure 11 shows a vertical cross-section taken on the lines 11—11 of Figures 3, 4, 5, 8 and 9, looking in the directions of the arrows.

A small motor 202 is carried by this plate 201 with its pulley 203 in alignment with the groove of the flange 181$^a$. This motor carries the drive pulley 203 in alignment with the motor armature, but conveniently a gear reducer element, enclosed within the section 204 is included in the motor drive unit, so that the rate of pulley operation is slowed to a value which can be conveniently transmitted directly to the flange 181$^a$ by means of the small belt or cord 205. Examination of Figure 11 shows this drive in side elevation, and it will be noted that there is provided the guide pulley 206 for the lower run of the belt. This guide pulley carries the lower run of the belt high enough to allow the belt to pass above the rods 96$^a$ and 106, and at the same time serves to increase the angular embracement of the belt running over both the pulley 203 and the flange 181. Thus the slip of the belt will be reduced.

As will presently appear, when the completely automatic coin pre-setting apparatus herein disclosed is used the motor is brought into operation at commencement of the pre-setting operation, and said motor runs continuously until the pre-setting operation has been completed, at which time supply of current to the motor is discontinued. The electro-magnetic clutch already referred to is alternately engaged and disengaged during the pre-setting operations, as will presently appear.

The electro-magnetic clutch element, and the motor drive already referred to are provided and used when the pre-setting of the supplemental counter is effected automatically, and corresponding to coins inserted into the machine, as will soon appear. However, it is noted that essentially the devices already disclosed include the conventional counter and the corresponding supplemental counter which may be pre-set to the specified reading, together with interconnections between these two counters such that they operate in opposite directions during liquid delivery, and the zeroizing means for said counters. In the embodiment shown in Figures 32 to 35 inclusive I have shown a simple arrangement in which the supplemental counter is pre-set manually, whether it reads according to gallons, or according to amount of purchase, said figures showing, specifically, an arrangement in which said counter reads according to gallons. I shall now describe further elements and arrangements of the embodiment of Figures 1 to 31, inclusive, including the fully automatic coin operated pre-setting apparatus.

Included in the elements now to be described are means to classify and separate coins of different denominations, such as quarters, half-dollars, and silver dollars, means to permit controlled release of such classified and separated coins, one at a time until all coins have been individually released, means to signal release of each coin, together with means to signal the denomination of each such released coin, means to control operation of the electro-magnetic clutch for each coin so released and accounted for, and means to ensure that said clutch will be functioned each time for an amount of counter pre-setting movement corresponding to the denomination of the corresponding released coin.

THE PRE-SETTING CONTROL FOR THE PRE-PAY COUNTER

Referring to Figures 12 to 18, inclusive, I have therein shown a form of selector unit which will ensure clutch control and operation for an amount of movement of the counter accurately corresponding to each coin released. This unit includes a base plate 207 on which is mounted a vertical right-hand plate or bracket 208, and a left-hand bracket 209. A stud or rod 210 extends between said brackets, and said stud may be non-rotatable, as indicated. A sprocket 211 is journalled at the left-hand side of the rod 210; and when this selector unit is in place on the plate 201 this sprocket aligns with the sprocket 176 carried by the cup-shaped element 169 (see Figure 9). Since the said cup-shaped element and said sprocket 176 are secured to the right-hand disk 92$^a$ of the units order unit of the supplemental counter, it follows that whatever amount of rotational movement of said sprocket 211 occurs, a proportional rotational movement of the units order disk 92$^a$ must also occur. Since the disk 92$^a$ drives the units order unit of the said counter, it follows that said counter will be advanced in the pre-setting direction by an amount proportional to the rotation of said sprocket 211.

A pinion 212 is provided at the right-hand side of the sprocket 211, these two elements conveniently forming a unit. This pinion 212 drives a gear 213 journalled to the stand 209 on the stud 214; and a pinion 215 is located at the side of the gear 213, said gear and pinion constituting a unit journalled on the stud 214. A gear 216 carrying an armature of magnetic material 216$^a$ is journalled on the rod 210 adjacent to the unit 211—212, said disk 216 being provided with the peripheral gear teeth 217. Thus the gear and pinion 213—215 constitutes in effect a back gear reduction from the sprocket 211 to the armature 216$^a$. The purpose of this gear reduction and its ratio will presently appear.

A cam disk 218 is provided with a short hub 219 which is journalled on the rod 210, said disk being provided with a circular cam dwell 220 facing to the right, and shown in Figure 16. A circular element 221 of magnetic material is secured to the left-hand face of this disk, adjacent to the armature 216$^a$; and this element 221 is provided with a leftwardly facing annulus within which is seated the magnetizing coil 222. Accordingly, the energization of this coil serves to magnetize the parts and lock the armature 216$^a$ to the element 221, and thus to the disk 218, and therefore the disk 218 with its cam dwell will rotate by an amount proportional to the rotation of the sprocket 176 and only as long as current is maintained in the coil 222. In other words, by energizing the coil 222 the cam disk and the units order disk 92$^a$ will be locked together, and will rotate together, such rotation continuing as long as the coil remains energized, and the disk 218 and the units order disk rotating at a specified ratio, as determined by the relative sizes of the two sprockets and the back gear ratio of the selector unit.

The left-hand face of the bracket 208 is provided with four sockets 223, 224, 225 and 226 in which are set four microswitches 227, 228, 229 and 230, respectively. These microswitches correspond to signals for zero, a quarter, a half-dollar, and a silver dollar, respectively. Each of these microswitches is provided with a flexible leaf carrying the button 231. Each such microswitch is provided with two opposing contacts between which a biased spring leaf may flex, said biased spring leaf being operated by the button 231. The arrangement is such that when said button is released the biased spring leaf will flex in one direction to normally engage the corresponding stationary contact, whereas by depressing such button slightly the biased spring leaf is suddenly reversed with a snap action, thus carrying its contact from the previously engaged stationary contact and into engagement with the previously non-engaged contact. Such microswitches are very extensively used at the present time, and are of various detailed forms.

The cam disk 218 is so located that normally the dwell thereof, 220, will engage the buttons of the microswitches, to retain them pressed inwardly, with their contacts correspondingly engaged; but said dwell is provided with a mutilated section 232. When such mutilated section 232 comes to the position of a microswitch, the contacts of such switch are reversed, and a signal may be given of such registry, provided other circuit elements are simultaneously in correct conditions to receive and translate such signal. Said mutilated section 232 is so located that just as the disk returns to its zero position the microswitch 227 reverses contacts, thus signalling the "Zero" position.

A spring 233 is provided which urges the disk 218 back to its zero position, and a stud 234 carried by the edge of said disk engages a stop 235 extending upwardly from the base plate in position to arrest the returning movement of the disk exactly at its zero position. Thus, as soon as the coil 222 is de-energized the disk is released and very quickly returned to its zero position where it will remain until the coil is again energized under proper conditions.

At this point I will mention that circuit arrangements and relays and other elements are provided whereby the changing of position of any one of the microswitches 228, 229, or 230, a corresponding coin having signalled its release and discharge for counting, will actuate proper relay and other elements to discontinue the pre-setting movement of the supplemental counter, which movement was instituted for an amount of pre-setting corresponding to such coin so released. Since the disk 218 will be rotated an amount proportional to the corresponding movement of the units order disk 92$^a$ of the counter, it follows that by so locating the several microswitches 228, 229, and 230 that they will be reversed by oncoming of the mutilated section 232 at proper positions, the amount of counter pre-setting which will occur for each released coin will be correct, and the disk 218 will be released for quick return to its base position, ready for another measuring operation, corresponding to the next coin released.

I will also here mention that said circuit and other arrangements are such that when a coin of given denomination is released, whether a quarter, a half-dollar, or a silver dollar, the corresponding microswitch, 228, 229, or 230, as the case may be, is brought into circuit, so that the terminating action just referred to will be correct for such coin of such denomination. The details of such arrangements will appear hereinafter.

I will here mention, also, that the de-magnetizing of the clutches for the selector and for the units order disk of the supplemental counter occur simultaneously, and likewise their energizations occur simultaneously. It is noted that since the sprocket 211 is locked to the element of the units order of the supplemental counter, said sprocket 211 must retain its advanced position, corresponding to whatever amount of pre-setting has thus occurred, while the disk 218 of the selector unit must return each time to its zero position, after pre-setting for each coin counted. Such returning movements may be effected very quickly by the spring 233 since the rotational inertia of the disk 218 and connected parts may be made very small. It is also noted that since that disk (and the coil 222) never make more than a full rotation (actually not over 300 degrees), and always return to zero, the required electrical connections to said coil may take the form of short flexible connections, and slip rings and brushes are not needed for this purpose.

In order to improve the magnetic qualities of the electro-magnetic clutch of this selector, and especially when using alternating current supply, I have shown the armature 216$^a$ as provided with the closed circuit grooves 236, 237, 238 and 239 (see Figure 17) in which are seated the low resistance closed circuit rings 240, 241, 242 and 243, so that when rapidly changing the magnetic flux a current lagging effect will be produced, thus improving the operation, in well understood manner.

Referring to the gear ratio produced between the sprocket 176 of the units order element of the counter, and the cam disk 218 of the selector, it is noted that said disk 218 should not make as much as a complete rotation for pre-setting corresponding to the coin of greatest denomination (a silver dollar), since improper and duplicate operations of one or more of the microswitches would be produced. Furthermore, that under customary counter arrangements the units order element will count and indicate ten digits for one complete rotation, each digit corresponding to one cent. Accordingly, ten revolutions of the units order element must occur corresponding to addition of one silver dollar into the counter. This means that, if the disk 218 of the selector be allowed to perform one complete rotation for the pre-setting of a silver dollar, the gear ratio must be ten to one, that is, a reduction of rate of rotation of that ratio. Actually, since it is desired to effect the selection of the silver dollar by rotation of the disk 218 in amount less than one full rotation (actually within 300 degrees of rotation), the gear ratio must be greater than ten to one, and is shown in the drawings as being about twelve to one. In Figure 15 I have shown by the lines 244, 245, 246, and 247 the cut-off points for the four microswitches. The angular embracement between the lines 244 and 247, reading in the additive direction, is 300 degrees.

It is here to be noted that since the disk 218 is locked to the units order disk 92ª (through the sprocket and chain drive), these parts will retain their exact proper relations during pre-setting operations, and irrespective of any slip or creep which may occur in the belt drive from the motor to the element 181ª.

THE COIN-SELECTOR, CLASSIFIER, AND SIGNALLING UNIT

Reference may now be had to Figures 25 to 30, inclusive as illustrating a form of coin selector, classifier, and signalling unit suitable for use in the present dispensing apparatus. In this arrangement all coins which are to be prepaid may be inserted through a common slot or opening (or through several such openings corresponding to the several coin denominations). I shall now disclose means whereby, when the coins are all inserted through a common opening they are first automatically sorted or classified, according to their denominations. This arrangement is such that all coins of each denomination are brought into a corresponding sub-chute; for example, all quarters are brought into a "quarters" chute, all half-dollars are brought into a corresponding chute, and all silver dollars are brought into a corresponding chute. This sorting or classifying operation may occur as the various coins are inserted by the purchaser. As the various coins collect within their several chutes they are locked against delivery from such chutes until the coins have all been inserted and thus sorted. When the purchaser has inserted such coins as he desires, aggregating such "Amount of Purchase" as he may wish, the operation is ready for start. Such start is caused by depression of the "Starting Button" by the operator. Thereupon the delivery and counting of the several coins will proceed, with corresponding pre-setting of the supplemental counter as each coin is released, by an amount corresponding to the denomination of such coin. Conveniently, all coins of a given denomination are first released, one at a time, with corresponding pre-setting operations; then all coins of another denomination are released, one at a time, with corresponding pre-setting operations; and finally all coins of the third denomination are released, one at a time, with corresponding pre-setting operations. In the arrangement herein illustrated, I first release and pre-set for the quarters, then for the half-dollars, and finally, for the silver dollars.

When the "start" is made, the first quarter is released, through an escapement mechanism which permits release of only a single quarter. As such quarter passes away from the escapement mechanism it passes a microswitch or other suitable switching element, which sets proper relays or the like to bring the selector already described to come into use, and also to energize the two clutches by energizing the two coils 167 (Fig. 9) and 222 (Fig. 14). (Also shown in Fig. 31.) Accordingly, the units orders element of the counter 92ª is advanced, with corresponding advancement of the selector, and such advancement continues until the cam disk 218 has come around far enough to release or change the microswitch 228, it being assumed that the first coin was a quarter. The operation of this microswitch 228 for quarters, serves to discontinue the energization of the clutches, and releases certain relays, and effects other operations such as to again function the escapement mechanism for the quarters chute. Then another quarter is released, and as it in turn passes the signalling microswitch of the sub-chute a second quarters signal is passed to the proper relays and other elements to again bring the pre-setting means into operation, with corresponding advancement of the counter a further amount corresponding to such second quarter. In like manner all additional quarters are released and pre-setting operations are correspondingly effected, until finally the quarters sub-chute has been emptied.

Each sub-chute includes a "detecting" microswitch in position close to the escapement of such sub-chute, which detecting microswitch will remain in one position as long as there are any coins in such sub-chute. When, however, the last coin has been released from such sub-chute this microswitch will change position, and re-establish various circuits so that when the pre-setting operation for such final quarter has been completed the return of the selector to its initial position will result in switching various circuits to such relations as to commence on the half-dollars sub-chute, with its escapement mechanism, its counting microswitch, and its detecting microswitch. As each half-dollar is released from this sub-chute proper operations will be effected to pre-set the counter each time by an amount corresponding to such half-dollar, and this progressive operation will continue until all half-dollars have been individually released and corresponding pre-setting operations have been effected. Then the detector microswitch of this half-dollars sub-chute will change position, and further operations will proceed for the coins in the silver dollars chute. Then each silver dollar will be counted, with corresponding pre-settings of the supplemental counter.

All coins may be indiscriminately inserted through the insert slot 248 (see Figure 1), said slot being of size sufficient to permit such insertion of the largest coin, for example, a silver dollar. As the coins are inserted they enter a flat channel shapped chute 249 (see Figure 27), which chute is slanted downwardly at such an angle that the coins will slide down at a rate not too fast to ensure correct selection or sorting as presently shown. The upper or entering portion of this chute is just wide enough to accommodate the largest coins, and preferably the top of this chute is closed, as shown at 250 in Figure 30, for example. At a suitable location downwardly along this main chute 249, there is provided an opening in the floor of such chute, 251, which opening is of width to just accommodate coins of the smallest size, for example, quarters. The side walls of the chute are retained at full separation from each other past this opening, so that the larger coins may pass along past this first opening; and the floor of the chute is also carried past this first opening, in the form of rather narrow ledges 252 and 253, as shown in Figure 26. With this arrangement all of the quarters will successively move down through the opening 251, but any half-dollars and silver dollars will not be able to enter such opening, due to their larger sizes, and such larger coins will be supported by the ledges 252 and 253, and will move on down along the chute.

At a further downward location there is provided another opening in the floor of the chute, 254, which second opening is of size to accommodate the next larger coins, namely, the half-dollars. These will move down through this second opening, but still larger coins, such as silver dollars, will not be able to enter this second opening, 254, and will be supported by the ledges 255 and 256 at the sides of such opening, and will pass on down for final disposition as a group. Thus, the various denominations of coins will be sorted and classified, and will be delivered through the individual classification openings.

I have shown the rather shallow dwells 257 and 258 just below the openings 251 and 254, so that the descent of each coin released through its proper opening will not be too sudden, and these dwell portions also slant downwardly at a sufficient rate to ensure continued downward movement of the coins. The lower ends of these dwell portions connect directly with corresponding sub-chutes 259 and 260 into which the quarters and half-dollars respectively, collect. The final or dollar portion of the main chute, 261, is also continued as the sub-chute for the silver dollars. Preferably all of these sub-chutes 259, 260 and 261 slant downwardly at an increased rate, but these sub-chutes are also preferably closed over their top portions, as shown by the section of Figure 30, and are each of height just sufficient to accommodate the thicknesses of the respective coins which they accommodate. Thus, as the separated and classified coins collect in these sub-chutes said coins will remain in a single layer, lying flat on the floor of the chute, and the successive coins will not be allowed to pile up on top of each other. Thus the coins collected in each sub-chute may be readily and accurately singled out and delivered by the several escapement devices presently to be described. Furthermore, the increased slant of the chutes provided for these sub-chutes, will ensure that an increased component of force will be developed by the coins tending to move them downwardly, and thus ensuring that they will actuate the several microswitches provided for the signalling operations.

In the lower portion of each sub-chute, 259, 260, and 261, there is located an escapement device, these being designated 262$^a$, 262$^b$, and 262$^c$, respectively. The details of these units are shown in Figures 27, 28, 29 and 30. Each of these escapement devices includes the two rocking finger elements 263 and 264, each of curved or corresponding form, and each having the approaching tip portion 265 and the receding tip portion 266. Each of these elements 263 and 264 is carried by a short vertical rock shaft, 267 and 268, respectively, which rock shafts are conveniently journalled in the plates 269 and 270 which extend across the top and bottom faces of the sub-chute as well shown in Figure 30. The upper ends of these rock shafts have secured to them the lever arms 271 and 272 which extend substantially parallel to the length of the sub-chute. The lower or delivery ends of these lever arms are connected together by the spring 273 so that said arms are normally rocked into the position of Figure 29 in which the elements 263 and 264 are retained in the positions shown in Figure 27.

The sides of the sub-chute are slotted as shown at 274 and 275 in Figures 27 and 28, and the tips 265 and 266 of the elements 263 and 264 work through said slots when said elements are rocked back and forth. Under the urging of the spring 273 the lower tips 266 are retained projected into the chute, and in this position the lowermost coin within such chute will be held by these tip portions, and no delivery of the coin can occur. Furthermore, in this position the upper tip portions of said elements are withdrawn sufficiently to carry said upper tip portions either flush with the inner surfaces of the chute side walls or slightly beyond such position, so that the next higher coin may pass such tips. However, with the elements in such position no delivery can occur, and all coins within the sub-chute will be retained therein.

By rocking both of the shafts slightly the lower tip portions of the elements 263 and 264 will be separated sufficiently to release the lowermost coin; but simultaneously with such slight rocking the upper tip portions will be brought close enough together to prevent downward movement of the next higher coin, the lengths of the elements 263 and 264 being proper to ensure that the upper tip portions will move towards each other at a position between the two coins, as shown in Figure 27. Thus Only a single coin will be released for each energization rock of the shafts 267 and 268.

A solenoid 276 is mounted just above the sub-chute at a location behind the shafts 267 and 268, and said solenoid is provided with the two opposite armatures 277 and 278, as shown in Figure 29. The spring 273 normally retains these armatures separated from each other, but by energizing the solenoid said armatures will be drawn together, with corresponding rock of the elements 263 and 264, and escapement release of one coin. Only a single coin well be released for each energization of such solenoid. The solenoids for the several sub-chutes are properly interconnected with other elements, as will presently appear.

A microswitch 279 is located directly below the discharge end of each sub-chute, these being the microswitches 279$^a$, 279$^b$, and 279$^c$, and there is provided a slotted opening 280 in the floor of each sub-chute in position to permit the end portion of the leaf 281 of the microswitch to project through such slotted opening. These leaves are designated as 281$^a$, 281$^b$, and 281$^c$, in various figures. As each coin is released by the escapement of the sub-chute such coin must pass over the leaf 281, with corresponding momentary depression of the leaf and reversal of the contacts of the microswitch. Thus a signal for counting the coin will be given, and will be properly translated in the circuits presently to be described.

Another microswitch 282 is located just below the sub-chute at a point near to the escapement unit, such microswitches being designated as 282$^a$, 282$^b$, and 282$^c$, for the several sub-chutes. A slotted opening 283 is formed in the floor of each sub-chute to accommodate the leaf 284 to project up slightly through such slotted opening into position for engagement by a coin lying on the floor of such sub-chute. As long as there remains a coin in such sub-chute the corresponding leaf 284 will be depressed, thus retaining the microswitch in contact position to signal presence of an additional coin in such sub-chute. When the last coin is released from such sub-chute the leaf 284 will no longer be depressed, and the microswitch will be allowed to reverse its contacts. These microswitches 282 serve to signal the presence of coins of corresponding denominations in their respective sub-chutes; and also serve to signal exhaustion of coins of such denomination, as having all been released and counted, or in case no coins of such denomination were originally introduced through the insert slot 248 the corresponding microswitch 282 will have retained its non-depressed condition during the entire sorting operation. Thus if, for example, there had been introduced one or more quarters, and one or more silver dollars, but no half-dollars, the microswitch 282$^b$ (for half-dollars) would have remained in its non-depressed condition throughout the sorting and selecting and counting operation; and upon completion of counting and pre-setting for all of the quarters, transfer would have been effected directly to the sub-chute for the silver dollars, and sorting and selecting and counting for such silver dollars would next have proceeded.

As the counted coins are delivered from the lower ends of the sub-chutes they may be collected in a suitable receptacle, 285 within the stand or located in other convenient and safe location. For example, a suitable hard steel chute may be provided leading downwardly from the delivery ends of the sub-chutes and into a hard steel receptacle located in the base section of the stand, and accessible only to an authorized agent of the owner of the dispensing stand. In this connection it is noted that as soon as all coins have been counted and delivered they are no longer retained within the necessary equipment of the present apparatus.

ATTENDANT'S KEY-UNLOCKING AND RE-SETTING UNIT

I have stated that the counters must be re-set to their zero positions prior to commencement of a new operation of pre-setting and delivering liquid. Such re-setting operation involves drawing the shafts 122ª, and 122ᵇ (and the shaft for the Gallons or amount of purchase counter) to the right, and then rotating said shafts one turn in the counting up direction, followed by return of said shafts in return direction, and then release of the shafts to shift leftwardly into the position as shown in Figure 9 and other figures. I have also stated that it is desired to ensure that these re-setting operations shall be performed by an authorized attendant, and by use of a key in his possession.

In Figures 19 to 22, inclusive, I have shown, in double scale, a form of such key locking arrangement suitable to perform the above mentioned operations. A lock barrel 286 is mounted through the side wall 287 of the stand, being conveniently welded to such side wall. This barrel is located in alignment with the shaft 122ᵇ. Within this barrel is located the lock cylinder 288, the bore 289 of the barrel being of length greater than said cylinder so as to permit endwise movement of the cylinder with respect to the barrel. The cylinder is connected to a shaft section 290 extending to meet the right-hand end of the shaft 122ᵇ, and these elements are connected together by a somewhat loose tongue and groove connection, 291, a cotter pin 292 joining the parts together.

The barrel is provided with the customary lock pins 293, located in alignment along the lower portion of such barrel, and conventional springs 294 are provided urging these lock pins upwardly. The plugs 295 provide means to set these pins and springs into place. The barrel carries the radial pins 296 which align with the lock pins when the cylinder is in its left-ward position, and when the cylinder has not been rotated from its normal or un-operated position. These radial pins are of different lengths. The cylinder is provided with the lengthwise extending key slot 297, such key slot being provided with the lateral grooves 298, specially located and spaced, and the key is correspondingly formed to fit into such slot, in conventional manner. The edge of the key is provided with the serrations 299 positioned along the key edge to register with the pins 296 when the cylinder is to be unlocked, such serrations being of various depths to correspond with the lengths of the pins. When the key 300ª is fully inserted into the cylinder the pins 296 are driven down to thereby drive the lock pins 293 down against the springs 294, to bring said locking pins into alignment, thus unlocking the cylinder in conventional manner.

A crank or other conventional element, 300, is connected to the cylinder so that said crank may be readily used to draw the unlocked cylinder towards the right, and such crank may then be readily used for turning the cylinder, and the shaft 122ᵇ in the back and forth rotational movements needed to re-set the counters to zero. Conveniently, the barrel 286 is provided with a stud 301 extending inwardly to register with an endwise extending groove 302 in the face of the cylinder; and the left-hand end of this groove 302 communicates with an encircling groove 303 in the face of the cylinder. This groove 303 is located far enough to the left of the stud 301 (when the cylinder is in its normal or unoperated position) to make it necessary to pull the cylinder to the right far enough to ensure engagement of the pins 127 with the studs 128 of the various orders units when the shaft is rotated; and then, when such rotation has been started such registration will be ensured during the complete shaft rotations in the re-setting operation. When the complete rotation has been effected, to re-set to zero, the endwise extending groove portion 302 will register with the stud 301, thus releasing the cylinder for movement leftwardly to its initial or unoperated position. At the same time the locking pins 293 will be properly aligned with corresponding radial openings of the cylinder to allow said locking pins to be projected inwardly by their springs when the key is removed from the slot.

It is noted that the locking pins thus enter into the body of the cylinder when the locking is to be effected. In conventional forms of such locks the locking pins are all of the same diameter, and the radial pins 296 of the cylinder are also all of the same size, the same as the sizes of the locking pins. Then, when the locking pins are moved to the locking positions they will enter into the outermost portions of the radial bores which accommodate the radial pins of the cylinder. However, it must be noted that due to the endwise movement of the cylinder in the present specialized application of such device, provision must be made to prevent inward projection of the several locking pins into other cylinder bores than those with which they normally register when the cylinder is not thus moved endwise. In the arrangement shown in Figure 19 it will be seen that the locking pins are of progressively larger sizes from the left-hand pin towards the right-hand pin; and there are provided short radial bores 304 in the cylinder of size to receive these locking pins of such increasing sizes. Therefore, as the cylinder is drawn towards the right, to commence the re-setting operation, each locking pin, previously depressed against its spring, will be confronted by a cylinder bore of smaller size, so that such locking pin cannot be improperly projected inwardly by its spring, to thus improperly lock the cylinder. In the absence of this special provision to prevent improper locking from occurring, it would be necessary to limit the amount of the endwise movement of the cylinder to a value less than the distance between successive locking pins, a limitation which might, in some cases, be insufficient to provide for the movements required during the re-setting operations.

PRINTING UNIT

Reference has been made to the provision of means to automatically print a record showing any undelivered balance at completion of the delivering operation, or to print a record showing the amount of the pre-setting, or to show both of these amounts. Such record may be printed either automatically or by manual control. When the amount of liquid delivered, either the amount in gallons or in value thereof, is less than the pre-set amount at the beginning of the operation, it is desirable to provide means to show any credit remaining at conclusion of the operation. This is especially true when the pre-setting is produced by a prepay arrangement such as illustrated in Figures 1 to 31, and when no provision is made for automatic return of coins equal in value to the amount of credit due to the purchaser.

Figure 5:
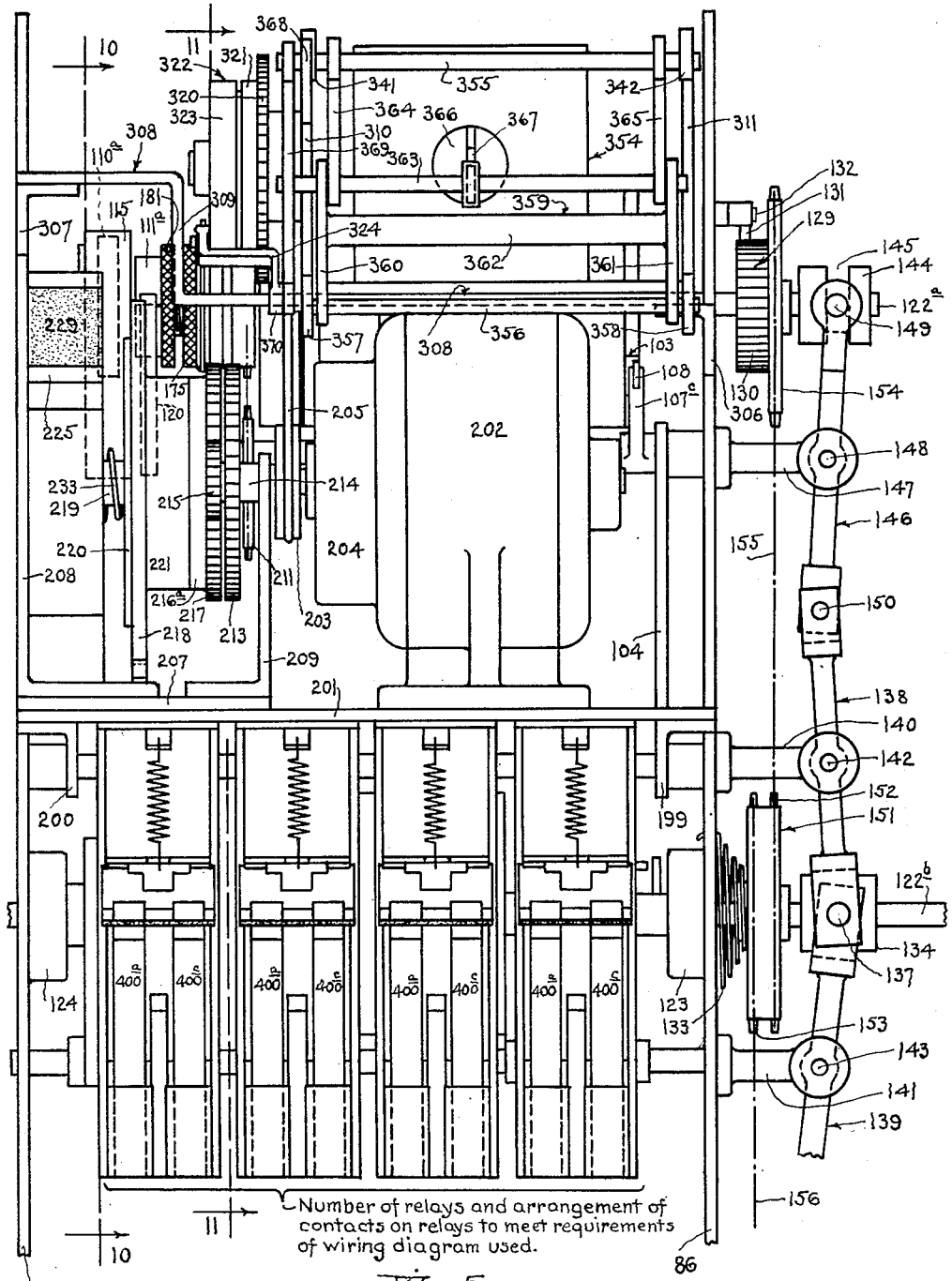
Figure 5 shows a rear elevational view corresponding to Figures 3 and 4; and this figure also shows the counter setting motor, the selector, and various of the locking or holding relays.

In Figure 1 there is shown the slotted delivery opening 305 in the stand through which a ticket will be delivered at conclusion of the operation. Means to print and deliver such ticket are shown in Figures 3 to 11, inclusive to which reference may now be made. The side plates 86 and 87 are provided with the backwardly extending brackets 306 and 307, respectively; and it will be noted that the bracket 307 is at a greater elevation than the bracket 306. This is to provide sufficient clearance for the selector unit which is supported at the right-hand side of the machine and below such bracket 307. A plate or platform 308 extends across the rear portion of the machine and behind the counters, and reference to Figures 5 and 9 shows that this plate is provided with the step 309 just to the left of the position of the selector, so that the left-hand portion of the plate is at lower elevation than its right-hand portion; and said left-hand portion extends over the motor 202 which is of less hight than the selector. (I here define the "right" and "left"

hand portions of the machine with reference to the machine when viewed from the front.) It is also noted that the lateral dimension of the selector, measured across the width of the machine is such that this step 309 may be located far enough to the right to bring it rightward of the counters. In other words the counters lie in front of the lower portion of this plate 308, so that the printer now to be described may be accommodated, for its full width, on the lower elevation portion of the plate 308.

This printer unit includes the rearwardly extending right and left side plates 310 and 311, and the bottom plate 312 (see Figure 11), such side and bottom plates providing a rearwardly extending U-shaped space, open at its top, and of width substantially the same as the lateral dimension of the counters, or somewhat greater than such dimension. These side plates are vertically slotted as shown at 313 and 314 to receive the ends of a spindle 315 on which is carried the paper roll 316, which paper roll is of width sufficient to receive the printed record for all printing orders. The printing unit is so designed that it is completely open and unobstructed above this paper roll so that new rolls may be substituted from time to time as needed, and to replenish the paper supply.

Directly in advance of the paper roll and at an elevation such that it may somewhat overlie the rear portions of the orders units of the supplemental counter, there is the roller 317 carried by the shaft 318. This shaft is journalled in the side plates 310 and 311, or in elements carried by said side plates; and the shaft extends rightwardly through the right side plate to receive the pinion 319 located outside of such side plate. This pinion is driven by a gear 320 of larger size. This gear 320 is secured to one element 321 of a one-way or hold-back clutch unit 322, the other element 323 of such clutch unit being reciprocably driven by a rearwardly extending link 324, as well shown by comparison of Figures 4, 5, 6, 10 and 11. Various forms of such one-way or hold-back clutches are widely used and are well known, so I do not deem it necessary to detail the same herein. However, I may mention, as typical of such clutches those put out at this time by Formsprag Company, of Ferndale, Michigan, and covered by letters patent of the United States, No. 2,388,424. It is further noted that the clutch unit 322 shown in the present drawings is such that rotation of the element 323 in counterclockwise direction (see Figure 10), by drawing the lower portion of such element to the right in that figure, will result in drive of the other clutch element 321 in counterclockwise direction, whereas rotation or rock of the element 323 clockwise for a return movement will leave the element 321 in its previously moved position. Thus, by alternate reciprocations of the element 323 the element 321 will be periodically advanced in the counterclockwise direction, step-by-step. The reciprocating movements of the element 323 are effected by the rearwardly extending link 324, together with the spring 325 connected to said link, as will be presently explained. The forward end of this link is pivotally connected to the lower segment of the element 323 by the pin 326.

A second one-way clutch unit 327, similar to the unit 322, is located at the left-hand end of the roller 317, and between said left-hand end and the inner wall of the side plate 311. One element, 328 of this second clutch unit, is connected to the roller shaft, and the other element of such clutch unit, 329, is secured to the side plate 311. This clutch unit is so arranged that said element 328 may rotate with the roller in clockwise direction, whereas counterclockwise rotation of the roller is prevented by the clutch unit. Since the gear 320 drives the roller pinion 319 in reverse direction, it follows that this arrangement of clutches and gear and pinion is such that the following operations ensue:

Leftward movement of the link 324 rocks the clutch element 323 of the unit 322 clockwise, with slippage of the clutch element 323 and non-drive of the clutch element 321. At the same time the spring 325 is stretched and placed under tension. During this operation no movement is transmitted to the gear 320 and pinion 319, and therefore no movement is transmitted to the roller 317; but such roller would have rotated counterclockwise had it been driven and allowed to so rotate. Any tendency to drive said roller counterclockwise during this portion of the cycle would have been due to frictional engagement of the parts with each other. Any such tendency will, however, be effectively resisted by the hold-back clutch unit 327, which prevents counterclockwise rotation of the roller. Thereafter, rightward movement of the link 324, due to urging of the spring 325, will rock the clutch element 323 counterclockwise, during which direction of movement the companion clutch element 321 will be driven counterclockwise, carrying with it the gear 320, and driving the pinion 319 clockwise. Such clockwise rotation of the pinion carries with it the roller 317, which is permitted to effect such clockwise rotation by the clutch unit 327. Thus the roller 317 is advanced step-by-step in clockwise direction, with the reciprocations of the link 324.

Beneath the roller 317 there is the companion roller, 330, journalled in the side plates 310 and 311, and the two rollers 317 and 330 are in surface engagement with the paper strip fed from the paper roll 316. Preferably the roller 317 is surfaced with rubber or other suitable driving material so that the paper strip will be effectively forwarded. As the paper strip is forwarded from between the two rollers 317 and 330 it moves between the upper and lower leaves of a guide element 331 to travel across the top segment of the several orders elements of the supplemental counter. This guide element includes the leaves 332 and 333 of relatively thin and somewhat flexible sheet metal, which leaves may be slightly curved as shown in Figures 11 and 10, terminating slightly short of an impression zone where the printing is to be done. Conveniently these leaves are supported by carrying them slightly beyond the right-hand plate 310, and providing them with a small bracket 334 which may be connected to said side plate as shown in said figures.

Each of the orders elements of the supplemental counter is provided with suitable indicia which will be visible from a position directly in advance of such counter, as shown by the indicia 335, 336 and 337 on the three orders disks shown in Figure 3. These visible indicia are conveniently located around the right-hand edge portions of the orders disks; and the stand or housing is provided with a suitable slotted opening through which said indicia are visible. This opening is so located, and the indicia are so placed around the several elements that the correct indicia will be visible, corresponding to any given setting or reading of the counter. In Figure 3 the amount of 350 is visible, representing, in that arrangement, $3.50 in purchase money.

Each of the orders elements also is provided, around its left-hand edge portion, with a series of indicia, 338, 339 and 340, which are slightly raised beyond the cylindrical surface of each orders element, all of such raised indicia, however, rising to the same imaginary cylindrical surface, which is a printing surface. Furthermore, each of the indicia thus located around the left-hand edge portion of a given orders element is displaced angularly from its corresponding indicia, 335, 336 or 337, as the case may be, by the amount of ninety degrees. Thus, for example, in Figure 3, the digit "0" appears directly in front of the observer at the right-hand edge of the units orders element, whereas said digit "0" stands at the top of the said orders elements, at the left-hand edge portion of said element. Or, again, the digit "5" appears directly in front of the observer at the right-hand edge of the tens orders element, whereas said digit "5" stands at the top of the said orders element, at the left-hand edge portion of said element. And again, the digit "3" appears directly in front of the observer at the right-hand edge of the hundreds orders element, whereas said digit "3" stands at the top of said orders element, at the left-hand edge portion of said element. By this arrangement, for any given indication of an amount visible from directly in front of such supplemental counter, there will be located directly on the top of said counter, displaced leftwardly from the visible indicia, a set of printing type exactly corresponding to such visible indicia; and this relationship will be true for all possible indications or readings of such supplemental counter. Incidentally, it is noted that by use of three orders elements, as illustrated, it is possible to give readings up to $9.99 in money, or to 9.99 gallons in liquid measure, as desired.

A cradle including the side rock arms 341 and 342 is located in proximity to the upper portions of the side plates 310 and 311. These rock arms are journalled to the lugs 343 and 344 carried by the upper edge portions of the side plates, the rock arms being connected by the cross rod 345 which is journalled in the lugs 343 and 344. These rock arms are spaced sufficiently far apart to allow for insertion of paper rolls through the top of the unit. Across the front end of this cradle there reach the vertical front and back plates 347 and 348, which provide a laterally extending space between them. Within this space there is located the block 349 (see Figure 9 in particular), such block being secured in place by pins or rods extending from front to back between the plates 347 and 348, not shown; and just below this block 349 there is located the presser plate 350, having the downwardly extending shallow ribs 351, 352 and 353, which are located in planar registry with the several sets of printing type on the orders elements, already referred to. Examination of Figures 10 and 11, in particular, will show that the lower surfaces of these ribs are curved on arcs which conform to the curvature of the imaginary cylindrical surface which would include the printing surfaces of the type elements. When the front end of the cradle is pressed strongly down these curved lower surfaces impress the type numerals onto the paper strip to record said type on the paper.

In the rear portion of the space between the side plates 310 and 311 and above the bottom plate 312 there is mounted the horizontal axis solenoid 354. A stiff rod 355 extends horizontally between the rear ends of the rock arms 341 and 342. Another rod 356 extends horizontally between the lower rear portions 357 and 358 of the side plates 310 and 311. A cradle 359 is provided in the lower rear portion of the space between the side plates 310 and 311. This cradle includes the vertical side arms 360 and 361 connected by the horizontal bar 362. A horizontal rod 363 extends between the upper ends of the side arms 360 and 361. Companion links 364 and 365 are pivoted on the rods 363 and 355 adjacent to the arms 360 and 361. The several side arms 360 and 361, and links 364 and 365 are of such lengths that when the rod 363 is in its rearmost position, shown in Figures 4, 10 and 11, the rear ends of the rock arms 341 and 342 are lowered, whereas by drawing said rod 363 forwardly, towards the solenoid, said links will act in toggle fashion, moving towards vertical alignment to thus force the rear ends of the rock arms 341 and 342 upwardly; and it will be seen that as the said links and companion side arms 360 and 361 approach vertical alignment the component of vertical force developed, in proportion to the forward force applied to the rod 363 will increase very rapidly, so that a very great tilting force may be developed on the rock arms rear ends by proper design and proportion of the parts. I have so proportioned the several elements of this device that when drawing the rod 363 forwardly an amount which does not quite bring the side arms 360 and 361 into vertical alignment with the corresponding links 364 and 365, a sufficient rock of the rock arms is produced to force the forward ends of said rock arms down to ensure printing function, and with the development of a very great pressing force against the type; and by releasing said rod 363 rearwardly to the position shown in Figures 10 and 11 the forward ends of said rock arms will be raised sufficiently to produce complete release from the type and allow free advancement of the paper strip.

The solenoid is provided with the armature 366 which is connected to the rod 363 by the short link 367. This arrangement permits for the angularity which is needed between the parts during their several movements.

An extension 368 extends rearwardly from the upper rear corner of the right-hand side plate 310, and an arm 369 has its upper end pivoted to this extension, and hanging down therefrom. The rear end of the roller advancing link 324 is pivoted to the lower end of this arm 369 by the pin 370. The right-hand end of the rod 363 is operatively connected to the central portion of this arm 369 so that as the armature is drawn forwardly by energization of the solenoid the roller advancing link 324 will be drawn forward during the raising movement of the rear ends of the rock arms 341 and 342, that is, during the impressing portion of the cycle. Such forward movement of the link 324 does not advance the rollers, as already explained, but it brings the parts into position such that said roller will be advanced for paper feed on the return stroke. Such return stroke is effected by the urging of the spring 325, as already explained. Such return movement also carries the armature and connected parts into their normal unoperated positions.

When the horizontal movement of the rod 363 provided for the desired vertical movement of the rock arms 341 and 342 is excessive as compared to that amount of such movement needed to rock the arm 369 sufficiently to ensure correct horizontal movement of the link 324, the arrangement shown in Figures 10 and 11 may be used to take care of such excess movement. In this case the arm 369 is provided with the central forwardly projecting portion 371 having the curved slot 372 within which the right-hand end portion of the rod 363 works, and this slot is of such length and so located that during the first portion of the forward movement of the armature the rod will ride free within the slot, and then when the lost motion has been taken up the rod will engage the forward end of the slot. Thereafter further forward movement of the rod, under the draw of the armature, will effect forward rock of the arm 369. On the return or backward movement when the solenoid is de-energized, the first portion of such rearward movement under urging of the spring 325, will move the rod 363 rearwardly far enough to create considerable angularity between the side arms 360 and 361, and the links 364 and 365, and then the weight of the rock arms 341 and 342 will be sufficient to complete the downward rock of the rear portions of said rock arms, with completion of the cycle of movements.

In Figure 10 I have shown the paper strip 373 advanced through the guide element (including the plates 332 and 333), and extending between the lower portion of the presser head and the type elements of the orders units, and extending out through the slot 305. A tear edge 374 is provided at the top of said slot against which the paper strip may be readily torn off. I have provided the ink ribbon 375 (see Figure 9) in the presser head. This ribbon is a complete closed band, and it passes over the rods 376, 377 and 378, and over the drive roller 379 which is located in the upper right-hand corner of the press head. This drive roller is carried by a small shaft 380 which extends out from the rear of the press head and carries a small ratchet wheel 381 (see Figures 4 and 8). A rock arm 382 is free to rock on said shaft 380, and carries a small pawl 383 having a pin 384 in position to engage with a stationary stud 385 extending leftwardly (see Figure 4) far enough to be engaged by the pin 384 during upward movement of the press head, thus advancing the ribbon. Spring means (not shown) may be provided for returning the arm 382 and pawl when the press head rises at completion of the printing cycle. Thus the ribbon is advanced step-by-step with the successive printing operations.

Since the ribbon just described lies above the paper strip it is evident that the impress of the type elements will be made correctly on the top face of the paper strip, so that as said strip is fed outwardly from the slot 305 it will correctly show the amount or value indicated by the several orders units of the supplemental counter. If desired a duplicate paper strip 386 may be fed from the paper roll 316 and between the type elements and the presser head, such duplicate strip, if used, being carbonized on its bottom face so as to make a carbon print onto the paper strip beneath. In this case the ribbon copy will be fed past a rod 387 and upwardly into the body of the stand, where it may be reeled up on a suitable receiver and will constitute a permanent record of transactions. In this case the lower paper strip will be the one delivered through the slot 305 as a carbon copy of such record.

The proportions of the several paper advancing elements, including the amount of reciprocation of the link 324, the gear ratio between the gear 320 and the pinion 319, and the size of the roller 317, may be made such that the length of the paper strip delivered at each operation will be sufficient to completely deliver the impressed record through the slot 305 to the purchaser. A guide plate 388 is shown extending inwardly from the front wall of the stand to a position close to the orders units to ensure good delivery of the paper strip to the slot 305.

As will hereinafter appear I have provided means to automatically energize the solenoid 354 at completion of the other operations to thus print any amount remaining unconsumed or undelivered, according to the positions of the orders units of the supplemental counter. I have provided the contact 389 carried by the link 324 in position to engage the stationary contact 390 at completion of the proper amount of leftward movement of said link 324. The engagement of these contacts 389 and 390 serves to discontinue supply of current to the solenoid, to thus permit return of the printing elements to their normal position, and to complete all operations. These arrangements will appear in detail hereinafter when the circuits of Figure 31 are described.

HOLDING RELAYS

I have mentioned the fact that various relays are provided in the electrical circuits which interconnect various of the units. Most of these relays are of the "holding" type, that is, they are so constructed that when a signal is received over one circuit certain contacts are changed and the parts are then locked in such changed contact condition until another signal is received from another source. Then the parts are released and the contacts are returned to their original conditions. Various forms of such relays are widely used, and well known in the electrical arts. Such forms of relays may be used in the various electrical circuits as will perform the needed functions but in Figures 5, 6, 7, 8, 10 and 11 I have shown four holding relays of convenient form as a part of the elements of the circuits shown for the arrangement of Figures 1 to 30, inclusive. Each of these relays includes the L-shaped frame bar providing the horizontal and vertical arms 391 and 392, respectively. A smaller L-shaped element has one arm 393 connected to the lower portion of the vertical arm 392 and its other arm 394 extending horizontally to provide a shelf for support of the "locking" solenoid 395. The upwardly extending armature 396 is shouldered to be supported by the arm 394 and to provide a pivotal support for such armature. The lower end of this armature is provided with the tail 397 which is urged leftwardly by the spring 398 into the normal or un-set position. A stop 399 limits rightward movement of the armature when released.

A series of stationary contacts 400, 400ª, 400ᵇ, etc., is carried by the insulating block 401, 401ª, 401ᵇ, etc., secured to a downwardly extending bracket 402 carried by the arm 394. One of the contacts, 403, is controllably movable, its upper end being extended through a plate 404 of insulating material carried by the upper end of the armature 396. When the armature is drawn leftward by energization of the solenoid the contact 403 is drawn to the left with corresponding breaking of one set of circuits and establishing of another set of circuits. In the arrangement shown there are only two "stationary" contacts, and a single "movable" contact, and the reversal of position of such movable contact merely reverses the engagement of the movable contact, disengaging from one stationary contact and engaging with the other stationary contact. Evidently various other arrangements of contact sets may be provided, according to the requirements of the problem.

A U-shaped bracket is provided above the parts just described, including the horizontal arm 405 secured to the horizontal arm 391, the downwardly extending vertical arm 406, and the lower horizontal arm 407. A vertical "releasing" solenoid 408 is carried by this bracket, and a horizontal armature 409 is provided beneath this solenoid 408. The right-hand end of this armature is pivoted to the vertical bracket arm 406 by shouldering the bracket arm, and a spring 410 tends to urge the armature downwardly in addition to the gravitational effect. The horizontal arm 407 serves as a limit or stop to prevent excessive downward movement of the armature. The insulating plate 404 carries an upwardly extending arm 411. This arm is so located and is of such size, and the armature 409 is of such size, that when the solenoid 408 is energized to raise the armature 409, the solenoid 395 being un-energized, the armature 396 may be drawn rightwardly by the spring 398, carrying the contact 403 into reversed position, and establishing the corresponding circuits. Also, the arm 411 will ride under the armature 409 while said armature is in raised position. Then, when the solenoid 408 is de-energized the armature 409 will remain in its thus raised position, and the armature 403 will remain in its rightward position, thus retaining the circuits in the position corresponding to such position of the armature 396.

When the solenoid 395 is thereafter energized the armature 403 will be drawn leftwardly to reverse the contacts. This leftward movement of said solenoid's armature will carry it over so that the arm 411 will pass to the left of the armature 409, allowing said armature to fall, the solenoid 408 being un-energized. Then, when the solenoid 395 is de-energized the parts will remain in this described position until the next signal comes to the solenoid 408, thus restoring the parts to their previous condition.

Although I have shown only four of these relays in several of the figures it is evident that as many such relays will be provided as are needed, according to the wiring requirements of the circuits, and that other such relays may be supported at convenient positions within the stand. Furthermore, each such relay will be provided with such contact arrangements as are called for by the functions to be performed by such relay.

GENERAL DESCRIPTION OF ASSEMBLED STAND

Reference may now be had to Figures 1 and 2 which show a typical gasoline dispensing stand embodying the features of the fully automatic, pre-pay coin arrangements already described. Thereafter I shall describe the wiring diagram of Figure 31, as typical of a wiring arrangement capable of performing all of the various functions already referred to as well as others.

The stand of Figures 1 and 2 includes the conventional counter 412 (79) for "Amount of Purchase," and the indicator 414 showing the setting of "Rate per Gal." to which the gear ratio change unit has been set. This illustrated stand also includes the supplemental counter 415 which is pre-set to the specified "Prepay" value. The counters 413 and 415 are the lower and upper counters shown in Figure 3 and elsewhere, and the windows shown in Figure 1 are so placed that the ordinals 335, 336 and 337 of the supplemental counter are visible, and also the ordinals of the lower counter. The printing type need not be visible. The lock barrel 286 is also shown projecting slightly to the right of the right-hand wall 287 of the stand, and the setting crank 300 is also shown in Figures 1 and 2. The functions of these parts have been explained. The slot 305 for delivery of the printed ticket or slip is also shown in Figure 1. The coil insert slot 248 is also shown in said figure, as well as another "Coin Reject" slot which will be described presently. In Figures 1 and 2 I have also shown an "Attendant's Key Lock Main Switch" 416 (83) in the right-hand wall 287 of the stand. This main switch must be unlocked by the authorized attendant by use of his proper key in order to institute current supply. Of course the provision of such a locked main switch is optional, but is desirable for various reasons of which some will be hereinafter mentioned.

In Figure 1 I have also shown an "Attendant's Emergency Key Lock Switch" 422 in the right-hand wall 287. This switch is optional. Its purpose and function will be evident from the following short statement:

*Non-automatic operation*

As long as the functions of the "Pre-set" feature are in use it is not possible to draw or deliver from the stand more liquid that the amount for which pre-setting has been made, except by re-setting to zero all counters, and beginning a new cycle of operations. There will sometimes arise conditions under which it is desirable to cut out such control, and allow the operator to deliver any large amount of liquid which he may desire, under counting registry similar to the operational conditions at present in use in such stands. In such a case any counters 413 (80) for "Amount of Purchase" and 412 (79) for "Gallons Delivered" should function as in present practice, so that at conclusion of the operation the purchaser and the attendant shall both be advised as to the amount of the transaction, both in gallons quantity, and in value, dollars and cents. In other words, when this special emergency switch is operated the parts should be restored to what is present practice in the operation of such stands. I have made provision for this operation.

Reference to Figure 9 and other figures will show that when the supplementary counter (Pre-set) has returned to zero it locks and a signal is given to bring various elements into operation. If, under these conditions the pump motor should be continued in operation instead of being stopped, and if the valve 73 should be retained open instead of being closed it would be possible to continue delivery of liquid, even beyond the pre-set amount, and as long as desired. This is true because any delivery of liquid after the zeroizing of the counter 415 (the supplemental counter) would be effected with meter operation and corresponding rotation of the shafts 75 and 76 (Figure 2); and (see Figure 9 in particular) the drive of the gear 158 by rotation of the shaft 76 would drive the counter 413 (80) to continue to add into such counter the additional dollars and cents corresponding to such additional liquid delivery. The Gallons counter 412 (79) would also be driven to add into such counter the number of gallons so added beyond the pre-setting amount, and as long as the delivery was thus specially continued. If the pump motor and valve controls had been modified prior to commencement of a delivering operation, the counter 415 would have remained at all times in its zero position, but nevertheless the delivery and metering operations could have proceeded, as according to present conventional practice.

Since, when operating in the modified control manner above described, the gears 193 and 195 transmit rotational movements to the sprocket 172 for drive of the supplemental counter through the friction drive element 172—173, it follows that as soon as such supplemental counter is at its zero position any further rotation of the gear 158 for drive of the counter 413 (80) must be accompanied by slip of such friction drive element 172—173, because the zeroizing of the supplemental counter includes the positive locking of such counter against further reverse or downcounting operation. (During such delivery of liquid the conventional counter 413 (80) is counting in the increasing direction, and not towards its zero locking position). Accordingly, when operating according to this modified or emergency scheme the delivery of liquid will be accompanied by slip of the elements 172—173, which will impose an increased burden on the meter 57. While such meter will generally be capable of overcoming this increased burden, and be able to drive the counters 413 (80) and 412 (79) in conventional manner, still the accuracy of the metering operation will probably be lowered, and the increased burden on the meter will in any case be most undesirable.

In Figure 9 I have shown the gears 193 and 195 as being in engagement with each other to drive the supplemental counter in reverse direction. In that figure I have shown the gear 193 as being splined on the element 191, so that said gear 193 may be disengaged from the gear 195 by shifting the gear 193 to the right, as by use of a small fork working in the groove 193$^a$ of the hub 193$^b$. When the gears are thus disengaged from each other the delivery of liquid may be continued indefinitely with the control circuits remaining in their modified condition as modified by the switch 422.

The shifting of the gear 193 in either direction may be effected either manually or automatically with switch operations. In Figure 9 I have shown schematically the solenoid 423 in position to act on the armature 424 and draw the fork 425 to the right to disengage the gear 193 from the gear 195, against the force of the spring 426. Contacts are provided in the switch 422 to supply current to this solenoid as long as the switch is in its operated or emergency position, thus disengaging the gears during such emergency operation, as well as modifying the circuits controlling the pump motor and the shut-off valve to allow continuous and unlimited delivery of liquid under manual control.

It is also noted that by locking the rock shaft 106$^a$ for the supplemental counter zeroizing elements, so as to retain the arms 107$^a$, 107$^b$ and 107$^c$ rearward, to prevent said shaft from rocking to zeroizing position even when the notches 103 are all aligned for zeroizing, the hook element 120—121 will be retained rearwardly far enough to prevent said hook from locking the supplemental counter at its zero position, thus permitting said counter to rotate backwardly beyond its zero position; and such backward rotation may be continued indefinitely as long as such condition of the rock shaft 106$^a$ is retained. Under this condition, the pump motor and the shut-off valve being held in proper operational condition by the switch 422, delivery of the liquid may be continued indefinitely, as an emergency operation.

Figure 6:
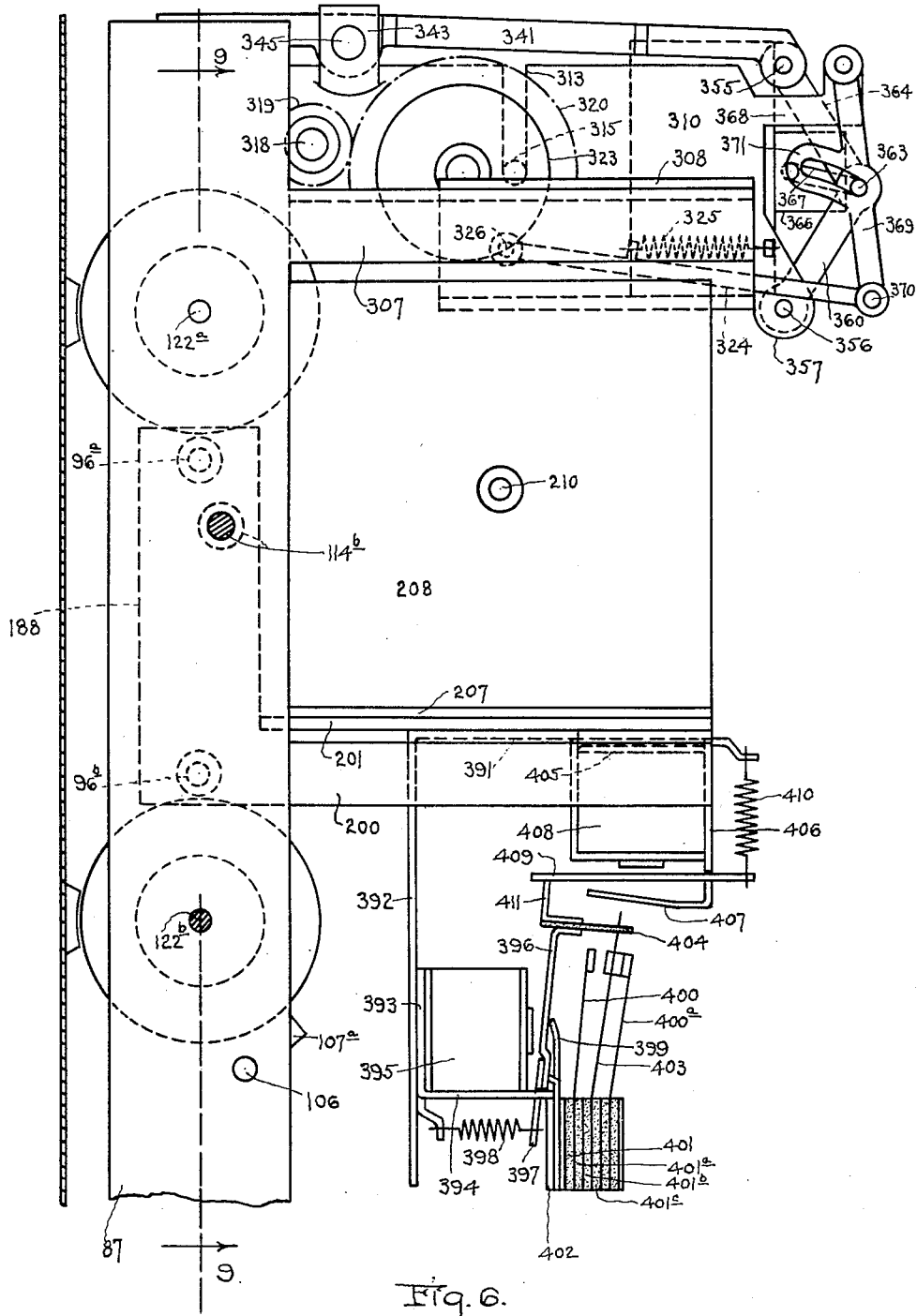
Figure 6 shows a right-hand side elevation corresponding to Figures 3, 4 and 5.

In Figures 6, 10 and 23 I have shown the bracket 114 which is secured to the rock shaft 106, as being provided with the downwardly extending tail 114$^a$; and I have also shown the stud 114$^b$ extended through the plate 188 to a location in proximity to said tail. This tail is provided with the wedge shaped or cam shaped portion 114$^c$, and the stud 114$^b$ has its inner end tapered as shown at 114$^d$, so that by forcing the stud leftwardly (or inwardly, when seen as in Figure 10) said tapered stud portion will force itself against the wedged portion of the tail and thus the tail will be forced forwardly (to the left in Figure 10). This will rock the shaft 106ª sufficiently to hold the hook element 120 rearward far enough to prevent engagement of the hook finger 121 with the shoulder of the block 111ª. Thus the counter may continue its backward rotation beyond the zeroizing position.

The stud 114ᵇ may be moved inwardly to its interfering position, just described, in any convenient manner; but normally said stud will be retained in its leftward or unoperated condition, as shown in Figure 23. In this position the stud does not interfere with the tail 114ª, and the spring 109 will function to retain the rollers 108 in engagement with the cylindrical surfaces of the several orders units, and to cause the rock shaft 106 to rock counterclockwise (viewed as in Figure 10) when the zero position is reached.

It is of course noted that when the arrangement just described for holding the rock shaft 106ª in rocked position is used, to thus disable the zeroizing feature, it is not necessary to disengage the gears 193 and 195 from each other, since the supplementary counter, including the element 172, may continue to rotate backwardly indefinitely, under drive of the liquid meter 57, and without need of forcing the sprocket 177 to rotate while the element 169 is held idle.

FUNCTIONAL SUMMARY OF CERTAIN OPERATIONS

Before proceeding to detailed description of the wiring diagram of Figure 31 the following summary of various functions is in order:

Referring to Figure 1 I have therein shown the various successive operations to be performed by the authorized attendant (when his preliminary attention is required), and by the purchaser, such operations being successively indicated by the arrows extending over the face of the stand illustrated. These successive operations are as follows:

1. The attendant must unlock the main switch 416 by use of his proper key.

2. The attendant must then unlock the setting lock unit 286 by use of his proper key. Having done this he will draw the crank 300 towards him and then rotate that crank one turn to re-set the several counters to zero. Upon completion of such rotation he will restore, or allow the restoration, of the said unit to its normal position, and will remove his key.

3. When step 2 has been completed a signal lamp 417 designated "Shows Preset to Zero" will be illuminated, thus indicating that the stand is ready for use by the purchaser.

4. The purchaser will next insert such number and amount of coins as he may wish to pre-pay, inserting them through the slot 248 entitled "Insert Coins." The only limitation to this operation is that the coins shall be of the proper denominations, such as quarters, half-dollars, and silver dollars, and that the total value of such coins shall not exceed the capacity for which the stand is intended. Thus, with three numerical orders an amount of not over $9.99 may be inserted (actually $9.75 when the smallest coin is a quarter).

5. When such coins have been inserted as desired by the purchaser he will depress the "Starting Button" 418. The depression of this button will start a series of successive operations, presently to be described in detail. Here it is stated that a gate is operated to prevent improper insertion of additional coins after the button has been depressed, and any coins inserted after depression of such button will be immediately returned through the slot 419 designated "Coin Reject." The depression of this button will institute the counting and pre-setting operation, and as each coin is counted the counter 415 will be advanced an amount equal to the value of such coin. This pre-setting will continue until all coins have been counted, and the counter completely pre-set to the proper amount.

6. When all coins have been counted and the pre-setting operation completed, the signal lamp 420 will be illuminated, such lamp being designated "When Lighted Take Hose." This signal indicates that the purchaser may now begin to deliver the gasoline or other liquid by removal of the hose nozzle from the hook, accompanied by proper manipulation of such nozzle. It is here noted that although the purchaser may physically remove the nozzle from the hook and manipulate the nozzle valve handle 68 prior to illumination of the lamp, still such movements will be completely ineffective to either allow the hook to rise, or to ensure delivery of liquid. The hook will be locked in its lowered position by the unit 71—72 (see Figure 2), and the pump motor 51 will remain unenergized, and the valve 73 will remain closed, until the completion of counting all coins and corresponding pre-setting of the counter 415. Accordingly, the delivery of liquid is automatically prevented until the signal lamp 420 has been illuminated.

7. When the lamp 420 has been illuminated and the nozzle removed from the hook delivery of liquid may begin under manual control of the nozzle. If such delivery shall be continued until the full amount for which pre-setting has been made has been delivered, the counter 415 will be in its completely restored to zero position. At this instant the valve 73 will close, and the current supply to the pump motor will be discontinued, so that further liquid delivery will at once cease, with the supplemental counter 415 reading zero. At this time the conventional counter (modified as has already been disclosed), will read an amount equal to the original pre-set reading of the supplemental counter, being the value of all coins inserted and counted.

8. Upon restoring the hook to its lowered position at any time during or after the delivering operation, all operations will be discontinued, terminating the delivery of liquid and releasing certain relays so that no further operations can be effected without starting at the beginning again, with re-setting of counters to zero, etc. If such restoration of the hook to its lowered position occurs after a complete delivering operation, the counter will be reading zero. If, however, such restoration of the hook to its lowered position be effected prior to complete use of the amount to which the supplemental counter had been pre-set, there will remain a "credit" in favor of the purchaser, since he will have pre-paid for more liquid than he took from the stand. Generally, of course, the restoration of the hook to its lowered position will be effected by replacement of the nozzle thereon, but the hook may be depressed otherwise than by the nozzle weight. In any case, depression of the hook will effect the results above detailed.

9. Depression of the hook as explained in "8" above will also result in bringing the printer into cyclic operation. Such cyclic operation will include depression of the presser head to impress the type reading on the paper strip, and then advancement of the strip sufficiently to project the purchaser's slip far enough for him to tear off such slip. The amount shown on such slip will be the amount of any credit due to the purchaser, in case he has terminated the delivering operation prematurely. In case the purchaser has taken from the stand the full amount of liquid for which he made prepayment, the slip so projected will indicate "Zero" or "000." In any case the purchaser may either redeem any credit due to him at the time of the transaction, or may hold the slip for future redemption.

10. As already explained, the depression of the hook serves to effect printing and also to shut off all operations. It does not, however, result in re-setting the several counters to zero, but leaves each counter in the position which it had attained during the delivering operation. Accordingly, it is now necessary for the authorized attendant, in case of use of key-locks as disclosed herein, to come to the stand and re-set the counters to zero after he has inserted his proper keys. Included in these discontinuing operations is the opening of a switch whereby current may no longer be delivered effectively to the various elements until the counters have thus been re-set to zero. Generally the counters will be left in the conditions to which they had been brought when the hook was depressed, until the next customer or purchaser comes to the stand, thus ensuring that the authorized attendant will come to the stand at the time such next customer is there present.

11. A button designated "Printer," and numbered 421 is shown on the stand in Figure 1. This special button may be provided when it is desired to effect printing of any amount shown on the supplemental counter 415 by an operation other than the automatic operation previously referred to. For example, in case it should be desired that the purchaser should be able to print on a slip to be delivered to him the amount of coins which he had inserted into the slot 248, and prior to commencing delivery of liquid, he may effect such printing by merely depressing this button 421, and then releasing it. This will result in printing the amount to which the counter 415 has been pre-set, and will deliver a slip showing such printed amount upon releasing the button. This operation is completely supplemental to the previously explained printing operation; and when such a special manual printing operation has been effected the regular and fully automatic printing operation will also be effected at conclusion of the liquid delivering operation, and upon depression of the hook.

12. Many gasoline dispensing stands presently being used are provided with additional counters to integrate all "Amounts of Purchase" in dollars and cents, and also to integrate all gallons delivered. Such counters are not herein specifically illustrated, but may also be provided in connection with the counters herein illustrated, and may be driven in the same way as such counters are presently being driven, or in any other suitable manner. When provided they will provide additional means to check the operations of the stand, by comparison with the printing records herein disclosed and provided for.

13. Various interlocks are provided between the several elements and functions of units already described to ensure correct sequence of operations, and to prevent improper institution or continuance of operations, due either to improper manual operations, or otherwise. These will appear from description of the wiring diagram and circuits of Figure 31.

14. In Figure 1 there is shown an "Attendant's Emergency Key Lock Switch," 422. This switch, when moved to its emergency position, cuts out various of the automatic and "pre-setting" functions, and limitations, and restores the stand to normal functioning along present conventional lines of operation. When this emergency switch is moved to its emergency position it is thus possible for the operator of the stand to take liquid from the stand without limitation of amount, and under nozzle control. Under this operation the counters 412 (79) and 414 (78) will properly move to higher counts as liquid is delivered, as under conventional present practice, and without limitation of amount to be delivered. This operation might be desirable, for example, in case of use of the stand for delivery of a large amount of liquid, more than the pre-setting capacity of the counter 415 (or "Gallons" counter in the arrangement of Figures 32 to 36, inclusive).

15. Upon restoring the switch 422 to its normal or unoperated condition the stand will be restored to its normal "prepay" or "preset" functions.

THE WIRING DIAGRAM OF FIGURE 31

A. *The coin counting and signalling means*

Reference is now made to Figure 31 which shows a typical set of circuits and relays and switches and other elements including the various units already described.

Let it be assumed that a number of quarters, half-dollars, and silver dollars have been inserted through the slot 248. They will descend through the chute 249 and be sorted and delivered into the sub-chutes as already explained. In the upper right-hand portion of Figure 31 these coins are shown in the three groups as thus sorted. The "detection" switches 282ª, 282ᵇ, and 282ᶜ are provided with the contacts 427, 428 and 429, 430, 431 and 432, and 433, 434 and 435. As long as coins are present in these chutes the central contacts 428, 431, and 434 will be retained in engagement with the lower contacts 429, 432, and 435 respectively, but when any sub-chute is emptied of its coins its contact 428, 431, or 434 will immediately rise to engage the other contact of its switch, as, 427, 430, and 433. The "counting" switches 279ª, 279ᵇ, and 279ᶜ are provided with the contacts 436, and 437, and 438, and 439, and 440, and 441. These switches are normally in open circuit position as shown in Figure 31, but as each coin is released and passes its counting switch the contacts of such switch will be momentarily closed to deliver a signal as presently explained.

The selector switches 227, 228, 229 and 230 are provided with the contacts 442 and 443, 444 and 445, and 446 and 447. These switches are normally open as shown in Figure 31, but as the disk 218 of the selector comes around during a counter setting operation, each switch in turn is momentarily closed by the oncoming of the mutilated section 232, thus delivering a signal if other elements of the circuit are in condition to receive such signal. Thus, if a half-dollar has just been released and has given its signal by closing of the contacts 438 and 439, a circuit will be established ready to receive a signal from the switch contacts 446 and 447, and such signal will at once be given when the mutilated section 232 of the selector comes around to the fifty cent position. During the progress of the disk 218 to the fifty cent position the mutilated section 232 must pass the quarter switch, thus momentarily closing its contacts 444 and 445; but since the signal from the coin chute came from the fifty cent chute such closing of the contacts 444 and 445 (for quarters) will be disregarded and the selector will continue to the fifty cent position. There the control circuits will be completed, and the clutches will be opened, allowing the selector disk to return at once to its zero position.

Corresponding to each denomination of coins there is a "detecting" relay and a "selector" relay. These are the three "detecting" relays 448, 449, and 450, and the three "selector" relays 451, 452, and 453, respectively. Each of these relays is of the locking type, such as shown in Figures 5, 6, 7, 8, 10, and 11, and already described. Other forms of such relays might be used as will be evident. The "locking" solenoids of these relays are shown at 454, 455, 456, 457, 458, and 459, and the "releasing" solenoids of these relays are shown at 460, 461, 462, 463, 464, and 465, respectively. Each of these six relays is provided with two sets of contacts, one set being normally closed while the relay is in its normal position (having been released by signalling its "releasing" solenoid), and the other set of its contacts being normally open at such time. Upon energizing the "locking" solenoid of each relay these two sets of contacts are reversed, the first set being opened and the second set being closed; and such energization of the locking solenoid of such relay will also lock it while it sets in this changed condition until a signal is received to energize its "releasing" solenoid. Then its contacts will be restored to their original or normal conditions.

The "detecting" relay for each denomination serves to control the transmission of "counting" signals (for coins released from the sub-chute of such denomination) to the proper "selector" relay for such denomination, if coins of such denomination are present, and further serves, when coins of such denomination are not present or have been exhausted, to bring into proper condition circuits to ensure commencement of counting of coins of the next denomination, if any such be present in the sub-chute of such next denomination, etc. When finally, all coins have been released and counted, and pre-setting operations have been completed, the "detecting" relay for the final denomination serves to signal the lamp 420, and also to bring other circuits into effect to enable the delivery of liquid to be commenced under nozzle control.

The relay 448 includes the normally closed contacts 466 and 467, and the normally open contacts 468 and 469; the relay 449 includes the normally closed contacts 470 and 471, and the normally open contacts 472 and 473; the relay 450 includes the normally closed contacts 474 and 475, and the normally open contacts 476 and 477; the relay 451 includes the normally closed contacts 478 and 479, and the normally open contacts 480 and 481; the relay 452 includes the normally closed contacts 482 and 483, and the normally open contacts 484 and 485; and the relay 453 includes the normally closed contacts 486 and 487, and the normally open contacts 488 and 489. The relays 448 and 451 are for the 25 cent section, the relays 449 and 452 are for the 50 cent section, and the relays 450 and 453 are for the dollar section.

When the coin counting and counter pre-setting units are to be brought into operation current is supplied over the line 490 (shown as positive). I shall presently show the means by which this line is energized. At the same time the line 491 is connected to the negative side of the circuit. With coins in all sub-chutes as shown in Figure 31, as soon as the lines 490 and 491 are energized current flows over the connection 492 to the contact 428 of the quarters detecting switch 282$^a$. This switch is down (there being a coin in the chute), so current flows over the line 493 to one side of the escapement solenoid 276$^a$ for quarters. The other side of this solenoid connects over the line 494 to the contact 478 of the selector relay 451, for quarters. The other contact 479 is engaged with this contact 478 so connection is established to the return side line 491. Thus the quarters escapement is immediately energized, and one quarter is released. As this quarter passes the switch 279$^a$ the contacts 436 and 437 thereof are momentarily closed. The line 493 also connects by the line 495 to one side of the locking solenoid 454 of the relay 448, the other side of such solenoid connecting to the return line 491. Thus, said relay is immediately reversed from its normal position and is locked over as soon as the operation is commenced. Thus the contacts 468 and 469 of this relay are brought together, the contacts 466 and 467 being separated. The contact 436 of the counting switch 281$^a$ connects by the line 496 to the contact 469 of the relay 448, and since that relay has been locked over, said contact 469 is in engagement with the contact 468, which in turn connects to the positive line 490. The other contact 437 of the switch 281$^a$ connects by the line 497 with one side of the locking solenoid 457 of the selector relay 451 for quarters, the other side of said solenoid being connected to the return line 491. Thus the passage of a quarter over the switch 281$^a$ serves to lock the relay 451 over and reverse its contacts. This separates the contacts 478 and 479 and closes the contacts 480 and 481. The separation of the contacts 478 and 479 serves to release the escapement solenoid to its normal position, ready for another escapement operation at the proper time.

One side of the selector clutch solenoid 222 is connected to the return line by the connection 498, and one side of the counter clutch solenoid 167 is connected to the return line by the connection 499. The other sides of both of these solenoids are connected to the common line 500. This line 500 connects to all three of the contacts 480, 484, and 488 for the three selector relays for quarters, half-dollars, and silver dollars, so that when any one of these relays is locked current will be supplied to both of the clutch solenoids. Such condition will then continue until such selector relay as has been thus locked is unlocked again. Thus the time interval during which the clutches are energized will depend exactly on the time interval during which the selector relay then in use is energized.

Continuing our analysis, the closing of the contacts 480 and 481 energizes both clutch solenoids, said contacts being locked in this condition until the relay in question is released. All of the selector contacts 445, 447, and 449 are connected to the positive line 490. One side of each of the releasing solenoids 463, 464 and 465 of the three selector relays is connected to the return line 491; and the selector contacts 444, 446, and 448, for quarters, half-dollars, and silver dollars, respectively, are connected by the lines 501, 502, and 503 to the other sides of the said releasing solenoids, respectively. The closing of the two clutch solenoids as already explained served to start pre-setting advancement of the supplementary counter, and also started rotation of the selector against its spring and away from its zero position. This selector rotation included the rotation of the disk 218. As soon as the mutilation 232 comes to the position of the quarters switch 228 said switch will close thus delivering an impulse to the releasing solenoid 463 of such relay, and immediately permitting the contacts of such relay to return to their normal position (as shown in Figure 31). The separation of the contacts 480 and 481 immediately terminates the clutch energization, with immediate termination of pre-setting advancement of the supplementary counter, and also with immediate return of the selector disk to its zero position. Thus the pre-setting operation for one individual coin has been completed.

The contacts 478 and 479 of the relay 451 constitute a portion of the escapement unit circuit for the quarters sub-chute, as was evident from the description of the first release of a coin from that chute. Immediately upon releasing the relay 451 to close the contacts 478 and 479 together another impulse will be delivered to the escapement solenoid 276$^a$, so a second quarter will be released and will move past the counting switch 279$^a$, to again set the relay 451 into locked position. There will immediately follow another sequence of operations duplicating that which has been described, and with corresponding further advancement of the supplementary counter in pre-setting direction and by an amount proper for a second addition of one quarter into such counter. Thus the process will proceeed, one quarter at a time until all quarters have been accounted for.

When the last quarter has been released by the escapement unit 276$^a$, the detector switch 282$^a$ will be released, and reverse its contacts, bringing its contact 428 into engagement with its contact 427 and away from its contact 429. Said contact 427 connects to one side of the releasing solenoid 460 of relay 448 by the line 504. A common return line 505 connects to the other side of the electrical system; and the other side of the solenoid 460 connects to said return line 505. Thus the releasing of the detector switch 282$^a$ by exhaustion of all quarters from the quarters sub-chute will immediately signal the solenoid 460 to release the relay 448 and allow the contacts 468 and 469 to separate, and bring the contacts 466 and 467 together. The engagement of the contacts 468 and 469 served to ensure supply of current to the counting switch 279$^a$ as long as any quarters were present and uncounted, but the completion of counting of quarters terminates the further need of current from these contacts 468 and 469.

The contact 467 also connects to the line 504 which is supplied by the upper contact 427 of the detecting switch 282$^a$, so the releasing of that switch serves to energize this contact 467 also. The contact 466 connects by the line 506 with the central contact 431 of the detector switch 282$^b$ for half-dollars, so the exhaustion of all quarters and their counting, serves to energize this half-dollars detector switch. If any half-dollars are present in the half-dollars sub-chute said switch 282b will be depressed bringing its contact 431 into engagement with its contact 432. Said contact 432 connects by the line 507 to one side of the escapement unit 276b for half-dollars, the other side of said escapement unit connecting by the line 508 to the contact 482 of the relay 452. The other contact 483 of this pair connects to the common line 491 leading to the return side of the system. Thus the relay 452 serves to energize the half-dollars escapement unit each time the relay 452 is released to its non-locked position. Said line 506 also connects to one side of the locking solenoid 455 of the relay 449 for half-dollars the other side of such solenoid being connected to the return line 509 which in turn connects to the return line 491. Thus the releasing of the relay 448 (for quarters) by exhaustion of all quarters from the sub-chute, also serves to set the relay 449 for half-dollars immediately to its locked position. This serves to separate the contacts 470 and 471 from each other and to bring the contacts 472 and 473 together. Contact 473 connects by the line 510 with the upper contact 438 of the counting switch 279b, and the lower contact 439 of said switch connects by the line 511 with one side of the locking solenoid 458 of the relay 452 for half-dollars. This solenoid has its other side connected to the return line 491. The contact 484 of this relay connects to the common line 500 leading to the two clutches, and the contact 485 of this relay connects to the supply line 490. Thus the two clutches will be energized as long as this relay 452 is in its locked condition, due to release of a half-dollar.

As already explained the contact 446 of the switch 229 of the selector for half-dollars, connects by the line 502 with the releasing solenoid 464 of the relay 452. Thus said half-dollars relay 452 will be released when the disk 218 of the selector has been rotated an amount corresponding to counter advancement for one half-dollar, the contacts 484 and 485 being separated by release of such relay. At the same time that said relay is released its contacts 482 and 483 come together. The contact 482 connects by the line 508 to the escapement solenoid 276b so that another half-dollar will be released from the half-dollar sub-chute. The contact 483 connects to the return line 491. The release of this second half-dollar will cause the selector to go through another cycle of operations, supplying current to the clutches for an amount of pre-setting of the supplementary counter corresponding to such half-dollar value. Thus the half-dollars will be successively counted, and corresponding pre-setting operations of the supplementary counter will be performed.

When the half-dollars sub-chute has been exhausted the detector switch 282b will rise, separating its contact 431 from its contact 432 and engaging such contact 431 with its contact 430. Said contact 430 connects by the line 512 with one side of the releasing solenoid 461 of the relay 449, and with the contact 471 of said relay. The other side of said solenoid 461 connects to the return line 505. The separation of the contacts 472 and 473 of said relay is coincident with the termination of need for further current supply to the counting switch 279b of the half-dollars unit, since all half-dollars have now been released and counted.

The releasing of the relay 449 brings the contacts 470 and 471 of said relay together. Said contact 471 is energized by releasing of the detector switch 282b, and the contact 470 connects by the line 513 to the middle contact 434 of the detector switch 282c for silver dollars. The lower contact 435 of this detector switch connects by the line 514 with one end of the solenoid 276c of the escapement for silver dollars, and the other side of this solenoid connects by the line 515 with the contact 486 of the relay 453. The other contact 487 connects to the line 491. Thus the escapement for silver dollars will be operated to release a silver dollar. This will move past the counting switch 279c, bringing its contacts 440 and 441 together.

The line 513 also connects to one side of the locking solenoid 456 of the relay 450, and the other side of said solenoid connects to the common line 509. Thus said relay will be locked over when the relay 449 is released. This will separate the contacts 474 and 475 of the relay 450, and will also bring together the contacts 476 and 477 of that relay. The contact 476 connects to the supply line 490, and the contact 477 connects by the line 516 with the contact of the silver dollars counting switch 279c. The other contact 441 of said counting switch connects by the line 517 with one side of the locking solenoid 459 of the relay 453. The other side of this solenoid is connected to the common line 491. Thus this relay 453 will be locked over when each released silver dollar is counted by the switch 279c. The contact 488 of this relay connects to the common line 500 leading to the clutch solenoids; and the contact 489 connects to the supply line 490. Thus the clutches will be energized by locking over the relay 453. The contact 487 of this relay connects to the common line 491, and the contact 486 connects by the line 515 to the solenoid of the escapement 276c, as already explained. Thus the release of this relay 453 serves to signal the escapement for each release of a silver dollar. The releasing solenoid 465 of this relay is energized by the microswitch 230 of the selector when said selector has come around the proper rotation corresponding to pre-setting of one dollar into the supplemental counter, as already explained.

One side of the releasing solenoid 462 of the relay 450 connects to the common line 491, and the other side of this releasing solenoid connects to the upper contact 433 of the detecting switch 282c by the line 518. Thus said relay will be immediately released when the final silver dollar has been released by the escapement. This contact 433 also connects by a line 519 to other elements as will be presently explained. The line 518 connects by a line 520 to the contact 475 of the relay 450, and the other contact 474 of said relay connects by the line 521 to the signal line 522 extending to the signal lamp 420. The other side of this lamp connects by the line 523a to the return side of the system as will presently appear.

It is noted that the final closing of the contacts 474 and 475 due to final release of the relay 450 takes place with release of the final coin, being the final silver dollar. It is also noted that supply of current to the contact 475 only occurs when the detector switch 282c has been released by delivery of the final silver dollar, being the final coin. Therefore the energization of the lines 521 and 522 will occur only when the delivery of and counting of coins has been completed. Thus the signal given by lighting of the lamp 420 is correctly given to indicate that the counting of coins has been completed.

Another line 523 connects to the lines 521 and 522, and extends to the contact 443 of the zero position switch 227 of the selector. The other contact 442 of this zero switch connects by the line 524 to another element presently to be described. In general it may be stated that the function of the contact 474 is to deliver such signals as may be desired or needed to show the completion of the counting of all coins, and the completion of pre-setting of the supplemental counter to its full counted position as determined by the summation of all such counted coins.

The button 418, indicated on Figure 1 as "Starting Button," serves to bring the counting and pre-setting operations which have been thus described, into movement, and also serves to so interlock various other elements that these counting and pre-setting operations shall proceed uninterruptedly to conclusion.

B. *Starting button functions*

A locking relay 525 is provided, having the locking solenoid 526 and the releasing solenoid 527. This relay is set and locked by depression of the button 418, provided that the system has been first brought into proper condition for automatic operation by the purchaser, such preliminary arrangements having been effected by the authorized attendant. To this end the key-lock switch 416 must first be closed by the attendant, thus supplying current from the terminals 528 and 529 to the lines 530 and 531. Additionally, the attendant must re-set all counters to zero by use of his key-lock re-setting unit, as previously detailed herein. The two counter shafts for the "Amount Prepaid" and the "Amount of Purchase" are shown at 110 and 110ᵃ. The attendant's key-lock re-setting unit is shown at 288 in Figure 31. The switches which are operated by the two shafts 110 and 110ᵃ are shown schematically adjacent to the shafts in Figure 31, in which figure the parts are shown in their zeroized position, and prior to any pre-setting operation.

At this point I may state that the depression of the button 418 prior to re-setting of the counters to zero will be completely ineffective to institute the counting and pre-setting operations, since current for the button 418 must come over contacts under zeroizing control of both counters, and these contacts only come into effective position at the counter zero positions.

The supplemental counter shaft disk 110ᵃ controls the following contacts; 532 and 533 open at zero; 534 and 535 closed at zero; 536 and 537 closed at zero; and 538 and 539 open at zero. The conventional counter (modified) disk 110 controls the following contacts: 540 and 541 closed at zero; and 542, 543, and 544, contact 543 engaging contact 544 at zero and disengaging otherwise, and contact 543 disengaged from contact 542 at zero and engaging it otherwise. In Figure 10 and other figures the showing of the contacts is more or less conventional, and it is understood that the contacts actually provided shall conform to the requirements of the wiring diagram.

The line 531 connects to the contact 543 by the lines 545 and 546; the contact 544 connects by the line 547 to the contact 537; and the contact 536 connects by the line 548 to one side of the locking solenoid 526 of the relay 525. The other end of the said solenoid connects by the line 549, and the line 550 to one side of the button 418. The other side of the button 418 connects by the lines 551 and 552 directly to the other side of the system, 530. It is thus evident that it is necessary for both counters to stand at their zero positions in order for the solenoid 526 of the relay 525 to be energized by pressing the button 418. Thus none of the effective operations can be instituted until both the key-lock main switch and the key-lock re-setting unit have been operated, necessitating the presence of the authorized attendant at the stand in order to commence the operations.

The locking relay 525 is provided with the following contacts; 553 and 554, normally open; and 555, 556 and 557, of which the contact 556 is normally engaged with the contact 557, and of which, when the relay is locked over the contact 555 engages the contact 556 and opens the contact 556 from the contact 557. The negative line 552 connects by the line 558 to the contact 556, and also connects by the line 559 to one end of the releasing solenoid 527. The line 523ᵃ from the signal lamp 420 connects to the line 559. The line 491 connects to the contact 555 of the relay 525, so when that relay is locked over by depression of the button 418 said line 491 is connected directly to the negative side of the system, beyond the key-lock 416. The line 490 connects to the contact 554 of the relay 525, so when that relay is locked over by depression of the button 418 said line 490 is connected directly to the positive side of the system, also beyond the key-lock 416. Thus the setting of the relay 525 in locking position by depression of the button 418 must precede any functioning of the coin counting and corresponding pre-setting operations.

The final signal line 519 coming from the contact 434 of the dollars detector switch 282ᶜ connects directly to the releasing solenoid 527 of the relay 525, and, as has already been stated, the other side of this solenoid connects to the line 552 by the line 559. Therefore, when the final count and pre-setting have been accomplished the relay 525 will be automatically released, and will immediately restore to its normal position, unlocked. This is the position shown in Figure 31.

C. *The nozzle hook contacts*

The nozzle hook 62 is shown as provided with the cam finger or portion 71 which will ride below the latch 72 when the hook is lowered, such latch then snapping leftwardly to lock the hook in lowered position. This latch 72 may be withdrawn rightwardly by energizing the solenoid 560, to thus release the hook and allow it to move upwardly when the nozzle is removed therefrom. Any depression of the hook when the said solenoid 560 is not energized will latch the hook down until the solenoid is again energized.

The hook controls two sets of contacts, a lower set including the contacts 561 and 562, and an upper set including the contacts 563, 564, 565, and 566. Of these the contacts 563 and 564 are closed together when the hook is down, and are separated when the hook is up; and the contacts 565 and 566 are separated when the hook is down and are closed together when the hook is up.

D. *The coin reject unit operation*

The coin reject slot 419 of Figure 1 is shown in Figure 31 as comprising a return branch from the coin insert chute 249 to which the coins pass when inserted through the insert slot 248. A gate 567 is pivoted at the point 568, and a spring 569 urges this gate to position such that coins coming down the chute 249 will be diverted and returned immediately through the reject slot 419. A solenoid 570, when energized, serves to rock this gate to position (as shown in Figure 31) in which the inserted coins will move on down and be sorted and delivered to the several sub-chutes according to their denominations. It is thus necessary to provide circuits whereby this solenoid will be energized during proper time intervals, and un-energized at other times.

A line 571 leads from the contact 557 of the relay 525 to one side of the solenoid 570. Thus, when the said relay is in its normal, non-locked position this line 571 is energized. A line 572 leads from the other side of the solenoid to the contact 535 of the supplemental counter, and a line 573 leads from the contact 534 of said counter to the contact 561 which is operated by the hook movements. A line 574 leads from the companion contact 562 of the hook control, to the line 575, and thus to the positive line 545. Therefore, when the relay 525 is in normal unlocked and unoperated position, and when the supplemental counter is zeroized, and when the hook is down, current may flow through the solenoid 570 to retain the gate in its moved position, to allow coins to descend to the sorting and counting mechanism; but when any one of the elements (relay 525, or supplemental counter, or hook), is moved away from the positions shown in Figure 31, such current supply to this solenoid will immediately cease, and the gate will be thrown over by its spring. It is thus evident that all conditions must be fulfilled in order to introduce coins without their immediate rejection. Especially, it is evident that once the starting button has been depressed, thus setting the relay, it is necessary to carry the operation through to conclusion, counting and pre-setting the supplemental counter for such coins as were inserted prior to depression of the button. Also, that later insertion of one or more coins cannot interfere with these operations, so that controversies as to how much value of coins has been inserted will be largely eliminated. Such after inserted coins are properly returned to the operator inserting them.

The above also shows that the coin reject is tied in with the hook position, and with the zeroizing of the supplemental counter. Such being the case, when the purchaser has once raised the hook by removal of the nozzle therefrom, the coin gate must return to its coin reject position; and if, after some liquid has been delivered, with corresponding movement of the supplemental counter from its zeroized position, the coin gate will move to its reject position if it has not already moved thereto. It will presently appear that when the hook has been lowered, after having been raised to commence a delivery operation, all further delivery of liquid is prevented, requiring the presence of the attendant and his services at the stand to re-set the counters to zero, and make a fresh start.

E. *Signalling both counters pre-set to zero*

One side of the signal lamp 417 connects by the line 576 to the negative line 552. The other side of this lamp connects by a line 577 to the line 548. This line 548 connects through the contacts 536 and 537 of the supplemental counter, and through the contacts 544 and 543 eventually to the positive side of the system. Therefore it is necessary that both of the counters be at the zero position in order to light this signal lamp. Thus said lamp will signal zero position of both counters, and thus signals that said counters have been re-set to zero.

F. *The main current supply locking relay*

There is a locking relay 578, provided with the locking solenoid 579 and the releasing solenoid 580. This relay has the single pair of contacts 581 and 582. The negative line 552, to which reference has heretofore been made, and through which all functions thus far find return to the negative side of the system, connects directly to the connection 530 from the key-lock main switch 416. Thus the functions so far described are not dependent on the closing of this relay in order to complete their return circuits. The contact 581 connects to the return line 530, and the contact 582 connects to a line 583. When the relay 578 is locked in its set position this line 583 constitutes a continuation portion of the return side of the system. One side of the locking solenoid 579 connects by the line 584 to the positive line 545. The other side of said locking solenoid connects by the line 585 to the line 550 which in turn connects to one side of the starting button 418. The other side of said starting button connects to the negative line 552 which is directly connected to the negative line 530 from the key-lock switch; so the depression of the starting button will immediately energize the locking solenoid 579 and thus lock the relay 578 in position to connect the line 583 to the negative line 530 until the releasing solenoid 580 of this relay is energized. That operation occurs as a final operation, as will presently appear.

It is thus evident that when the starting button has been depressed, after the giving of the signal by the lamp 417, both of the lines 545 and 583 are energized to the left of the relay 578.

G. *The control of the pump motor and the valve*

The pump motor 51 must be connected to the supply lines in order to supply liquid by the pump 50; and also the shut-off valve 73 must be opened as long as it is desired to take liquid from the hose under nozzle control. It is, however, desired to interlock the motor operation, and to interlock the valve movements with other functions, in order to assure desired controls, and to ensure maximum safety and protection to persons and property during the operation of the stand.

A.—THE RELEASE OF THE HOOK LOCK

In order to allow the hook to rise when the nozzle is removed therefrom, it is necessary to energize the solenoid 560 as already stated. A locking relay 586 is provided having the locking solenoid 587 and the releasing solenoid 588. This relay has the single pair of contacts 589 and 590. I have already mentioned the line 523 extending from the final count signalling contact 474 to the zero position switch 227 of the selector, and the line 524 extending from that zero position switch to the relay 586. This line 524 connects to one side of the locking solenoid 587 of said relay. The other side of said locking solenoid connects by the line 591 to the negative line 583. Accordingly, when the last coin has been counted, and the selector has been restored to its zero position, the starting button having been depressed prior to these operations, the relay 586 will be locked in its set position, bringing the contacts 589 and 590 together. The contact 589 connects by the line 592 to the line 575 which in turn connects to the positive line 545. The other contact 590 connects by the line 593 to one side of the releasing solenoid 560 for the hook lock, and the other side of said solenoid 560 connects by the line 594 to the line 591 leading to the return or negative line 583. Therefore the locking of the relay 586 in its set position will energize the solenoid 560 to release the hook lock and allow the hook to rise when the nozzle is removed therefrom.

One side of the releasing solenoid 588 of this relay 586 connects by the line 594 to the line 591 which connects to the negative line 583. The other side of this releasing solenoid connects by the line 596 to the contact 542 of the zeroizing unit of the conventional counter; and the companion contact 543 of that zeroizing unit connects by the line 546 to the positive line 545. Since the counters must be in their zero positions before various operations can be performed, and before liquid is to be delivered, said zero unit of the conventional counter will be in its zero position when it is proper to allow the hook to rise by removal of the nozzle therefrom. Accordingly, when the nozzle is raised from the hook the conventional counter will be in its zero position, and the contacts 543 and 542 will be separated from each other. Thus the releasing solenoid 588 of the relay 586 will not yet be energized, and said relay will be in its locked position, supplying current to the solenoid 560 and allowing the hook to rise with removal of the nozzle therefrom. This condition will continue until some liquid has been delivered, such delivery of liquid causing the conventional counter to move to some higher position, from its zero position, and thus bringing the contacts 542 and 543 together. Then the releasing solenoid 588 will be energized, and the contacts 589 and 590 of the relay 586 will separate. This will terminate delivery of current to the solenoid 560 of the hook release, allowing the latch 72 to move into latching position, so that when next the hook is depressed it will be locked down.

The delivery of the signal to the locking solenoid 587 of this relay 586 is dependent on the final count signal coming over the line 523 from the contact 474 of the relay 450 (for the dollars counter), and this contact receives its current over the detector switch 282ᶜ. Such current must have come from the contact 554 of the relay 525 which was set by the depression of the starting button. This relay 525 is released by its solenoid 527 when the final count just referred to has been made, since the releasing current for said solenoid 527 comes from the same contact, 433, of the detector switch 282ᶜ as supplies the current coming to the locking solenoid 587 of the relay 586. By making the time constant of the releasing function of the relay 525 rather slow said relay will "hang on" long enough to ensure delivery of the necessary locking impulse to the locking solenoid 587 of the relay 586 before the relay 525 cuts off the current needed to come over the line 523.

B.—THE PUMP MOTOR HOLDING RELAY AND ITS CONTACTS

There is provided a pump motor relay 597 having the locking solenoid 598 and the releasing solenoid 599. This relay has the single pair of contacts 600 and 601. The pump motor is shown as being of the series type. One armature terminal is connected to the positive line 545 by the lines 575 and 592. The free field terminal of this motor is connected by the line 602 to the contact 600 of this relay; and the other contact 601 of this relay connects by the line 603 to the negative line 583. One side of the locking solenoid 598 of the relay 597 connects by the line 604 to the positive line 545. The other side of this locking solenoid connects by the line 605 to the contact 541 of the zeroizing unit of the conventional counter. The contact 540 of said zeroizing unit connects by the line 606 to the contact 566 of the hook element group, the companion contact 565 connects by the line 607 to the contact 533 of the zeroizing unit of the supplemental counter, and the companion contact 532 connects by the line 608 to the positive line 545. The contacts 533 and 532 of the zeroizing unit of the supplemental counter come together when the said counter is moved away from its zero position. Accordingly, the conventional counter must be at its zero position, and the hook must be down, and the supplemental counter must have been moved away from its zero position (that is, it must have been pre-set), in order to energize the locking solenoid 598 of the relay 597. Since the hook cannot be allowed to rise until the coin counting and pre-setting operations have been completed, it follows that the pump motor cannot be started until said operations have been completed.

One side of the releasing solenoid 599 of this relay 597 connects by the line 609 to the negative line 583. The other side of said releasing solenoid connects by the line 610 to the line 573 which leads to the contact 561 of the hook switch element at the lower end of the hook assembly. It has already been shown that the companion contact 562 connects to the positive line 545. Accordingly, the replacement of the hook on to its lowered position (by setting the nozzle on the hook or otherwise), will cause release of the relay 597 and thus will discontinue supply of current to the pump motor. It is here noted that when the pump motor has thus been stopped after some liquid has been delivered, a renewed raising of the hook will not re-commence motor operation without the performing of other intervening operations. This is because, some liquid having been delivered, the conventional counter has been moved away from its zero position so that its contacts 540 and 541 are no longer engaged with each other. Accordingly, in order to again bring the pump motor into operation for further liquid delivery it will first be necessary to re-set the counters to their zero positions, and this means, in effect, commencing a completely new series of operations, and involves the attendance of the authorized attendant at the stand.

C.—THE SHUT-OFF VALVE CONTROL

The shut-off valve 73 must be properly controlled to allow delivery of liquid even when the pump motor has been brought into operation. This shut-off valve may be of conventional form, generally including a gravitational seating valve, so that it is normally seated with the valve closed, together with a lifting solenoid which lifts such valve off its seat as long as such solenoid is energized. Such a valve is contemplated in the general arrangement shown in Figure 31, but evidently other forms of electrically controlled valves may be used in place thereof. One side of the valve solenoid connects by the line 611 to the line 594 leading to the line 591 which leads to the negative line 583. The other side of the valve solenoid connects by the line 612 to the contact 538 of the zeroizing unit of the supplemental counter. The companion contact 539 connects to the line 604 which leads to the positive line 545. The contacts 538 and 539 are separated from each other when the supplemental counter stands at zero, and are in engagement with each other when said counter moves away from its zero position. Accordingly, when the time arrives to deliver liquid said contacts will be in engagement, the counter having been pre-set to some amount or value, and thus, when the nozzle is raised from the hook and is manually opened for liquid delivery the solenoid of the valve will have opened said valve to permit liquid delivery. Immediately upon the supplemental counter reaching its zero position, having counted down during liquid delivery, the contact 539 will separate from the contact 538 thus terminating delivery of current to the valve solenoid, and allowing said valve to close, shutting off further delivery of liquid. Thus the liquid delivery is positively shut off at zero position, and the pump motor is also stopped by shutting off its current supply.

H. *The printer operation and controls*

There is a locking relay 613 for the printer solenoid 354 and its functions. This relay has the locking solenoid 614 and the releasing solenoid 615. This relay includes the single pair of contacts 616 and 617. A simple relay 618 is provided, having the solenoid 619 and the single pair of contacts 620 and 621. When the solenoid 619 is energized the contacts 620 and 621 are connected together. One side of this solenoid connects by the line 622 to the line 594 which connects by the line 591 to the negative line 583. The other side of said solenoid connects by the lines 623 and 596 to the contact 542 of the zeroizing unit of the conventional counter. This contact 542 has already been referred to, and when the conventional counter has moved away from its zero position (some liquid having been delivered), the contact 542 is engaged by the contact 543 thus placing the line 596 and the line 623 of the solenoid 619 in connection with the positive line 545. Therefore, when the conventional counter has moved away from its zero position the contacts 620 and 621 are brought together. The contact 621 also connects to the line 622, which connects to the negative line 583 as already shown; and the contact 620 connects by the line 624 to the hook contact 564. The companion hook contact 563 connects by the line 625 to one side of the locking solenoid 614 of the relay 613; and the other side of said locking solenoid connects by the lines 626 and 627 to the line 546 which connects to the positive line 545. Thus the lowering of the hook (after a delivering operation) will bring the contacts 563, 564 together and energize the solenoid 614 to lock the relay 613 in set position. This will bring together the contacts 616 and 617.

The contact 616 connects by the line 628 with the line 624 already referred to and which was shown to be connected to the negative line 583 when the hook is lowered (some liquid having been delivered). The other contact 617 connects by the line 629 with one end of the solenoid 354 which operates the printer unit. The other end of said solenoid connects by the line 630 which in turn connects to the line 627 which has been shown to connect to the positive line 545. Accordingly, the locking of the relay 613 in set position serves to immediately draw the armature 366 of the printer unit forwardly, to thus cause printing.

The movement of the link 324 of the printer unit in forward direction serves to close the contacts 389 and 390 together at completion of the printing movement. Contact 390 connects by the line 631 to one side of the releasing solenoid 615, and contact 389 connects to the line 630. The other side of the releasing solenoid connects to the line 628 by the line 632. Accordingly, at completion of the necessary printing movement the releasing solenoid is energized to release the relay 613 and open its contacts 616 and 617 from each other.

The contact 563 of the hook unit has been shown to connect to the line 625 and thence to the locking solenoid 614 of the printer control relay 613. Said contact 563 also connects by the line 633 to one side of the releasing solenoid 580 of the relay 578, and the other side of said releasing solenoid connects by the line 634 to the positive line 545. Thus, the lowering of the hook unit serves to release said relay 578 and thereby cut off the left-hand section 583 of the negative side of the system. Now the energizing of this releasing solenoid 580 occurs simultaneously with the energizing of the locking solenoid 614 of the printer relay 613, so apparently the said printing operation would be interfered with by cutting off the current supply. However, the relay 578 may be slightly time-delayed, as indicated in Figure 31 so as to ensure proper sequential operations of the relays in accord with well understood practice.

Reference has been made to the special printing control button 421 of Figure 1. This button is shown in Figure 31, and it includes the contacts 635 and 636. The contact 635 connects to the line 629 leading to one side of the printer solenoid 354. The contact 636 connects by the line 637 to the line 608 which connects to the negative line 583. Since the other side of the solenoid connects by the lines 630 and 627 to the positive side of the system it is evident that depression of the button 421 will energize the printer solenoid for printing.

I. *The emergency button switch and "non-automatic" operation*

Reference has been made to the "Attendant's Emergency Key Lock Switch" 422, and its functions. This switch is also shown in Figure 31, and it includes the contacts 638 and 639; 640 and 641; and 642 and 643, in pairs. When this emergency button or switch is operated these contacts are brought and held together in such pairs as indicated.

Contacts 638 and 639 may be connected to supply current to the solenoid 423 (shown in Figure 9 as a means to shift the gear 193 out of engagement from the gear 195). The details of such connections need not be here shown as they constitute a simple set of lines to supply current to this solenoid during the depression or closing of the switch 422. Alternatively, these contacts 638 and 639 might be connected to move the interfering stud 114$^b$ to the right in Figure 23 to thus shift the zeroizing unit of the supplemental counter into non-operative locking condition, as already explained. Contact 641 connects by the line 644 to the line 592 from the positive line 545, and contact 640 connects by the line 645 to the line 612 which connects to one side of the solenoid for the shut-off valve. The other side of said valve solenoid connects by the lines 611 and 591 to the negative line 583. Thus engagement of these contacts 640 and 641 together will energize the shut-off valve solenoid to hold said valve open. Contact 643 connects by the line 646 to one side of the pump motor, and contact 642 connects by the line 647 with the line 591 which connects to the negative line 583. Thus one side of the pump motor will be connected to the negative line by closing these two contacts together; and the other side of said motor is connected to the positive line 545 by the lines 592 and 575. Thus the closing of the contacts 642 and 643 together will ensure supply of current to the pump motor as long as said contacts are retained in such condition.

J. *The "pre-pay" counter setting motor*

The counter setting motor 202 is shown as being a shunt motor with the armature 648 and the field 649 in parallel. Such a motor is well adapted to the present needs as it is of substantially constant speed characteristics. The terminals of this motor connect by the lines 650 and 651 to the lines 490 and 491. Thus said motor is operated during the interval that these lines are electrified, that is, during the interval controlled by the relay 525. Said relay is set and locked by the depression of the starting button 418, and is released when the final count signal is delivered over the line 519. Thus said motor is operated during, and only during the counting and pre-setting operations.

K. *The alternative embodiment of Figures 32 to 36, inclusive*

It is noted that although I have provided means to automatically pre-set the supplemental counter to correspond to a prepaid amount of money, with necessary coin sorting and counting means whereby said coins may be indiscriminately inserted into a common chute, still, if desired the pre-setting of such supplemental counter might be manually performed, as by use of a key-operated manual setting unit, and by an authorized agent. It is further noted that instead of pre-setting to a prepay setting on the basis of dollars and cents, the pre-setting might be on the basis of actual gallons or other liquid measure. Such an alternative arrangement I have herein illustrated in Figures 32 to 36, inclusive, and shall presently describe. However, it is here noted that whether such pre-setting be made on the basis of amount of pre-paid money or amount of liquid measure, I have provided a pre-set counter supplemental to the conventional counter presently in use in this art, which supplemental counter is provided with zeroizing means which will signal and lock at the zero position when counting down, together with means to ensure discontinuance of liquid delivery when such supplemental counter reaches its zero position. Thus the device will automatically discontinue delivery of the liquid when an amount of liquid has been delivered equal to the pre-setting of such supplemental counter, whether on the basis of money value or actual liquid measure.

In Figures 32 to 36, inclusive, I have shown the pre-set supplemental counter 652 as being connected to the gallons shaft 653 so that said pre-set counter must be preset to number of gallons to be delivered instead of amount of money equivalent or amount of pre-pay. The shaft 653 may be driven by a connection to the gear ratio change unit 74, or direct to the meter 57, but in either case said shaft 653 will rotate proportionately to number of gallons delivered. The "Gallons" counter 654 is also driven by this shaft 653 and reads gallons delivered. The counter 655 reads "Amount of Purchase" in dollars, being driven by the shaft 656 from the gear ratio change unit 74 according to the "Rate per Gallon" as set by the shaft 657 and indicated by the indicator 658 in the well understood manner. The various elements, including the hook, the pump, the pump motor, the shut-off valve, the hose nozzle, and other elements shown in Figures 32 to 36 are similar to corresponding elements previously described herein. Further description of these elements is unnecessary except as said elements may be specially designed or connected to meet the requirements of the present arrangement.

Since the pre-setting of the supplemental counter in the present case is on the basis of number of gallons instead of amount of purchase, and in order to bring both such supplemental counter and the corresponding "Gallons" counter in proximity to each other and at the top of the series of counters, I have, in the present arrangement interchanged the positions of the "Gallons" and "Amount of Purchase" counters, as compared to the previously described and illustrated arrangement, placing these counters and connecting them into the other elements with the "Amount of Purchase" counter below the "Gallons" counter. Then the supplemental counter for pre-set gallons may be brought into direct proximity to the said conventional "Gallons" counter, as herein illustrated.

Figure 34:
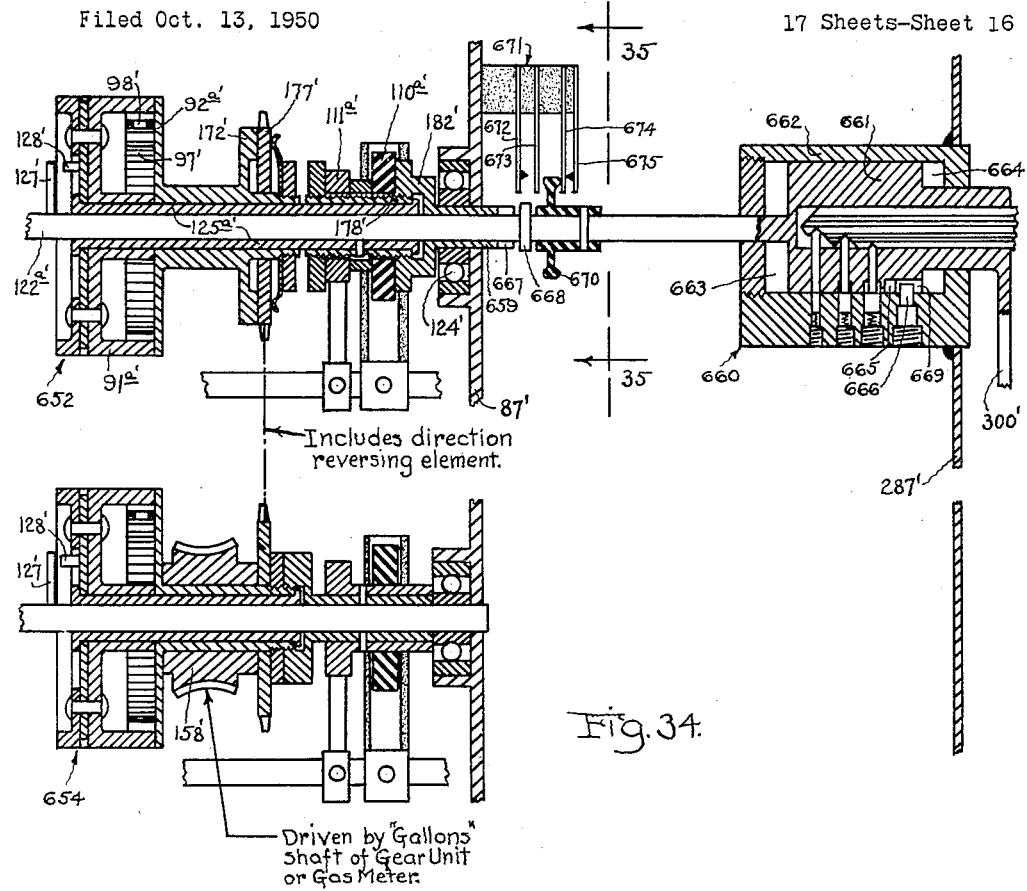
Figure 34 shows a fragmentary vertical section through the right-hand portions of the "Gallons" counter and the "Preset Gallons" counter of the arrangement shown in Figures 32 and 33, and this figure also shows a section through the key-locked, attendant operated, re-setting and pre-setting unit for these counters; this arrangement being such that when such lock has been unlocked by the attendant he can re-set the counters to their zero position by a single rotational movement in the proper direction, after which he can use the same unit for pre-setting the "Preset Gallons" counter to the number of gallons specified by the purchaser, by making sufficient rotations of the unit in the opposite direction until such pre-setting amount or number has been attained.
Figure 35:
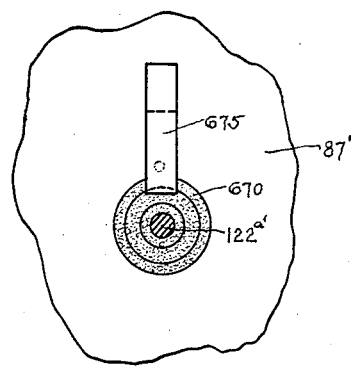
Figure 35 shows a fragmentary cross-section taken on the line 35—35 of Figure 34, looking in the direction of the arrows.

Since the pre-setting of the supplemental counter in the present case is manually performed, instead of automatically according to pre-paid amount of money, a simple pre-setting arrangement may be provided to effect such pre-setting. As shown in Figure 34 the connections effected to the units order unit of the present arrangement are the same as those shown for the previously described arrangement, and accordingly, the corresponding parts shown in Figure 34 are numbered the same as in the previously illustrated arrangement.

In the case of the pre-set gallons counter, however, a much simpler arrangement than that previously illustrated may be used, and has been illustrated. In the present case the right-hand disk 92$^{a'}$ of the units order unit of the pre-set counter is connected direct to the flange 172' of the friction drive from the sprocket 177', and the intervening electro-magnetic clutch element has been eliminated. In the present case, also, the other elements of this supplemental counter which are located to the right of the friction drive and the sprocket 177' are the same as the corresponding elements heretofore described. Such being the case, the sleeve 125ª' is definitely locked to the cylindrical element 91ª' so that both the zeroizing contact cam disk 110ª' and the zeroizing lock cam disk 111ª' always retain fixed angular positions with respect to said element 91ª'. Accordingly we may pre-set all of said parts to whatever gallons amount may be desired simultaneously by turning the sleeve 125ª' by a connection extending to the right-hand thereof. It is also to be noted that when this units order element 91ª' counts up to ten digits said element must be rotated one complete revolution to advance ten digits; and when said units order element is to be driven by the shaft 653 (or connection thereto) on the ratio of one gallon per revolution, said units order element will show tenths of a gallon per digit, and said sleeve 125ª' must be rotated one revolution per gallon of pre-setting. On the other hand, if said units order element is to show ten gallons per revolution, being a full gallon per digit, in such case it will only be necessary to rotate one revolution per ten gallons of pre-setting.

In the arrangement shown in Figures 32 to 36 the nut 182' by which the zeroizing disk 110ª' is locked to the sleeve 178' is carried out through the bearing 124' in the form of the sleeve 659 beyond the plate 87' so that said sleeve can be engaged by a suitable rotary element to effect pre-setting of the counter 652. Such pre-setting is effected by the key-lock element 660.

The key-lock element 660 includes the barrel 661 working in the cylinder 662 which is secured to the wall of the stand 287' by welding or otherwise. The barrel 661 is provided with the crank 300' by which the barrel can be moved back and forth and also rotatably in either direction. Such back and forth or endwise barrel movements are enabled by providing the clearances 663 and 664 at the ends of the cylinder 662. The barrel is provided with the usual key receiving slot, the usual locking pins, the levelling pins, the return springs, etc. Additionally the barel is provided with the encircling groove 665 which may be engaged with the stud 666 when the barrel has been drawn rightwardly sufficiently to engage the pins 127' with the studs 128' for the re-setting to zero operation, such groove ensuring that such rightward positioning shall be retained during the complete re-setting to zero, as in the operations already described in connection with the previous embodiment of the present invention.

After the re-setting to zero operation has been performed and the crank 300' has been restored to its initial or un-rotated position the crank and barrel may be pushed inwardly or leftwardly to bring the right-hand end of said barrel to a position where the stud 666 may ride against such right-hand end of the barrel. Thereupon said crank and barrel may be rotated in the opposite direction as many times as needed to effect the desired pre-setting of the counter to whatever amount may be desired. Such pre-setting will be effected by the following means:

The right-hand end of the sleeve 659 is slotted or notched crosswise as shown at 667 in Figure 34, and the shaft extension 122ª' is provided with the cross pin 668 which will be engaged with such slot 667 when the crank and barrel are shifted leftwardly as will be evident from Figure 34. The parts of the several orders units of the counter are so spaced that during this leftward movement the pins 127' will not interfere with other elements of the counter. Having effected such leftward movement the rotation of the barrel may be continuously effected with the right-hand end of the barrel riding against the stud 666, thus retaining the pin 668 properly engaged with the slot 667 during such pre-setting rotations. Also, as many such pre-setting rotations may be made as may be needed to pre-set the counter to the desired amount. Thereupon the crank and barrel may be restored to their central position where the pin 668 will be disengaged from the slot 667, and the key removed from the lock, to restore the same to its normal or locked condition. In case it should be desired to effect such pre-setting operations to partial gallons (for example, tenths) when one rotation of the units order element corresponds to one gallon, the lock barrel may be provided with rightwardly extending gates such as shown at 669 properly positioned to permit rightward movement of the barrel at such tenths gallon positions; in case it should be desired to effect such pre-setting operations to full gallons when each rotation of the units order element corresponds to ten gallons, the lock barrel may also be provided with such rightwardly extending gates, 669, properly positioned to permit rightward movement of the barrel at such full gallons positions. In either case there would be provided ten such gates 669 spaced equidistantly around the end of the barrel, that is, every 36 degrees. Thus the barrel could be restored leftwardly at completion of each tenth gallon or each full gallon, as the case would be, during the pre-setting operation.

I shall presently describe a typical wiring diagram including various relays and other elements which may be used in connection with the modified arrangement thus far described. Included in such wiring diagram there is switching means which is operated by the endwise movements of the crank 300' and the shaft 122ª', so that the circuits are modified by such endwise movements. In Figure 34 I have shown the disk of insulating material 670 secured to the shaft 122ª', together with the switch 671 adjacent to such disk, said switch including the two pairs of contacts, 672 and 673, and 674 and 675, respectively. The disk 670 is located between the contacts 673 and 674, and when the crank and shaft stand in their central position endwise, as shown in Figure 34, this disk retains the contact 674 in engagement with the contact 675, both of the contacts 672 and 673 being separated from each other. Movement of the crank and shaft to the right will allow the contacts to retain their conditions of engagement shown in Figure 34, that is, with the contacts 672 and 673 still disengaged from each other, and with the contacts 674 and 675 still engaged with each other. On the other hand, movement of the crank and shaft towards the left from the position shown in Figure 34 will allow the contact 674 to move away from the contact 675, due to the biasing of the leaf 674, and then the contacts 673 and 672 will be brought together, and will be retained in that condition during the re-setting operation.

This switch 671 is conveniently supported by the plate 87', as shown in Figure 34.

L. *Comparison of certain operations of the embodiment of Figures 1 to 31, inclusive with that of Figures 32 to 36, inclusive*

Before describing the wiring diagram shown in Figure 36, the following comments are in order respecting the pre-setting operations of the two embodiments herein illustrated and thus far described:

In the arrangement shown in Figures 1 to 31 the pre-setting of the supplemental counter is effected by driving the disk 92ª of the units order in the additive direction, such driving acting through the pawl 98 and the teeth 97 of the units order element 91ª to effect rotation of the units order element. Continued driving thereof acts through the carrying devices to carry tens in the usual manner during the pre-setting operation. During this pre-setting operation the element 169 must also rotate, whereas the sprocket 177 must remain stationary, since the other conventional counter and the meter are not rotating. Such rotation of the element 169 during presetting is permitted by reason of the friction drive provided by the engagement of the flange 172 and the face of the sprocket disk 173 under pressure of the spring 174. Thereafter, during delivery of liquid by nozzle operation and control, the friction of this drive is sufficient to ensure proper downward rotation of the supplemental counter towards the zero position. On the contrary, in the arrangement of Figures 32 to 36, inclusive, the pre-setting operation is effected by direct drive of the cylindrical element 91$^{a'}$ of the units order unit, by rotation of the sleeve 125$^{a'}$, and corresponding pre-setting rotation of the higher orders units would of course be effected through the carrying mechanism from order to order. During such pre-setting of the units order element 91$^{a'}$ the advancement of such element 91$^{a'}$ could occur without need of corresponding advancement of the end disk 92$^{a'}$, since the teeth 97' of such element could advance without need of corresponding advance of the pawl 98', the teeth riding over the pawl. In such operation the flange 172' could remain stationary and without need of slip with respect to the sprocket 177'. In such case the friction drive between the sprocket 177' and the flange 172' might be eliminated. I have, however, shown such friction drive arrangement in the embodiment of Figures 32 to 36, inclusive, so that proper operations and functions may be secured in cases in which the pawl and tooth drive is not provided between the cylindrical element 91$^{a'}$ and the end flange 92$^{a'}$ shown in Figure 34. In such a case the said end flange would rotate with the cylindrical element, and pre-setting could be effected through the slippage allowed by the friction drive.

I wish to point out, however, that when the supplemental counter reaches its zero position during a delivering operation, said counter is physically locked against overrun in the down count direction by engagement of the hook 120—121 with the shoulder 133 of the block 111$^a$. At the same instant the contacts are intended to reverse position so as to bring about cessation of liquid delivery. If, for any reason there should be failure of the proper elements to function to thus terminate liquid delivery when the zero position was reached, with either of the embodiments shown herein, the unintended continued delivery of liquid could occur, without corresponding further rotation of the supplemental counter in the downward direction, and without damage to the parts, since the friction drive would, in such case yield whether the operation were to occur in the case of either of the forms of embodiment herein illustrated. In the absence of such yield of the friction drive under such exceptional and unintended conditions, a serious load would be imposed on the elements of the meter, since physical movement of that meter would have been prevented and the hydraulic pressure exerted by the pump would then be exerted against the elements of the meter, tending to continue the meter in rotation. Such danger is eliminated by the provision of the friction drive in both of the embodiments illustrated.

M. *The wiring diagram for the embodiment of Figures 32 to 35, inclusive*

A.—GENERAL STATEMENT

In Figure 36 I have shown the main current supply key-lock 416' which must be unlocked by the authorized attendant in order to supply current from the mains 528 and 529 to the lines 676 and 677 of the stand. Having unlocked the switch 416' to supply current to the lines 676 and 677 the setting unit 660 is next manipulated. Having unlocked this unit the barrel is first drawn to the right to then rotate it clockwise one revolution and re-set the counters to zero. During this operation the contacts 674 and 675 remain engaged with each other, and the contacts 672 and 673 remain disengaged from each other.

The zeroizing cam disk on the shaft 110' of the conventional counter controls four contacts as follows; 678 and 679 engaged when the counter is at zero and disengaged otherwise, and 680 and 681 disengaged when the counter is at zero and engaged otherwise. The zeroizing cam disk on the shaft 110$^{a'}$ of the supplemental counter controls seven contacts as follows; 682, 683 and 684, of which 683 engages 682 when the counter is at zero and is not engaged with 684 at such time, and 683 engages 684 when the counter is not at zero and is disengaged when the counter is at zero; also contacts 685 and 686 which are engaged when the counter is at zero and are disengaged otherwise and contacts 687 and 688 which are disengaged when the counter is at zero and are engaged otherwise.

The hook controls the following contacts; 689 and 690 which are engaged when the hook is down and are disengaged otherwise, and 691 and 692 which are disengaged when the hook is down and are engaged otherwise.

Three locking relays are shown, as follows; relay 693 having the locking or setting solenoid 695 and the releasing solenoid 694; relay 696 having the locking or setting solenoid 697 and the releasing solenoid 698; and relay 699 having the locking or setting solenoid 700 and the releasing solenoid 701. Each of these locking relays controls a single pair of contacts as follows; Relay 693, contacts 702 and 703, relay 696, contacts 704 and 705, and relay 699, contacts 706 and 707.

Contact 679 connects to line 676 by the connection 708. Contact 678 connects to contact 683 by the line 709, and contact 682 connects to one side of releasing solenoid 694 by the line 710. The other side of this releasing solenoid connects to the return line by the connections 711 and 712. Therefore this releasing solenoid is energized when both counters are at zero positions, thus ensuring that relay 693 will be released at such time, with its contacts open as shown in Figure 36.

B.—PRE-SETTING THE SUPPLEMENTAL COUNTER TO A SELECTED AMOUNT

Having set both counters to zero, the unit 660 is manipulated by pressing its crank towards the left to engage the pin 668 with the cross slot 667 (see Figure 34), and then the supplemental counter may be pre-set to whatever amount is requested by the purchaser. This leftward movement will allow disengagement of contacts 674 and 675 and will engage contacts 673 and 672.

C.—PUMP MOTOR CONTROL

The contacts 702 and 703 comprise a portion of the circuit of the locking solenoid 697 of relay 696. This relay's contacts 704 and 705 comprise a portion of the circuits to supply the pump motor at proper times and under proper control. It is desired that current supply to the pump motor shall ensure pumping action when the hook is raised, and on the presumption that both counters had been re-set to zero, and that such supply shall then be available as long as the hook remains in raised position, and until the supplemental counter has returned to its zero position. Also, that in case the hook shall be lowered before complete return of the supplemental counter to zero the current supply to the pump motor shall be discontinued and shall not again be available until both counters have been again re-set to their zero positions.

The above results are secured as follows:

When the counters were both zeroized the contacts 678 and 679 were brought together, thus establishing a circuit to energize the releasing solenoid 694 of relay 693 and ensuring engagement of the contacts 702 and 703 with each other so that solenoid 697 of relay 696 was energized, and its contacts 704 and 705 were engaged with each other. Contact 704 connects to the positive line 677 by the lines 713 and 714. Contact 705 connects by line 715 to hook contact 692. Companion hook contact 691 connects by line 716 to one side of the pump motor, and the other side of the pump motor connects by line 717 to line 717' and thence to the return side of the system. Thus the previous operation of zeroizing both counters established connections such that when the hook should afterwards be raised the motor circuits would be completed and the motor and pump started. However, up to this point the hook is still locked down, so that contacts 691 and 692 cannot come together. It is therefore needful to energize the solenoid 560' in order to release the hook and allow it to rise. One side of the solenoid 560' connects by the line 718 to the line 714 which connects to the positive line 677. The other side of said solenoid connects by the line 719 to the line 720 which connects to the contact 684 of the supplemental counter. Companion contact 683 connects by the line 709 to contact 678 of the conventional counter. Companion contact 679 connects by the line 708 to the other side of the system. Thus, when both counters have been zeroized, and when the supplemental counter is thereafter pre-set to some desired amount or value, contacts 684 and 683 will be brought together to complete the circuit of the solenoid 560'. Thus it is possible to institute pump motor operation. Liquid can then be delivered from the nozzle. Such delivery can be made, however, only when the shut-off valve 73' has been opened and as long as such valve is retained open. One side of the solenoid of this valve connects by the line 721 to the contact 707 of relay 699. The other side of the valve solenoid connects by the line 722 to the contact 688 of the supplemental counter. Companion contact 687 connects to the supply line 676. Contact 706 of relay 699 connects by line 714 to supply line 677. Thus the setting of relay 699 will serve to supply current to the valve solenoid as long as the contacts 688 and 687 remain engaged.

The setting solenoid 700 of the relay 699 has one end connected to the line 714 which connects to one side of the system. It has already been shown that the line 720 connects to the contact 684 of the supplemental counter. The other end of said setting solenoid 700 connects to the line 720 by the line 723. Therefore the setting of the relay 699 occurs when the contacts 683 and 684 come together. Such action occurs when the supplemental counter is pre-set away from its zero position to the desired amount or value, so the setting of the solenoid 699 occurs while the conventional counter is still at its zero position, and when the supplemental counter has been moved away from its zero position. It will remain in such set or locked condition even after the conventional counter has begun to count up, concurrently with delivery of liquid. Thus the shut-off valve will have been opened by the time that liquid can be called for from the nozzle.

One side of each of the releasing solenoids 698 and 701 of the relays 696 and 699 connects to the line 714 which connects to the positive side of the system. Both of the other ends of these solenoids connect to a line 724 which connects to the contact 686 of the supplemental counter. This contact closes against the companion contact 685 when the supplemental counter reaches its zero reading during a liquid delivering process. The contact 685 connects by the line 725 to the contact 680 of the conventional counter, and the companion contact 681 connects to the line 676. Accordingly, the releasing solenoids of the two relays 696 and 699 are energized when the supplemental counter returns to its zero position, under the condition that the conventional counter has moved away from its zero position. It is thus evident that when the predetermined amount or value of liquid has been delivered the relay 696 will be released to thus discontinue current supply to the pump motor, and the relay 699 will also be released to discontinue supply of current to the valve 73', thus closing the liquid delivery line leading to the meter and the nozzle.

D.—THE SIGNAL LAMP SHOWING PRE-SETTING COMPLETED

The signal lamp 726 has one terminal connected by the line 727 to the contact 675 which is the companion of the contact 674, and the contact 674 connects to the line 676. The other terminal of the signal lamp connects by the line 728 to the contact 707, and the companion contact 706 is connected to the line 677. Thus the setting of the relay 699 by energization of its solenoid 700 will serve to light the signal lamp. Such setting of the relay occurs when the conventional counter is at zero, and when the supplemental counter has been moved by pre-setting away from its zero position. It is also noted that the contacts 674 and 675 are separated from each other during the operation of pre-setting the supplemental counter, since the barrel of the unit 660 is shifted to the left during such pre-setting operation. Accordingly, the signal lamp will actually be lighted when the barrel 660 has been allowed to return to its normal position after the pre-setting of the supplemental counter. At this time all preliminary operations have been completed preliminary to delivery of liquid. Such signal lamp is shown on the stand illustrated in Figure 32, and it constitutes a signal for guidance of the operator of the stand.

E.—EMERGENCY OR "NON-AUTOMATIC" OPERATION CONTROL LOCK

There is shown in Figure 32 the "Attendant's Emergency Key Lock Switch" 422'. This switch corresponds to the switch 422 shown in Figure 1 and performs similar functions. This switch is shown also in the wiring diagram of Figure 36. It includes the six contacts, 729, 730, 731, 732, 733 and 734, comprising the three pairs, 729 and 730; 731 and 732; and 733 and 734. The contacts 729 and 731 are connected to the line 714 which connects to the positive lead 677, such connection being effected by the line 735. The contact 730 connects to the lead 716 by the line 736; the contact 732 connects to the lead 721 by the line 737; the contact 733 connects to the lead 710 by the line 738; and the contact 734 connects to the lead 722 by the line 739. With this scheme the operation of this switch to engage its contacts by the pairs above stated, it is possible to supply current to the pump motor, and to retain the shut-off valve open, for continued delivery of liquid as long as desired, and without limitation of quantity or value of such liquid, as an emergency operation.

NORMAL SEQUENCE OF OPERATIONS

Assuming that the Attendant's Key-Lock unit 83 was locked after the previous dispensing operation, as would generally be the case upon opening the stand for business in the morning the current supply to the stand would then be completely cut off. Then the unlocking of said key-lock would be the first operation:

1. Attendant unlocks the Main Switch 83 (416) by his proper key.

This electrifies the line 545 (positive) from the supply line 529, over the line 531, and electrifies the line 552 (negative) from the supply line 528, over the line 530. As yet, however, the customer cannot effectively perform any self-service operation since the Coin Return Chute 419 is open and the gate 567 is in the coin reject position so that any inserted coins will be immediately returned; and also the Customer's Button 418 cannot yet be effectively operated since the necessary lines are not yet electrified. It will appear under No. 2 that the necessary conditioning for Customer Button operation must include zeroizing both of the "Amount of Sale" and "Prepay" counters which will have been left in the condition in which they had been moved at termination of the previous dispensing operation. That condition will include the standing of the "Amount of Sale" counter at some high reading representing the amount of sale of the previous operation, even if the full complement of liquid had been withdrawn during that previous operation, with consequent return of the "Prepay" counter to zero. Therefore, the next preliminary operation to condition the stand for customer use will include:

2. Attendant re-sets both counters to their zero position by use of his proper key inserted into the lock 288 to unlock the same, and his proper operation of the crank 300 to effect the re-setting operations for both counters, to zero.

*Note.*—The line 552 leading to the Customer's Button is electrified negatively as soon as the key-switch has been unlocked as defined in No. 1. However, the positive line 548 leading the the setting solenoid 526 of the relay 525 is not connected to the positive supply line, so the depression of the Customer's Button at this time will not set said relay since said setting solenoid will not be then energized.

The zeroizing of both counters serves to electrify the line 548 positively as follows: leads 531, 545, 546, contacts 543—544 of "Amount of Sale" counter (same being at zero), lead 547, contacts 537—536 of "Prepay" counter (same being at zero) to lead 548. Under these conditions both counters being zeroized, depression of the Customer's Button, 418, will energize setting solenoid which is connected to lead 548, by the leads 549, 550, Button 418, and lead 551 to negative lead 552.

It is thus evident that the attendant must key-operate both the Main Switch element and the re-setting to zero element for both counters before the customer may effectively depress the Button 418.

3. The Main Relay 578 controls the connection of the negative line 530 to those operational elements located to the left of the contact 582 of said Main Relay. When this contact is separated from its companion contact 581 the negative line 583 is unconnected to the return terminal 530—528, so that various functions cannot be performed nor can various elements of the stand be operated until said line 583 has been negatively electrified by connection effected through the relay contacts 582—581 by the setting of that relay. Said Main Relay was opened at conclusion of the previous dispensing operation by replacement of the nozzle on its hook, as will presently appear in No. 18, which operation energized the releasing solenoid 580, of the Main Relay. This releasing operation is provided with a short delay, as legended in Figure 31, for a purpose which will be explained later.

The depression of the Customer's Button 418 serves to set this Main Relay as follows:

From positive line 545 over line 584 to setting solenoid 579, leads 585—550, Customer's Button 418, and lead 551 to negative lead 552 (being to the right hand side of the contacts 581—582 of the Main Relay). Thus the depression of the Customer's Button conditions the negative side of the system so that various necessary operations may then be carried out. But that conditioning of the negative side of the system is pre-conditioned on the re-setting of the two counters to zero.

Included in the operations whose performance is dependent on the setting of this Main Relay are supply of current to the Pump Motor, and energizing of the valve releasing solenoid. Therefore both re-setting of the two counters to zero and depression of the Customer's Button are pre-conditions to the ability to pump liquid and to deliver it when under pressure due to pumping.

4. The customer's operation of depressing his Button 418 must follow the re-setting of the counters to zero. The lamp 417 conveniently located on the stand in position to be readily seen by the customer indicates that the zeroizing operation has been completed. The lighting of this lamp is not dependent on the setting of the Main Relay with its closing of its contacts 582 and 581 together, but is dependent solely on the zeroizing of the two counters: This is shown by the following lamp circuit:

From positive lead 545 through lead 546, contacts 543—542 of "Amount of Sale" counter, lead 547, contacts 537—536 of "Prepay" counter, leads 548—577, lamp 417, and lead 576 to negative lead 552 (at right-hand side of the contacts 581—582 of the Main Relay). Thus the signal lamp 417 will be lighted as soon as the two counters have been zeroized by the attendant.

5. The indication given by the lamp 417 is that the counters have been "Pre-Set to Zero," or re-set, as legended on Figure 1. Following the arrows of that figure from such lamp one is lead to the slot 248 which is legended "Insert Coins." Thus the lighting of the lamp 417 is to be followed by the insertion of such numbers and denominations of coins as the customer may desire (within the capacity of the stand to receive and count them). It is to be here noted that although the customer might depress his Customer's Button 418 when the lamp 417 showed by its illumination that the two counters were zeroized, still such a depression could not be effective to bring the motor into operation for pumping purposes, nor could it result in the opening of the liquid valve by energization of the solenoid 73, since these operations are dependent on the need of bringing the "Prepay" counter into a non-zero position subsequent to introduction of the desired coins by the customer, and the counting of said coins and corresponding presetting of the "Pre-Set" counter to its proper setting. This is one reason why the stand has been legended as shown, to indicate to the customer that his next move, after observing the lighting of the lamp 417 is to "Insert Coins."

6. When the lamp 417 becomes illuminated the customer shall insert his selected numbers and denominations of coins into the slot 248 (see Figure 1). These are not yet counted or registered on the "Prepay" counter, but they await the proper operation of the customer to effect start of such operations. This will be done by depression of the Customer's Button 418. It is noted that certain precautionary provisions have been made to insure correct operations up to this point.

A. No coins should be introduced prior to the re-setting of the counters to zero. This is ensured by the following provision: If the cusomer should improperly insert any coins before the two counters had been zeroized said coins would be returned through the chute legended "Coin Reject" (Figure 1), being the chute 419 of Figure 31. This is true for the following reason; the gate 567 is normally drawn across the chute 249 to bring the slot 248 into direct connection with the reject chute 419, the spring 569 ensuring this normal condition. The solenoid 570 must be energized to draw the gate into the position of Figure 31. Such energization must be by the circuit from the positive lead 531, by leads 545, 575, 574, through the contacts 562—561 of the nozzle hook, lead 573 to contacts 534—535 of the "Pre-set" counter, lead 572 to the gate operating solenoid 570, lead 571, contacts 557—556 of the relay 525, and leads 558—552 to the negative lead 530. This means that the nozzle must be on its hook, the relay 525 must be in its released position, and the "Prepay" counted must have been re-set to zero and still be at its zero position in order that the gate 567 may be drawn and held in the position shown in Figure 31, and thus to feed the inserted coins to the chute 249 preparatory to their passing through the counting and pre-setting equipment. The relay 525 was released to its released position at conclusion of the previous coin counting and presetting operation, and will remain in such condition until the present or current coin counting and pre-setting operation has been instituted and gone through to its completion. Accordingly, that pre-requisite has been complied with. Of course the "Prepay" counter has been zeroized and remains in that condition as we have explained. The nozzle hook must also be in its lowered condition. It was locked and retained in that condition when the previous dispensing operation was completed. This is true as shown below.

67

B. The hook was lowered at conclusion of the previous operation by placement of the nozzle on such hook. The hook was then latched in lowered condition by the latch 72, the latch solenoid 560 being un-energized. With the hook thus latched lowered the contacts 561—562 are engaged. The energizing of the solenoid 560 is dependent on the closing of a circuit including the contacts 589—590 of the relay 586. This requires the energizing of the setting solenoid 587 of said relay. This energizing is effected at conclusion of the coin counting and pre-setting operation by an impulse delivered over the line 524 from the selector of the coin counting unit, and that line is electrified only at return of the selector to its zero position at conclusion of the counting and pre-setting for the last coin. (See No. 16 hereinafter.) Accordingly the three conditions, including the lowered condition of the nozzle hook, have been complied with to hold the gate in its position of Figure 31 so that the coin counting and the pre-setting operations may be commenced and carried through to conclusion.

7. In case the customer should improperly depress the Starting Button 418 prior to having inserted some coins through the Insert Coins slot 248, no dislocation of the foregoing precautionary arrangements will occur. This is true as shown below:

A. Depression of the Customer's Button 418 will set the relay 525 by energization of the solenoid 526 as follows; from positive line 531, over leads 545—546, contacts 543—542 of the "Amount of Sale" counter, lead 547, contacts 537—536 of the "Prepay" counter, lead 548 to setting solenoid 526, of relay 525, Customer's Button 418, leads 551—552 to negative line 530. This will at once set the relay 525, closing contacts 553—554 of that relay. This closure of contacts 553—554 will develop the following circuit, from positive line 531, over lead 545 to contacts 553—554 (now closed) of relay 525, leads 490—492, contacts 428—427 of switch 282ᵃ, lead 504, contacts 467—466 of relay 448, lead 506, contacts 431—430 of switch 282ᵇ, lead 512, contacts 471—470 of relay 449, lead 513, contacts 434—433 of switch 282ᶜ, lead 519, releasing solenoid 519 of relay 525, leads 559, 558 and 552 back to negative line 530. Therefore the relay 525 will promptly release itself after the customer has ceased his depression of the Customer's Button 418. It is noted that the switches 282ᵃ, 282ᵇ and 282ᶜ are in the contact closing positions needed for production of the above defined circuit since it was a presumption that the customer had depressed the Customer's Button 418 without having inserted any coins.

B. Now there will also be produced another circuit under the stated conditions (depression of the Customer's Button and momentary setting and releasing of the relay 525) as follows: From the line 519 (see "A" above), over line 518, contacts 475—474 of relay 450, leads 521—523 to "Zero" switch 227 of the selector 228, contacts 443—442 of said switch, lead 524, setting solenoid 587 of relay 586, leads 591—583, contacts 582—581 of Main Relay 578, and lead 530 to negative side. This will momentarily set the relay 586, closing contacts 589—590. This might develop a circuit as follows: From positive line 531, over leads 545—575—592, contacts 589—590, lead 593, releasing solenoid 560 of the hook, leads 594—591—583, contacts 582—581 of the Main Relay 578, and back to negative line 530. If this last circuit should be retained the hook would be released and would rise when the nozzle was removed from the hook. However, at the same time said hook solenoid energizing circuit is developed another circuit is closed as follows: positive line 531, leads 545—575—574, hook contacts 562—561, lead 573, contacts 534—535 of "Prepay" counter, lead 596, releasing solenoid 586 of relay 586, leads 595—591—583, contacts 582—581 of Main Relay 578, and back to negative line 530. It is thus evident that several circuits are simultaneously established so that the relay 586 could not be effectively "set" to cause release of the hook lock or latch. Even should that hook be momentarily released it would immediately re-set itself by de-energization of its solenoid 560, prior to the time the customer could take the nozzle from the hook.

C. The net effect of the foregoing relationships is that interlocks are provided whereby any depression of the Customer's Button 418 after the lighting of the signal lamp 417, but prior to insertion of at least one coin through the slot 248 would result in the non-setting of the relay 525 for any effective purpose, and the failure to effectively release the hook. This latter feature of interlock is important since the current supply to the pump motor cannot be provided until the hook is allowed to rise, and, as just shown, that operation cannot be effectively produced when the Customer's Button is depressed prior to insertion of at least one coin.

D. The delivery of current to the valve solenoid 73 is dependent on closing contacts of the "Prepay" counter which contacts do not close until that counter is moved to some position other than its zeroized position. That latter action cannot occur when no coins have been inserted through the slot 248. Therefore the depression of the Customer's Button 418 prior to insertion of at least one coin cannot be effective to cause the valve solenoid to be energized, so said valve will remain closed against any possible delivery of liquid.

It thus appears that interlocks have been provided in the so-far detailed operations to ensure against any delivery of coins through the chute 249 to the coin separating and counting and pre-setting equipment until the two counters have been zeroized by a re-setting operation carried out by the attendant with his key, as indicated by the lighting of the lamp 417; and that interlocks have been provided to ensure rejection of coins introduced into the slot 248 prior to such a re-setting operation by the attendant; and it also appears that interlocks have been provided to ensure against effective depression of the Customer's Button 418 when no coin has been inserted into said coin slot 248 after the attendant's zeroizing and re-setting operation.

8. Up to the present stage in the sequence of operations the pump motor has not been supplied with operating current and the valve nozzle has not been released by energization of its solenoid 73. The interlocks whereby these operations are produced are next explored as follows:

9. The pump motor circuits include the pump motor relay 597. Until this relay is "set" its contacts 600—601 are separated thus preventing supply of motor current to the pump motor. The setting of this pump motor relay requires that three conditions be complied with, as follows: The hook must be in its raised condition, the nozzle having been removed, the "Amount of Sale" counter must be at zero, or re-set to that condition, and the "Prepay" counter must be at some position other than zero, indicating that at least one coin has been inserted through the slot 248, and been counted, with corresponding pre-set of the "Prepay" counter. The taking of the nozzle from the hook must be effected by the customer or some one for him, and as will appear hereunder in paragraph No. 15–A the lighting of the signal lamp 420, indicating that the coins have all been counted with corresponding pre-setting of the "Prepay" counter is the signal to the customer that he should take the hose and control the delivery of the liquid.

10. The valve solenoid circuits include provisions such that said solenoid is energized only when the "Prepay" counter has been pre-set to some value other than zero. This is done by the following circuit:

A. From the positive line 531, over the leads 545—604, contacts 539—538 of the "Prepay" counter, lead 612 to the valve solenoid 73, leads 611—594—591—

583, contacts 582—581 of the Main Relay, back to the negative line 530.

B. The closing of the valve depends on de-energization of said circuit. This occurs as soon as the "Prepay" counter moves away from its zero position by delivery of some liquid, and such condition continues until said "Prepay" counter returns to zero after a full complement of liquid has been delivered. Thereupon said contacts separate thus opening the circuit, de-energizing the solenoid 73 and allowing the valve to close.

C. It is noted that with the above provisions the valve opens as soon as the "Prepay" counter moves away from zero, and this will occur at the beginning of the pre-pay counting and pre-setting operation. The valve afterwards closes as soon as the full complement of liquid has been delivered (if that full complement is taken from the stand). It is also noted that the pump motor is not supplied with current until the nozzle is taken from its hook and the latter is allowed to rise, so that there is no danger of improper delivery of liquid prior to the taking of the nozzle from its hook, and no danger is entailed by the opening of the valve prior to completion of certain other operations.

D. It is also noted that immediately the "Prepay" counter returns to its zero position the solenoid 73 is de-energized, thus ensuring closing of the valve, and ensuring very prompt stoppage of delivery of liquid even though the attendant may be slow in replacing his nozzle on its hook, and even though the stoppage of the pump may be sluggish after current has been cut-off from its motor.

11. The pump motor circuits include the following:

A. The setting of the pump motor relay 597: This operation brings together the relay contacts 600—601 to close part of the pump motor circuit. Said relay 597 is energized as follows; From the positive line 531, leads 545—604, setting solenoid 598, lead 605, contacts 541—540 of the "Amount of Sale" counter, lead 606, contacts 566—565 of the nozzle hook, lead 607, contacts 533—532 of the "Pre-pay" counter (that counter having been pre-set to amount of prepay), leads 608—583, contacts 582—581 of the Main Relay, and back to negative line 530. This operation will "set" the pump motor relay 597, bringing its contacts 600—601 together. This will establish the following pump motor supply circuit;

B. From positive line 531, over leads 545—575—592 to pump motor 51, returning over lead 602 to pump motor relay contacts 600—601, leads 603—583, contacts 582—581 of Main Relay, and back to negative line 530.

C. Pump motor operation will then continue until the releasing solenoid 599 of the relay 597 is energized. This is done by the following circuit;

D. From positive line 531, over leads 545—564, contacts 543—542 of the "Amount of Sale" counter (this counter having moved away from its zero position due to delivery of liquid), lead 596, contacts 535—534 of "Prepay" counter (said counter having returned to its zero reading if the full complement of liquid was delivered), lead 573, releasing solenoid 599 of the pump motor relay 597, leads 609—583, contacts 582—581 of the Main Relay, and back to the negative line 530.

E. Thus the pump motor operation will be discontinued by cutting off its current supply when the "Prepay" counter returns to zero.

Now the return of the "Prepay" counter to zero is the normal or intended operation of the stand, and from the above explanations it is clear that when such intended operation is fully carried out by taking the full complement of liquid for which pre-payment was made the pump motor operation will be discontinued at completion of the liquid delivery of pre-paid amount. It is noted, however, that in case the customer does not take the full complement of liquid the "Prepay" counter setting indicated, said counter will not have returned to zero when the liquid delivering operation was discontinued, generally by allowing the nozzle valve to close by releasing it. Under these conditions the pump motor would continue to receive current and continue to run, with development of liquid pressure and consumption of current indefinitely. This contingency is, however, provided against as follows:

F. The depression of the nozzle hook by replacement of the nozzle thereon will energize the releasing solenoid 599 of the motor relay 597. This is done as follows; From positive line 531, over leads 545—575—574, contacts 562—561 of the nozzle hook element, leads 573—610, releasing solenoid 599, leads 609—583, contacts 582—581 of the Main Relay 578, and back to negative line 530. Thus the replacement of the nozzle on its hook will discontinue current supply to the pump motor irrespective of the positions of the two counters, and merely by replacement of the nozzle on its hook.

12. It is noted that the termination of current supply to the pump motor as explained in paragraph 11–F above serves to bring an end to all of the operations of the stand, including several not yet detailed. This termination is ensured by the energizing of the releasing solenoid 580 of the Main Relay 578 by such restoration of the nozzle to its hook. Therefore, having restored the nozzle to its hook, no further activities may be carried out by the stand until the attendant again comes to the stand with his proper keys and performs the preliminary operations incident to commencement of a completely new dispensing operation. These operations have been detailed previously herein.

13. When the nozzle hook has been lowered, generally by re-setting the nozzle thereon, said hook will be latched in its lowered position by the latch 72 which is spring projected into the latching position. This latch cannot be released except by energization of the solenoid 560. Therefore the operations incident to releasing the nozzle hook and allowing it to rise cannot be performed until that solenoid is energized. Under No. 10–C, and under No. 11–A it was shown that the initiation of current supply to the pump motor is dependent on the "setting" of the relay 597, and that that setting operation requires the raising of the nozzle hook by removal of the nozzle therefrom. But removal of the nozzle from its hook will not of itself release the hook to permit it to rise. Such release must be effected by energization of the solenoid 560 thus withdrawing the latch 72. This latch releasing operation is produced by the termination of the counting and pre-setting operations after the coins have been introduced through the slot 248, and after the operations initiated by depression of the Customer's Button 418 have been concluded, insofar as those operations relate directly to the counting and pre-setting functions. We therefore explore the operations further as follows:

14. The depression of the Customer's Button 418 has been discussed under Nos. 6 and 7 above. It is assumed now that one or more coins were introduced through the slot 248 prior to that Customer's Button operation. This "sets" the relay 525 by energizing the setting solenoid 526 as follows:

A. From the positive line 531, over leads 545—546, contacts 543—544 of the "Amount of Sale" counter, lead 547, contacts 537—536 of the "Prepay" counter, lead 548, setting solenoid 526 of the relay 525, Customer's Button 418, leads 551—552, to the negative line 530. This will set said relay 525, and it will remain so-set until the releasing solenoid 527 is energized.

B. Setting the relay 525 brings together the contacts 553—554 to connect the positive lead 545 to the lead 490 of the selecting and counting equipment. Such relay setting also brings together the contacts 556 and 555 to connect the negative lead 552—558 to the lead 491 of the selecting and counting equipment. These leads or buses 490 and 491 will remain electrified as long as the relay 525 remains so-set.

C. The detailed operations and various changes of connections incident thereto in the selecting and counting equipment need not be repeated here. At conclusion of such operations the releasing solenoid 527 of the relay 525 is energized to release said relay, as follows:

D. From positive line 531, over leads 545, contacts 553—554 of relay 525, leads 490—492 to contact 428 of switch 282ᵃ, and through the next two sections of the selector equipment, to the contacts 434—433 of the switch 282ᶜ, lead 519, releasing solenoid 527, and leads 559—558—552 to the negative line 530. (It is understood that the switches 282ᵃ, 282ᵇ and 282ᶜ are all in their closed positions as shown in Figure 31, and that the other switches and parts are also in the positions indicated in that figure, due to the fact that the final coin has been released and counted.) Thus, at conclusion of such coin counting and pre-setting operations the bus-bars 490 and 491 will be de-electrified. This is a safety feature since it assures against any improper signalling to the clutch 222 of the "Prepay" counter, and ensures against other improper operations.

15. The conclusion of the counting of the last coin lights the signal lamp 420 for a short time to signal that the operations have reached that stage when the customer may take the nozzle off the hook and proceed with his delivering operation. This signal is produced as follows:

A. Said signal lamp is connected between the leads 558 (negative) and 521, which last lead is connected to the contact 474 of the relay or switch 450, connection between the lamp 420 and said contact being over the leads 522—521. Now at conclusion of the count of the last coin the various switches and relays are in the conditions as shown in the right-hand portion of Figure 31. Accordingly, contacts 474—475 of switch 450 are engaged as shown, thus establishing a connection from 475 to the bus-bar 490 through the various switches and relays of the equipment of the coin selecting and counting section. The bus-bar 490 was energized positively while the relay 525 was in its set condition. When the releasing solenoid 527 is energized said relay is released, thus separating the contacts 554—553 and killing the bus-bar 490. However, the relay 525 is legended as of "Short Delay" in Figure 31, so that a short time elapses between the energization of the solenoid 527 and the completion of the releasing operation. During that interval the desired signal is given by illumination of the lamp 420.

16. Under No. 13 it was stated that the releasing of the hook latch by energization of the solenoid 560 is produced by the termination of the counting and pre-setting operations, the coins having been introduced through the slot 248. This energization of said solenoid is produced as follows:

A. The conclusion of the count of the last coin is attended by closing of the "Zero" switch 227 of the coin selector element, thus bringing the contacts 442—443 of that switch together. Thus a lead 524 is connected to the lead 521 over the lead 523, which lead 521 connects to the contact 475 of the relay 450 and is positively electrified at conclusion of the operations, as has been shown under No. 15-A. A relay 586 is provided in connection with the control of the latch releasing solenoid 560. The setting solenoid 587 of the relay 586 has one of its terminals connected to the lead 524, and thus is connected to positive under the conditions that have been explained in No. 15-A. The other terminal of such setting solenoid connects as follows; leads 591—583, contacts 582—581 of the Main Relay, and to negative line 530.

B. The setting of the relay 586 brings together its contacts 589—590 to energize the latch releasing solenoid 560 by the following circuit; From positive line 531, over leads 545—575—592, contacts 589—590, of relay 586, lead 593, releasing solenoid 560, leads 594—591—583, contacts 582—581 of the Main Relay, and to negative line 530. The latch will be retained in its released condition until the releasing solenoid 588 of the relay 586 is energized. This will occur as soon as the "Amount of Sale" counter moves away from its zero position, due to delivery of some liquid. But that delivery of liquid will not occur until the nozzle has been taken from the hook, thus allowing said hook to rise, having been released as just explained. The energization of the releasing solenoid of the relay 586 is produced as follows;

C. From positive line 531, over leads 545—546, contacts 543—542 of the "Amount of Sale" counter (said counter having moved away from its zero position due to delivery of liquid), lead 596, releasing solenoid 588, leads 595—591—583, contacts 582—581 of the Main Relay, and back to the negative line 530. Thus the releasing of the latch holding solenoid 560 by de-energization of said solenoid is produced by the separation of the "Amount of Sale" counter contacts.

D. Since the release of the latch 72, allowing it to return to its latching position occurs after the "Amount of Sale" counter has moved away from its zero position it follows that such return of the latch cannot occur until after the customer has removed the nozzle from its hook, since the movement of the "Amount of Sale" counter away from its zero position cannot occur until some liquid has been delivered. But the release of the latch in the manner stated above conditions it so that when the hook is next lowered, by replacement of the nozzle thereon, the hook will be latched in such lowered position. Thus the various operations will be terminated by such lowering of the nozzle hook.

17. The printing unit is automatically controlled to effect print of the amount shown by the "Prepay" counter. The printing operation is normally produced by the lowering of the nozzle hook. This operation includes the use of the setting relay 613. When the nozzle hook is lowered the setting solenoid 614 of said relay is energized to bring the contacts 616—617 together when the relay is set. When the printer armature reaches a cut-off position (which is adjustable to ensure good printing) the contacts 389—390 come together to energize the releasing solenoid 354, allowing the armature and other printing elements to return to their "home" positions. These operations are produced as follows:

A. When the "Amount of Sale" counter moves from its zero position a circuit is established from the positive line 531, over leads 545—546, contacts 543—542 of the "Amount of Sale" counter, leads 596—623 to the solenoid 619 of a simple relay 618, leads 622—594—591—583 to contacts 582—581 of the Main Relay, and to the negative line 530. This circuit is established when the "Amount of Sale" counter has moved away from its zero position to some definite reading corresponding to a delivery of liquid.

B. The actuation of the simple relay closes another circuit as follows: From the positive line 531, over leads 545—546—627—626, setting solenoid 614 of relay 613, lead 625, contacts 563—564 of the nozzle hook, lead 624, contacts 620—621 of the simple relay 618, leads 622—594—591—583, contacts 582—581 of the Main Relay, and back to the negative line 530. This sets the relay 613, bringing together its contacts 616—617.

C. Another circuit is thus closed as follows: From positive line 531, over leads 545—546—627—630, printer solenoid 354, lead 629, contacts 617—616 of the relay 613, leads 628—624, contacts 620—621 of the simple relay 618, leads 622—594—591—583, contacts 582—581 of the Main Relay, and back to the negative line 530. Thus the printer solenoid is energized to effect printing.

D. At the terminus of the printer solenoid armature's intended movement its contacts 389—390 come together. The engagement of these contacts energizes the releasing solenoid 615 by the circuit as follows; From positive line 531, over leads 545—546—627—630, contacts 389—390 of the printer unit, lead 631, releasing solenoid 615, leads 632—628—624, contacts 620—621 of the simple relay 618, leads 622—594—591—583, contacts 582—581 of the Main Relay, and back to the negative line 530. Thus the supply of current to the printer solenoid 354 is terminated at the correct position in the working movement of the armature 366, and the printing operation has been concluded by the release of the contacts 616—617 of the relay 613.

It is seen that the operation "B" above recited includes the nozzle hook contacts 563—564, requiring that they shall be closed in order to effect printing. This of course means that until the said hook is lowered, generally by the replacement of the nozzle on the hook, the printing operation will not occur. Conversely, when the nozzle hook is lowered the printing operation sequence must commence and go through to completion, thus printing the desired slip or ticket showing the amount of any credit due the customer for over-payment.

*Note.*—The simple relay 618 eliminates certain complications of circuitry which might otherwise be encountered with the circuit arrangements shown in Figure 31. With other wiring schemes, also embodying the features of my present invention this relay may be eliminated.

18. The replacement of the nozzle on its hook and resulting depression of the hook is the final operation in the normal sequence, since the customer has then taken all of the liquid he desires to receive, but not more than he had made payment for. Various operations incident to this depression of the nozzle hook have been explained. Additionally to the previously explained operations produced by the lowering of the nozzle hook is the following one:

Lowering of the nozzle hook energizes the releasing solenoid 580 of the Main Relay, thus unlocking and releasing that relay, to its non-set condition, and separating its contacts 582—581. This contact separation has been referred to hereinbefore under No. 3. The lowering of the nozzle hook produces the function just stated by the following circuit:

From positive line 531, directly to the releasing solenoid 580 of the Main Relay, over the leads 634—633, hook contacts 563—564, lead 624, contacts 620—621 of the simple relay 618, leads 622—594—591—583, contacts 582—581 of the Main Relay, and back to the negative line 530. It is noted that since the Main Relay was closed and has remained closed until this operation, said contacts 582—581 are still engaged, so that the foregoing circuit may be thus completed. As soon as the circuit is thus completed the releasing solenoid 580 is energized, and, in the absence of any restraining influence it will promptly effect release of the contacts from each other, thus de-electrifying the negative line to the left-hand of said contact 582, and preventing further operations from being performed or brought to conclusion. However, it is noted that said Main Relay 578 is legended on Figure 31 with the definition "Short Delay," it being intended that the actual releasing operation shall be delayed such a time interval as will assure the completion of the printing operation, and any other operations incident to the final operations of the sequence.

19. Various functions of the stand are destroyed or prevented from being instituted by the separation of the contacts 582—581 of the Main Relay. Some of these are as follows:

a. Current cannot be supplied to the pump motor through normal channels.

b. Current cannot be supplied to the pump motor by a special operation (presently to be explained) produced by the attendant's use of a special key in the "Emergency Key Lock Switch" 422.

c. Current cannot be supplied to the valve opening solenoid 73 through normal channels.

d. Current cannot be supplied to the valve opening solenoid by a special operation produced by the attendant's use of a special key in the "Emergency Key Lock Switch" 422.

e. Current cannot be supplied to the latch release solenoid 560, so that the nozzle hook cannot rise even if the nozzle is removed from such hook.

f. Current cannot be supplied to the printer solenoid by use of the special Customer's Button 421, presently to be described.

Thus it is evident that the final operation of releasing the Main Relay 578 effectively disables further use of the stand. Further use thereof must be preceded by the re-setting of that Main Relay. As explained under No. 3 the setting of this Main Relay is produced by depression of the Customer's Button 418 after the attendant's key-operation of the Main Switch element 83 (416). Therefore full protection is afforded against any unauthorized use of the stand, once the nozzle has been replaced on its hook, or the hook depressed in any other manner.

SPECIAL MANUALLY CONTROLLED OPERATIONS: NON-AUTOMATIC OPERATION

The Attendant's Emergency Key Lock Switch element 422 is normally locked in its switch open position, and can be moved to its switch closed position only by the attendant's use of his special key.

20. Movement of the switch element 422 to its closed position produces the following operations:

a. Closes together contacts 638—639 to energize the solenoid 423 (Figure 9). This shifts the gear 193 rightwardly against urging of the spring 426, to disengage such gear from the companion gear 195, and thus make it possible to deliver an unlimited amount of liquid from the stand without limitation due to the zeroizing of the "Prepay" counter, and without need of slip between the elements 173—172 of the drive to the "Prepay" counter.

b. Closes together the contacts 640—641 to supply current to the valve solenoid 73 without regard to the other circuit controls for that solenoid, thus making it possible to deliver liquid indefinitely regardless of the shut-off controls of other elements.

c. Closes together the contacts 642—643 to supply current to the pump motor 51 directly without regard to the other circuit controls for that motor, thus making it possible to pump liquid indefinitely for delivery through the control nozzle, and under direct control of that nozzle for an indefinite and unlimited quantity of liquid delivery.

21. Depression of the manual printer button 421 on the stand produces printing of the then reading of the "Prepay" counter, to show how much of the pre-payment has at that moment been unused, and without need of carrying the delivery operation through to a point where the nozzle hook is lowered. (Lowering of the nozzle hook terminates the operations of delivery, so that they cannot be resumed without a completely new start with the necessary attendant's presence and unlocking and zeroizing operations, etc.) Depression of the printing button 421.

a. Delivers current directly to the printer solenoid 354 without regard to the readings of either counter or the contact positions of either counter, as long as the Main Relay 578 remains set so as to electrify the negative line to the left-hand of the contact 582. Such printer solenoid operation is produced by the following circuit; From the positive line 531, over leads 545—546—627—630, to printer solenoid 354, lead 629, manual printer button contacts 635—636, leads 637—608—583, contacts 582—581 of the Main Relay, and to negative line 530.

b. Since this manually controlled printing operation does not depend, for the continuity of its circuit, on the energizing and holding of the simple relay 618 it follows that printing can be effected manually by depression of the button 421 without need of the "Amount of Sale" counter having moved away from its zero position; that is, printing manually can be produced when the "Prepay" counter has been pre-set, but before any delivery of liquid has occurred. Thereby the customer may provide himself with a printed ticket or slip showing how much he had prepaid. Afterwards he may also provide himself (automatically) with the customary ticket or slip showing any credit due on account of a partial non-use of such prepaid amount.

From the foregoing statement of the normal sequence of operations, and the explanations relating thereto, the following brief condensation of relationships is produced:

A. It is necessary to turn on the current by the attendant's Key-Lock 83 (416) and also to zeroize both of the counters by use of the attendant's key-controlled lock 288, and use of the crank 300 before the Customer's Button 418 can be effectively used.

B. The re-setting or zeroizing of both counters is necessary to

*a.* Enable effective depression and setting of the Customer's Button and the relay 525 for their intended functions.

*b.* Enable lighting of the signal lamp 417.

C. The depression of the Customer's Button 418 sets the Main Relay to make possible the following further operations:

*a.* Supply current to the pump motor at the proper time.
*b.* Supply current for energizing the valve solenoid at the proper time.
*c.* Supply of current for the printing operation.
*d.* Supply of current for the magnetic clutch of the "Prepay" counter so that the counter can be pre-set during the coin counting and counter pre-setting operations.
*e.* Operation of the coin counting and selecting mechanism.
*f.* Makes possible the shift of the coin chute gate into the position of Figure 31 so that the coins can be fed to the coin selecting mechanism.

I. The movement of the coin chute gate to the position shown in Figure 31 requires that

*a.* The "Prepay" counter must be set at zero to close its contacts 535—534 together.
*b.* The contacts 561—562 of the nozzle hook must be engaged which means that said hook must be down.
*c.* The contacts 556—557 of the relay 525 must be engaged which means that said relay has not yet been set and that the Customer's Button 418 has not yet been effectively depressed.

*Note.*—The "Amount of Sale" counter is also at zero if the attendant has used his special key to unlock the unit 288 and use his crank 300 to re-set both of the counters to zero. The lighting of the signal lamp 417 can occur only when both counters are at zero, so the customer will not get his signal to proceed until both counters have been zeroized (by the attendant's key operation above referred to).

II. The movement of the coin chute gate to its normal position under the urging of the spring 569 for return of coins introduced after the Customer's Button 418 has been depressed occurs when

*a.* The relay 525 has been set by depression of the Customer's Button 418 to separate the contacts 556—557 and open the circuit of the solenoid 570.

III. The institution and carrying forward of the coin counting and pre-setting operations of the "Prepay" counter can only be started and carried out when

*a.* The relay 525 has been set by the depression of the Customer's Button 418 to electrify the positive and negative buses 490 and 491 by engagements of the pairs of contacts 553—554 and 556—555, respectively and

*Note.*—The depression of the Customer's Button 418 also energized the setting solenoid 579 of the Main Relay 578 by the following circuit: From the positive line 531, over the leads 545—584, solenoid 579, leads 585—550, Customer's Button 418, leads 551—552 to the negative line 530. Thus the Main Relay is set in time for further operations requiring current delivered to the lead 583 and the left-hand contact 582 of the Main Relay.

IV. The coin counting and pre-setting operations move the "Prepay" counter away from zero. This

*a.* Closes contacts 539—538 of the "Prepay" counter to energize the valve solenoid 73 and open the valve so that liquid can be delivered later.
*b.* Closes contacts 533—532 of the "Prepay" counter to set the pump motor relay (provided the "Amount of Sale" counter is still at zero with its contacts 541—540 engaged), when the hook rises (by lifting of the nozzle) to allow the hook contacts 566—565 to engage. This starts the pump motor when the hose is taken by the customer.
*c.* Separates the contacts 536—537 to open the circuit of the setting solenoid 526 of the relay 525. This prevents improper functioning of said relay 525 by improper depression of the Customer's Button after the operations have progressed to a point when such depression of the Customer's Button should not be made.
*d.* Separates the contacts 534—535 to open the circuit for the coin reject gate control solenoid 570, ensuring that said gate shall remain in coin reject position.

V. The completion of counting all coins and pre-setting the "Prepay" counter

*a.* Sets the relay 586 to close the contacts 589—590 to energize the latch solenoid 560, releasing the latch 72, and allow the nozzle hook to rise when the nozzle is taken from the hook.
*b.* Releases the relay 525 to disconnect the buses 490 and 491 (after a short delay) and thus kill the counting and pre-setting elements, removing danger of improper operations until a new cycle of operations is instituted.
*c.* Lights the signal lamp 420.

VI. The raising of the hook when unlatched and when the nozzle is taken by the customer

*a.* Engages the contacts 566—565 to energize the setting solenoid of the relay 597 for starting the pump motor by supplying the same with current (the "Prepay" counter being pre-set, and the "Amount of Sale" counter being still at zero).

VII. The delivery of liquid causes the "Amount of Sale" counter to move away from zero and

*a.* Separates the contacts 543—544 thus opening the circuit for the setting solenoid 526 of the relay 525 at a second location (the contacts 536—537 of the "Prepay" counter having previously been opened as shown at IV–c).
*b.* Closes contacts 534—542 thus energizing the releasing solenoid 588 of the relay 586 to release said relay and allow its contacts 589—590 to separate. This de-energizes the latch solenoid 560, allowing the latch to move out into position to latch the hook down when said hook is next depressed.
*c.* Energizes the solenoid 619 of the simple relay 618 so that current will be supplied to the setting solenoid 614 by the printer relay 613, thus connecting the contacts 616—617 to energize the printer solenoid 354 for the printing operation when the hook is lowered, and for various other printer operations.

VIII. The return of the "Prepay" counter to its zero position at completion of delivery of a full complement of liquid for which pre-payment was made

*a.* Closes contacts 535—534 of the "Prepay" counter (the contacts 543—542 of the "Amount of Sale"

counter being engaged since that counter had moved away from zero) thus energizing the releasing solenoid of the pump motor relay and cutting off pump motor current when the "Prepay" counter gets back to its zero reading position. (Also, as a separate operation the said releasing solenoid will be energized to cut off pump motor current when the nozzle hook is lowered. See No. IX–b.)

b. Separates contacts 538—539 thus cutting off current from the valve solenoid and allowing the valve to close.

IX. The depression of the nozzle hook a. Allows contacts 563—564 to close. This energizes the setting solenoid 614 of the printer relay 613, closing contacts 617—616 and energizing the printer solenoid for printing (the simple relay 618 having been closed by the engagement of the contacts 543—542 of the "Amount of Sale" counter when that counter went from its zero reading position due to the delivery of some liquid).

b. Closes the contacts 561—562 thus energizing the releasing solenoid 599 of the pump motor relay 597 to allow the contacts 600—601 to separate and cut off pump motor current.

*Note.*—This operation is supplemental to VII–a. It ensures that the pump motor will be stopped when the hook is lowered even though the full complement of liquid for which pre-payment was made, and for which the "Prepay" counter was pre-set, has not been delivered.

c. The closing of the contacts 563—564 also delivers current to the releasing solenoid 580 of the Main Relay 578 to allow the negative contacts 582—581 of that relay to separate (after a short delay) thus killing all circuits which depend for return of current over the lead 583. This brings the operations to a terminus.

SUMMARY OF CONDITIONS PRECEDENT TO OPERATIVE CONDITIONING OF VARIOUS UNITS

I. The signal lamp 417 will be lighted when a. The key-operated switch 83 (416) has been turned on by the attendant. At this stage; 1. The nozzle hook is locked down so that the Main Relay cannot be effectively set by depression of the Customer's Button, 418, and thus no current can be supplied to the pump motor; 2. The "Prepay" counter is at zero so the valve solenoid cannot be supplied with current to open the valve; 3. Depression of the Customer's printing Button 421, will not cause any printing operation since the Main Relay has not been set to electrify the negative lead to the left of the contact, 582, of the Main Relay; 4. The coin chute gate has been set into the position of Figure 31 so that any coins introduced through the slot 248 will pass down along the coin chute 249 to the coin selecting mechanism and will not be rejected through the slot 419.

b. Both counters have been zeroized by the attendant.

II. Any coins inserted through the slot 248 will move at once along the chute 249 to the coin selecting mechanism. The coins will collect in the several sub-chutes 259, 260, and 261, and will be retained therein ready for selective counting.

*Note.*—At this stage all of the conditions mentioned in I–a–1, I–a–2, I–a–3, and I–a–4 still obtain.

III. The coin counting and pre-setting will commence when the Customer's Button, 418, is depressed. This will a. Set the Main Relay to engage the contacts 582—583, thus connecting the lead 583 to the negative line 530.

b. Set the relay 525 thus connecting the bus-bars 490 and 491 to the positive and negative supply lines so that the coin counting and pre-setting units can function.

These units include the coin counting elements, the selector, the selector clutch, the setting motor, and the "Prepay" counter disk drive clutch, and various switches, connections, etc.

c. Opens the circuit of the solenoid 570 for the coin chute gate control so that any coins introduced through the slot 248 after the relay 525 has been set will be immediately rejected and returned through the slot 419.

IV. The pre-setting of the "Prepay" counter will move that counter away from its zero position so that a. The contacts 539—538 come together to energize the valve solenoid 73 and thus open the valve.

b. Separate the contacts 537—536 to that improper depression of the Customer's Button, 418, will not set the relay 525 again, nor change its contacts.

c. Separate the contacts 535—534 so that the coin chute gate solenoid 570 cannot be improperly energized, thus ensuring that said gate will be and remain in the coin reject position.

d. The contacts 533—532 engage so that when the nozzle hook is later allowed to rise the circuit for the setting of the pump motor relay can be used to start and operate the pump motor.

V. The coin counting and pre-setting operations will cease when the last coin has been accounted for. This will a. Energize the setting solenoid 587 of the relay 586 to close contacts 589—590 and supply current to the latch releasing solenoid of the nozzle hook, allowing said hook to rise when the nozzle is removed.

b. Light the signal lamp 420 to indicate that the coin counting and pre-setting operations have been completed.

c. Energize the releasing solenoid 527 of the relay 525 to allow the relay to change its contact engagements (after a short delay).

VI. The releasing of the relay 525 by the operation V–c, will restore connection between the contacts 556—557 of the relay 525. If the nozzle hook is still down so as to retain its contacts 561—562 engaged the circuit for the solenoid 570 of the coin chute gate will be restored, energizing said solenoid, and again moving the gate to the position of Figure 31. Thus conditioned, further coins may be inserted through the slot 248 and they will move down through the chute 249 into the selecting mechanism. Then, by another depression of the Customer's Button, 418, the operations of III and V will be repeated, causing the "Prepay" counter to be still further pre-set by the amount and value of such second group of inserted coins. At the conclusion of such second pre-setting operation the "Prepay" counter will read a pre-set amount equal to the sum of both groups of coins so inserted. After conclusion of the pre-setting for the second group of coins a third and other groups can be inserted, and the Customer's Button be depressed after insertion of each group to cause the coins of such group to be counted and the "Prepay" counter to be pre-set, so that the reading of such counter will finally equal the sum total of all groups of coins so inserted. The operations for each group will be as set forth under III, IV, and V, above.

VII. At completion of counting and pre-setting for any group of coins for which the operations of III and IV have been concluded so that V has become effective, the nozzle may be removed from the hook allowing the hook to rise by taking the hose. This will a. Separate the contacts 561—562 so that the circuit for the coin chute gate solenoid, 570, will be opened and any coins then inserted through the slot 248 will be immediately rejected through the slot 419.

b. Engage the contacts 566—565 so as to energize the setting solenoid of the pump motor relay 597 and supply current to the pump motor to place liquid under pressure. Also the relay 597 will be set for continued pump motor operation.

VIII. The printer solenoid can be manually energized by use of the Customer's Button 421 to cause printing at any time after the Main Relay has been set and prior to release of that relay, by the lowering of the nozzle hook (See XII-*a* and XII-*b*). Therefore the full amount of the pre-payment may be printed and delivered to the customer before any liquid is taken through the nozzle. Also, other printings and deliveries of slips may be effected by depressions of the Customer's Button 421, showing credits due at the times of such button depressions.

IX. Having allowed the nozzle hook to rise as explained under VII the liquid may be delivered. This will

*a.* Cause the "Amount of Sale" counter to move away from its zero position and to progressively higher readings. Its movement from the zero position will; 1. Cause the contacts 543—542 to engage thereby energizing the simple relay 618 to connect the contacts 621—622. This will connect the contact 620 to the negative lead 583; 2. The engagement of the contacts 543—542 will also energize the releasing solenoid 588 of the relay 586, thus allowing the contacts 589—590 to separate and de-energizing the latch solenoid 560 so that at a later time when the hook is lowered it will be latched in such lowered position; 3. Separate the contacts 544—543, thus protecting the relay 525 from the effects of improper depressions of the Customer's Button, 418; 4. Separate the contacts 541—540 thus de-energizing the setting solenoid of the pump motor relay 525, said relay having previously been set and remaining in such set condition.

*b.* Cause the "Prepay" counter to move to lower readings.

X. With the simple relay, 618, raised as in IX-*a*-1,

*a.* The printer will be automatically actuated to print when the nozzle hook is lowered to engage the contacts 563—564.

*b.* The releasing solenoid 580 of the Main Relay will be energized to release said relay and allow its contacts 582—581 to separate and kill the negative lead 583, when the nozzle hook is lowered, such energization of the releasing solenoid occuring when the nozzle hook is lowered to engage the contacts 563—564, as above.

XI. As liquid is delivered the "Prepay" counter will move to lower reading positions until it has been zeroized. When it is zeroized

*a.* The contacts 538—539 will separate thus de-energizing the valve solenoid 73, allowing the valve to close.

*b.* Contacts 536—537 will engage to complete a portion of the circuit by which the relay 525 will be set when the Customer's Button, 418, is again depressed; but that circuit is now open at the contacts 543—542 of the "Amount of Sale" counter which has moved away from its zero position (See IX-*a*-1).

*c.* Contacts 534—535 will engage, contacts 543—542 of the "Amount of Sale" counter being already engaged (See IX-*a*-2), thus; 1. Energizing the releasing solenoid 599 of the pump motor relay and stopping supply of current to the pump motor.

*Note.*—Alternatively, the lowering of the nozzle hook will energize the releasing solenoid 599 of the pump motor relay, thus cutting off current from the pump motor when the hook is lowered, even if the "Prepay" counter has not been zeroized.

*d.* Contacts 533—532 will separate so that the setting solenoid 598 of the pump motor relay 597 cannot be energized to set said relay and supply current to the motor in case of an improper raising of the nozzle hook to engage the contacts 565—566.

XII. Lowering of the hook may be done either

*a.* When the "Prepay" counter has been returned to zero after a full complement of liquid for which pre-payment was made has been delivered. This will; 1. Engage the contacts 561—562 to energize the releasing solenoid 599 of the pump motor relay, thus cutting off current to the motor; 2. Energize the chute gate solenoid to move said gate to the position of Figure 31; 3. Raise the simple relay, 618, so that the printer operation may be performed by the engagement of the contacts 563—564 to energize the setting solenoid 614 of the printer relay, 613. This will engage the contacts 616—617 to energize the printer solenoid 354 and cause printing to occur. At completion of the printing stroke the contacts 389—390 will engage to energize the releasing solenoid 615 of the relay 613.

*Note.*—The engagement of the hook contacts 563—564 also engerizes the releasing solenoid 580 of the Main Relay, thus killing the negative lead 583 to the left-hand of the contact 582 of that relay; but this occurs after a short delay. This delay ensures completion of the printing operation before the Main Relay separates its contacts (See XIII.)

*b.* Before the "Prepay" counter has returned to zero, being the condition which exists when the customer has not taken delivery of the full complement of liquid for which he made prepayment. In such a case (1) the contacts 538—539 remain engaged so that the valve solenoid 73 is still energized, leaving the valve open; but: lowering of the nozzle hook engages the contacts 563—564 thus connecting the leads 625 and 633 to the negative lead 583 and enabling the automatic printing operation to be performed, followed directly thereafter by the releasing of the Main Relay with consequent killing of the negative lead 583 to the left-hand of the contact 582.

XIII. The stand is low left in such condition that no further operation can be performed until the attendant has again used his special key to operate the lock 81 and has also pre-set both counters to zero by use of the crank 300.

SUMMARY OF FUNCTIONAL SEQUENCES OF PRINCIPAL OPERATIONS

1. Coins will be rejected when

*a.* The Customer's Button has been effectively depressed, or

*b.* When the "Prepay" counter is not at zero, or,

*c.* When the hook is not down, or

*d.* When the attendant has not closed the key-operated switch 83 (416)

2. The signal light 417 will be lighted when

*a.* The attendant has closed the key-operated switch 83 (416), and

*b.* When the "Prepay" counter and the "Amount of Sale" counter are re-set to zero.

3. The Main Relay will be set to close its contacts when

*a.* The Customer's Button is effectively depressed.

4. To insert coins and have them move to the coin selecting mechanism

*a.* The Customer's Button 418 must not yet have been set by an effective depressing operation, and

*b.* Both counters must be pre-set to zero, and

*c.* The nozzle hook must be down.

5. Coins introduced through the slot 248 will pass to the coin selecting mechanism only when

*a.* The Customer's Button has not yet been effectively depressed, and

81 b. The "Prepay" counter has been set to zero, and
c. The hook is down (the nozzle being thereon).

6. The functioning of the coin counting and pre-setting of the "Prepay" counter require that a. The Customer's Button must have been effectively depressed.

7. To effectively depress the Customer's Button a. The "Prepay" counter and the "Amount of Sale" counter must both be at zero.

8. Depression of the Customer's Button and setting of the relay 525 makes ineffective the condition of 5–a so that a. Additional coins introduced through the slot 248 will be immediately rejected through the reject slot 419.

9. The coin counting and pre-setting operations require that a. The relay 525 shall remain set until the conclusion of the coin counting and pre-setting operations.

10. At conclusion of the coin counting and pre-setting operations a. Relay 586 is set to cause contacts 589–590 to engage and energize the latch solenoid 560 so that the nozzle hook is released.
b. The signal light 420 is illuminated to show the conclusion of the coin counting and pre-setting of the "Prepay" counter.
c. The relay 525 is released (with a slight delay), to kill supply of current to the coin counting and pre-setting equipment.

11. The pre-setting of the "Prepay" counter causes a. The valve solenoid to be energized to open the valve.
b. Conditioning of the contacts so that when the hook is allowed to rise the pump motor will be supplied with current.
c. Prevents faulty operations from flowing from improper depression of the Customer's Button after the original effective depression of said button.
d. Throws the coin reject gate into position for coin rejection through the reject slot 419.

12. When the customer takes the hose, removing the nozzle from the hook and allowing the hook to rise a. The pump motor is supplied with current.

13. The delivery of liquid causes the "Amount of Sale" counter to move from its zero position. This a. Gives a second protection against any ill results from improper repeated depressions of the Customer's Button.
b. Releases the hook latch allowing the same to assume position to lock the hook down when it is next depressed.
c. Conditions the simple relay 618 so that the printing functions can be performed when called for.

14. The return of the "Prepay" counter to zero (after delivery of a full complement of liquid for which prepayment was made)

a. Releases the pump motor relay to allow contacts 600—601 to separate and discontinue supply of current to the pump motor. (See 15–b hereinafter).
b. Allows the valve to close.

15. The depression of the nozzle hook a. Causes printing to occur.
b. Releases the pump motor relay to allow the contacts 600—601 to separate and discontinue current supply to the pump motor (see 14–a above). However, this operation is not contingent on the return of the "Prepay" counter to zero. Therefore the lowering of the nozzle hook will cut off current supply to the motor even when the "Prepay" counter has not returned to

82 zero, as when the full complement of liquid for which prepay was made has not been taken by the customer.
c. Releases the Main Relay (after a short delay) to kill the negative bus bar to the lefthand of the relay contact 582.

I claim:

1. In a self-service prepay liquid fuel stand, the combination of a motor driven pump, a liquid meter having a rotatable element rotatable in proportion to volume of liquid metered, a valved nozzle, a liquid connection from the pump to the meter, a liquid connection from the meter to the nozzle, a movable support for the nozzle having a released position and a nozzle supporting position, pump motor switch means in connection with said movable support and including a circuit closed position corresponding to nozzle unsupported position of said movable support, a "prepay" amount counter including a plurality of numerical orders disks and means to carry tens from order to order for either increasing or decreasing readings of said counter, operative connections from the rotatable element of the meter to the units order disk of the "prepay" amount counter including means to cause the "prepay" counter to count to lower numbers as the rotatable element of the meter rotates, said operative connections including yieldable means permitting movement of the units order disk independently of movement of the rotatable element of the meter, a "zeroizing" device in connection with the "prepay" counter and including an element movable to a zero responsive position when all of the orders disks of said counter stand at zero position and movable to a count responsive position when any of said orders disks stand at any position other than zero, a "prepay" counter setting motor, a motor driven element adjacent to the units order disk of the "prepay" counter, driving connections from the motor to said motor driven element, a counter drive electromagnetic clutch between said motor driven element and the said units order disk, the motor rotating the units order disk to higher reading positions when the clutch is drivingly engaged, a mixed coin receptacle for coins of a plurality of denominations, means in connection with said receptacle to release the coins one at a time, means to energize the clutch as each coin is released to effect motor drive to the units order disk for units order disk rotation in the increasing count direction, means to discontinue clutch energization at completion of an amount of such drive proportional to the denomination of each coin so released, switch means in connection with said "prepay" counter zeroizing device and movable to a pump motor current discontinue position when said device is in position corresponding to zero reading of all the orders disks of said counter and to a pump motor current supply position when any orders disk of said counter is not at zero position, and circuits for supply of current to the pump motor including said "prepay" zeroizing switch means and said valve nozzle movable support switch means in series with each other.

2. Means as specified in claim 1, together with means to lock the movable support for the nozzle in nozzle supporting position, means to make ineffective said locking means, and means to actuate said means to make ineffective said locking means at discontinuance of the clutch energization corresponding to the last released coin of all denominations.

3. Means as specified in claim 1, together with an "amount of sale" counter including a plurality of numerical orders disks and means to carry tens from order to order, operative connections from the rotatable element of the meter to the units order disk of said "amount of sale" counter, a "zeroizing" device in connection with the "amount of sale" counter switch means in connection with said zeroizing device and movable to a pump motor current start position when said device is in position corresponding to zero reading of all the orders disks of said counter, said pump motor current supply circuits including motor current supply contacts normally separated from each other, means to move said contacts to circuit closed position when the "prepay" zeroizing switch means is in current supply position and said "amount of sale" zeroizing switch means is in current start position, and said nozzle movable support switch means is in circuit closed position, means to retain said normally separated contacts in such circuit closed position, and means to make said retaining means ineffective when the "prepay" counter zeroizing device is in its counter zero position and when the "amount of sale" counter zeroizing device is not in its counter zero position.

4. Means as specified in claim 1, together with means to retain the coins in said receptacle, customer controlled means movable to position to make ineffective said coin retaining means, means to retain the said customer controlled means in said position, and means to make inoperative said retaining means concurrently with release of the last coin of all denominations.

5. Means as specified in claim 1 wherein the switch means which is in connection with the "prepay" counter zeroizing device includes a switch element for the customer controlled means, a current supply connection from said switch element to the customer controlled means, and means to supply current to said switch element only when the "prepay" counter zeroizing device is in its position corresponding to zero reading of all the orders of said counter.

6. Means as specified in claim 5, together with an "amount of sale" counter including a plurality of numerical orders disks and means to carry tens from order to order, connections from the rotatable element of the meter to the units order disk of said "amount of sale" counter, a "zeroizing" device in connection with the "amount of sale" counter and including an element movable to a zero responsive position when all of the orders disks of said counter stand at zero position, and movable to a count responsive position when any of said orders disks stand at any position other than zero, switch means in connection with "amount of sale" counter zeroizing device, connections for supply of current to said switch means, and said switch means including a current delivery element, said current delivery element comprising the current supply connection to the "prepay" counter zeroizing device switch element, said "amount of sale" zeroizing device switch means being effective to deliver current to the "prepay" counter zeroizing device switch means only when the "amount of sale" counter zeroizing device is in its position corresponding to zero reading of all the orders of said counter.

7. Means as specified in claim 1, together with signal means, and means to actuate said signal means concurrently with release of the last coin of all denominations.

8. Means as specified in claim 4, together with signal means, and means to actuate said signal means concurrently with release of the last coin of all denominations.

9. Means as specified in claim 4, together with a conduit for delivery of coins to the mixed coin receptacle, a coin reject passage in connection with said conduit, a control gate at the location of said connection and serving when in a first position to receive coins supplied through the conduit and divert them to the reject passage, and when in a second position to deliver such received coins to the mixed coin receptacle, means to normally retain the control gate in said first position, means to move the gate to the second position when the zeroizing device of the "prepay" counter is in position corresponding to zero reading of all the orders disks of said counter and the customer controlled means is in its nonoperated position, and means to make inoperative said gate moving means last recited when the zeroizing device of the "prepay" counter is in the position it occupies when any orders disk of said counter is not in its zero position, or to make inoperative said gate moving means when the customer controlled means is in its operated position.

10. Means as specified in claim 1, together with printing type numerical digit elements on the orders disks of the "prepay" counter, paper strip supporting means to support a paper strip adjacent to the "prepay" counter orders disks at a printing position, said printing type elements being carried by the said orders disks at positions on said disks to present said type elements at all times at the printing position for printing correctly the digital amounts corresponding to the reading of the counter at the time of printing, means to impress the paper strip against the type elements of the orders for printing on the strip the amount of the reading of said counter at the time of such impression, and means to effect printing impression as aforesaid when the nozzle movable support is moved to the nozzle supporting position.

11. Means as specified in claim 10 wherein the means to impress the paper strip against the type elements is electrical, together with switch means in connection with said nozzle movable support, and circuits including said electrical impressing means and said switch means effective to actuate the impressing means when the nozzle movable support is moved to the nozzle supporting position.

12. Means as specified in claim 11, together with an "amount of sale" counter including a plurality of numerical orders disks and means to carry tens from order to order, connections from the driven element of the change gear unit to the units order disk of said "amount of sale" counter, a "zeroizing" device in connection with the "amount of sale" counter and including an element movable to a zero responsive position when all of the orders disks of said counter stand at zero position, and movable to a count responsive position when any of said orders disks stand at any position other than zero, switch means in connection with said "amount of sale" counter zeroizing device and movable to a printer impression operating position when said zeroizing device is in its count responsive position, said circuits including said "amount of sale" counter switch means.

13. Means as specified in claim 11, together with manual means to effect operation of the electrical means to impress the paper strip against the type elements irrespective of the position of the nozzle movable nozzle support.

14. Means as specified in claim 12, together with manual means to effect operation of the electrical means to impress the paper strip against the type elements irrespective of the position of the nozzle movable nozzle support or the position of the zeroizing device of the "amount of sale" counter.

15. In a self-service prepay liquid fuel stand, the combination of a motor driven pump, a liquid meter having a rotatable element rotatable in proportion to volume of liquid metered, a valved nozzle, a liquid connection from the pump to the meter, a liquid connection from the meter to the nozzle, a movable support for the nozzle having a released position and a nozzle supporting position, a "prepay" amount counter having a first driven part, a variable ratio change gear unit having a driving element and a driven element, an operative connection from the rotatable element of the meter to the driving element of the change gear unit, a "prepay" counter driving element, a yieldable connection from said last named driving element to the first driven part of the "prepay" counter, operative connections from the driven element of the change gear unit to the "prepay" counter driving element, said connections including means to cause the "prepay" counter to count to lower numbers as the driven element of the change gear unit rotates during rotation of the liquid meter, a movable "zeroizing" device in connection with the "prepay" counter and movable to a zero responsive position when the "prepay" counter is at zero position and movable to a count responsive position when the "prepay" counter is not at zero position, a "prepay" counter setting motor, a motor driven element adjacent to the first driven element of the "prepay" counter, a counter drive clutch between said motor driven element and said first driven part of the "prepay" counter, said setting motor rotating the first driven part of the counter in direction for increase of counter reading when said clutch is engaged, an element to receive prepay coins of various denominations, means to release the coins one at a time, means to cause the clutch to engage harmoniously with release of each coin, means to cause disengagement of the clutch after an amount of movement of the "prepay" counter first driven element proportional to the denomination of such released coin, customer operated means to institute operation of the coin releasing means, means to retain such customer operated means in its customer operated position, means to make inoperative said retaining means harmoniously with disengagement of the clutch for the last coin released, switch means in connection with said "prepay" counter zeroizing device and movable to a pump motor current discontinue position when said device is in its zero responsive position and to a pump motor current supply position when said device is in its count responsive position, and circuits for supply of current to the pump motor including said "prepay" zeroizing switch means.

16. Means as specified in claim 15, together with pump motor switch means in connection with said nozzle movable nozzle support and including a circuit closed position corresponding to nozzle unsupported position of said movable support, said motor current supply circuits including said pump motor switch means.

17. Means as specified in claim 16, together with means to lock the movable support for the nozzle in nozzle supporting position, means to make ineffective said locking means, and means to actuate said means to make ineffective said locking means harmoniously with disengagement of the "prepay" counter drive clutch.

18. Means as specified in claim 15, together with an "amount of sale" counter having a first driven part, connections from the driven element of the change gear unit to the first driven part of the "amount of sale" counter, a movable "zeroizing" device in connection with the "amount of sale" counter and movable to a zero responsive position when the "amount of sale" counter is at zero position and movable to a count responsive position when the "amount of sale" counter is not at zero position, switch means in connection with said "amount of sale" counter zeroizing device and movable to a pump motor current start position when said device is in its zero responsive position, said pump motor current supply circuits including motor current supply contacts normally separated from each other, means to move said contacts to circuit closed position when the "prepay" counter zeroizing switch means is in current supply position and said "amount of sale" counter zeroizing switch means is in current start position, and said nozzle movable support switch means is in circuit closed position, means to retain said normally separated contacts in such circuit closed position, and means to make said retaining means ineffective when the "prepay" counter zeroizing device is in its counter zero position and when the "amount of sale" counter zeroizing device is not in its counter zero position.

19. Means as specified in claim 15 wherein the switch means of the "prepay" counter zeroizing device includes switch element for the customer controlled means, a current supply connection from said switch element to the customer controlled means, and means to supply current to said switch element only when the "prepay" counter zeroizing device is in its zero responsive position.

20. In a self-service prepay liquid fuel stand, the combination of a motor driven pump, a liquid meter having a rotatable element rotatable in proportion to volume of liquid metered, a valved nozzle, a liquid connection from the pump to the meter, a liquid connection from the meter to the nozzle, a "prepay" amount counter having a first driven part, a "prepay" counter driving element, a yieldable connection from said last named driving element to the first driven part of the "prepay" counter, an operative connection from the rotatable element of the meter to the "prepay" counter driving element, said connection including means to cause the "prepay" counter to count to lower numbers as the rotatable element of the meter rotates, a movable "zeroizing" device in connection with the "prepay" counter and movable to a zero responsive position when the "prepay" counter is at zero position and movable to a count responsive position when the "prepay" counter is not at zero position, "prepay" counter setting means, a counter drive clutch between said setting means and the first driven part of the "prepay" counter, said setting means rotating the first driven part of the counter in direction for increase of counter reading when said clutch is engaged and said setting means is operative, an element to receive coins, means to release said coins one at a time, means to cause the clutch to engage harmoniously with release of each coin, means to cause disengagement of the clutch after an amount of movement of the "prepay" counter first driven element proportional to the denomination of such released coin, customer operated means to institute operation of the coin releasing means, means to institute operation of said "prepay" counter setting means harmoniously with institution of the operation of the coin releasing means and under control of said customer operated means, means to retain such customer operated means in its customer operated position, means to make inoperative said retaining means harmoniously with disengagement of the clutch for the last coin released, switch means in connection with said "prepay" counter zeroizing device and movable to a pump motor current discontinue position when said device is in its zero responsive position and to a pump motor current supply position when said device is in its count responsive position, and circuits for supply of current to the pump motor including said "prepay" zeroizing switch means.

21. Means as specified in claim 20, together with a movable support for the nozzle, movable between a nozzle supported position and a nozzle unsupported position, switch means in connection with said support, said switch means including pump motor current supply control contacts, said contacts being in non-current supply position when the support is in nozzle supported position and being in current supply position when the support is in nozzle unsupported position, and said pump motor supply circuits including means to supply current to the pump motor when said "prepay" counter zeroizing device switch means is in pump motor current supply position while the nozzle movable support is in nozzle unsupported position together with means to lock the nozzle support in nozzle supporting position, means to make ineffective said locking means, and means to actuate said ineffective making means harmoniously with disengagement of the clutch for the last coin released.

22. Means as specified in claim 20 wherein the customer operated means to institute operation of the coin releasing means is electrical, and wherein the switch means of the "prepay" counter zeroizing device includes switch element for the customer controlled means, a current supply connection from said switch element to the customer controlled means, and means to supply current to said switch element only when the "prepay" counter zeroizing device is in its zero responsive position.

23. Means as specified in claim 21, together with signal means, and means to make said signal means operative to give its signal concurrently with the making inoperative said retaining means of the customer operated means.

24. In a self-service liquid stand, a motor driven pump, a valved nozzle, a liquid metering device having a movable part movable in amount proportional to the amount of liquid metered by said metering device, a "preset" counter, an "amount of delivery" counter, liquid supply connections from the pump to the nozzle and including the metering device, driving connections from the metering device to the "amount of delivery" counter and constituted to move said counter to higher amount readings with metering movement of the metering device, driving connections from the metering device to the "preset" counter and constituted to move said counter to lower amount readings with metering movement of the metering device, means to reset the "preset" counter to zero position, means to reset the "amount of delivery" counter to zero position, means to give a signal when the "preset" counter and the "amount of delivery" counter are both at their zero positions, means to preset the "preset" counter to a selected non-zero position, means to supply current to the pump motor, a support for the nozzle, motor operation control means in connection with said support comprising a portion of the motor current supply means and having a nozzle supported position and a nozzle non-supported position, a "zeroizing" device in connection with the "preset" counter and including a counter zero position and a counter non-zero position, a "zeroizing" device in connection with the "amount of delivery" counter and including a counter zero position and a counter non-zero position, and means to start current supply to the motor when the "preset" counter zeroizing device is at non-zero count position and the "amount of delivery" counter zeroizing device is at zero position and the motor operation control means of the nozzle support is in the position corresponding to nozzle non-supported position of the nozzle support.

25. Means as specified in claim 24, together with means to discontinue supply of current to the pump motor when the motor operation control means of the nozzle support is moved to position corresponding to nozzle supported position of the nozzle support.

26. Means as specified in claim 24, together with means to discontinue supply of current to the pump motor when the "preset" counter zeroizing device is at zero count position and the "amount of delivery" counter zeroizing device is at non-zero position.

27. Means as specified in claim 24, together with means to discontinue supply of current to the pump motor when the motor operation control means of the nozzle support is moved to position corresponding to nozzle supported position of the nozzle support, or when the "preset" counter zeroizing device is at zero count position and the "amount of delivery" counter zeroizing device is at non-zero position.

28. In a self-service liquid stand, a motor driven pump, a valved nozzle, a liquid metering device having a movable part movable in amount proportional to the amount of liquid metered by said metering device, a "preset" counter, an "amount of delivery" counter, liquid supply connections from the pump to the nozzle and including the metering device, driving connections from the metering device to the "amount of delivery" counter and constituted to move said counter to higher amount readings with metering movement of the metering device, driving connections from the metering device to the "preset" counter and constituted to move said counter to lower amount readings with metering movement of the metering device, means to reset the "preset" counter to zero position, means to reset the "amount of delivery" counter to zero position, means to preset the "preset" counter to a non-zero position, means to give a signal when the "amount of delivery" counter is at its zero position and the "preset" counter is at preset position, means to supply current to the pump motor, a support for the nozzle, motor operation control means in connection with said support comprising a portion of the motor current supply means and having a nozzle supported position and a nozzle non-supported position, a "zeroizing" device in connection with the "preset" counter and including a counter zero position and a counter non-zero position, a "zeroizing" device in connection with the "amount of delivery" counter and including a counter zero position and a counter non-zero position, and means to start current supply to the motor when the "preset" counter zeroizing device is at non-zero count position and the "amount of delivery" counter zeroizing device is at zero position and the motor operation means of the nozzle support is in the position corresponding to nozzle non-supported position of the nozzle support.

29. Means as specified in claim 28 in which the "preset" counter is a "prepay" counter and in which the means to preset the "prepay" counter to a non-zero position comprises a coin controlled device, together with means to effect an amount of presetting proportional to the denomination of a coin controlling said device.

30. Means as specified in claim 29 in which the coin controlled device includes means to receive and retain a plurality of coins, means to release said coins sequentially, and means to cause presetting movement of the "prepay" counter to higher reading positions harmoniously with release of each coin so released and by an amount of presetting movement proportional to the denomination of the coin so released, all such coin release controlled presetting movements of the "prepay" counter being cumulative.

31. Means as specified in claim 28 in which the means to reset the "preset" counter includes manually operated means, and in which the means to preset the "preset" counter includes manually operated means, together with a common manually operated element for both of said resetting means and said presetting means of the "preset" counter, means to support said common manually operated element for movement from a neutral position in either a first engaging direction or a second engaging direction, means to engage said manually operated element with the manually operated means of the resetting means when the manually operated element is moved in said first engaging direction from said neutral position, and means to engage said manually operated element with the manually operated means of the presetting means when the manually operated element is moved in said second engaging direction from said neutral position.

32. Means as specified in claim 31 in which the means to give a signal when the "amount of delivery" counter is at its zero position and the "preset" counter is at its preset position comprises means in connection with said common manually operated element.

33. A self-service pre-pay liquid delivery unit including in combination an electric motor driven liquid delivery pump, a switch to control delivery of current to the motor of said pump, means to move said motor current switch to closed circuit position, means to release said motor current switch to open circuit position, a liquid delivery nozzle, a liquid conduit extending from the pump to the nozzle, a movable support for the liquid delivery nozzle, said support having a normal nozzle non-supported position and a nozzle supported position, means to latch and retain said support in the nozzle supported position when said support is moved to said position, electrical means to release said latch means, nozzle support actuated switch means having a nozzle non-supported first position and a nozzle supported second position, a first liquid delivery control valve in said conduit between the pump and the nozzle, a second liquid delivery shut-off valve in said conduit between the pump and the nozzle, said second liquid delivery shut-off valve being normally closed, electrical means to open said valve, said means being constituted to retain the valve in open position while said electrical means is energized, a liquid volume measuring meter in said conduit between the pump and the nozzle and including an element movable in amount proportional to the volume of liquid measured by said meter, a pre-pay counter including digital indicating elements to indicate the pre-paid value of non-delivered liquid, pre-pay counter switch means, said switch means having a first position when the pre-pay counter digital indicating elements indicate zero and having a second position when said pre-pay counter digital elements indicate a value other than zero, means to pre-set the pre-pay counter to zero indicating position, an amount of purchase counter including digital elements to indicate the value of delivered liquid, amount of purchase counter switch means, said switch means having a first position when the amount of purchase counter digital elements indicate zero and having a second position when said amount of purchase counter digital elements indicate a value other than zero, means to pre-set the amount of purchase counter to zero indicating position, zero setting indicating means for both counters, driving connections from the movable element of the meter to the pre-pay counter and to the amount of purchase counter to move the digital elements of said counters by digital amounts proportional to the values of the volumes of liquid measured by the meter, said driving connections to the amount of purchase counter being constituted to move the digital indicating elements of said counter to higher readings for successive volumes of liquid metered, said driving connections to the prepay counter being constituted to move the digital indicating elements of said counter to lower readings for successive volumes of liquid metered, a coin receiving chute, a coin receptacle in connection with said chute, a coin return passage in connection with the chute at a location in advance of the coin receptacle, a coin gate in the chute at the location of the connection of the coin return passage with the chute and movable between a coin return position and a position for coin delivery to the receptacle, said coin gate being constituted to normally occupy the coin return position, electrical means to move and hold the gate in the position for coin delivery to the receptacle during energization of said electrical means, means to retain the coins in the receptacle, means to release the coins selectively one at a time from the receptacle, means to preset the pre-pay counter to successively higher digital reading values corresponding to the denominations of the selectively released coins, operator-setter starting button switch means, operator controlled means to move said starting switch means to closed circuit condition, means to release said starting switch means to open circuit condition, signal means for indicating completion of the release of the last coin from the receptacle, a key controlled current supply switch, a main current supply switch, means to move said main current supply switch to closed circuit position, and means to release said switch to open circuit position, together with First Operation circuit connections including the key controlled current supply switch, the prepay counter switch means, the amount of purchase counter switch means, and the zero setting indicating means for both counters effective to cause said zero-setting indicating means to give an indication of zero setting of both counters when the key controlled current supply switch is in key-operated position and when both counters are at their zero-setting positions, together with Second Operation circuit connections including the key controlled current supply switch, the prepay counter switch means, the nozzle support actuated switch means and the coin chute gate holding means effective to retain the coin chute gate in position for delivery of coins to the receptacle when the key controlled current supply switch is in key-operated position and when the prepay counter is in its zero-setting position, and when the movable nozzle support is in nozzle supporting position, together with Third Operation circuit connections including the key controlled current supply switch, the means to move the main current supply switch to closed circuit position, the prepay counter switch means, the amount of purchase counter switch means, and the means to move the operator setter starting switch to closed circuit condition, effective to move the main current supply switch to closed circuit position when the key controlled current supply switch is in key operated position and when both counters are at their zero setting positions and when the operator setter starting switch is in closed circuit condition, together with Fourth Operation circuit connections including the key controlled current supply switch, the prepay counter switch means, the amount of purchase counter switch means, the selective coin release means, the main current supply switch, and the operator setter starting switch, effective to institute release of the coins from the receptacle selectively when the key controlled current supply switch is in key operated position, and when the main current supply switch is in closed circuit condition, and when both counters are at their zero positions, and when the operator setter starting switch is in closed circuit condition, together with Fifth Operation circuit connections including the key controlled current supply switch, the main current supply switch, the operator setter starting switch, and the selective coin release means, effective to actuate the signal means for indicating completion of release of the last coin from the receptacle, when the key controlled current supply switch is in key operated position, and when the main current supply switch is in closed circuit condition, and when the operator setter starting switch is in closed circuit condition, and when the last coin has been released from the receptacle, together with Sixth Operation circuit connections including the key controlled current supply switch, the main current supply switch, the operator setter starting switch, the means to set the prepay counter to successively higher digital reading values, and the means to release the nozzle support latch means, effective to actuate the nozzle support latch release means when the key controlled current supply switch is in key operated position, and when the main current supply switch is in closed circuit condition, and when the operator setter starting switch is in closed circuit condition, and when the means to set the prepay counter to higher digital reading values has functioned corresponding to release of the last coin from the receptacle, together with Seventh Operation circuit connections including the key controlled current supply switch, the main current supply switch, the operator setter starting switch, and the selective coin release means, effective to actuate the means to release the operator setter starting switch means to open circuit condition when the key controlled current supply switch is in key operated position, and when the main current supply switch is in closed circuit condition, and when the last coin has been released from the receptacle, together with Eighth Operation circuit connections including the key controlled current supply switch, the main current supply switch, the means to move the motor current supply switch to closed circuit position, the prepay counter switch means, the amount of purchase counter switch means, and the nozzle support actuated switch means, effective to move the motor current supply switch to closed circuit position when the key controlled current supply switch is in key operated position, and when the main current supply switch is in closed circuit condition, and when the prepay counter switch means is in the second defined switch position, and when the amount of purchase counter switch means is in the first defined switch position, and when the nozzle support actuated switch means is in the nozzle non-supported first defined switch position, together with Ninth Operation circuit connections including the key controlled current supply switch, the main current supply switch, and the prepay counter switch means, effective to energize the electrical means to open the second liquid delivery shut-off valve when the key controlled current supply switch is in key operated position, and when the main current supply switch is in closed circuit condition, and when the prepay counter switch means is in the second defined switch position, together with Tenth Operation circuit connections including the key controlled current supply switch, the main current supply switch, and the nozzle support actuated switch means, effective to release the motor current supply switch to open circuit position when the key controlled current supply switch is in key operated position, and when the main current supply switch is in closed circuit condition, and when the nozzle support actuated switch means is in the nozzle supported second defined switch position, together with Eleventh Operation circuit connections, including the key controlled current supply switch, the main current supply switch, the nozzle support actuated switch means, and the amount of purchase counter, effective to release the main current supply switch to open circuit position, when the key controlled current supply switch is in key operated position, and when the main current supply switch is in closed circuit condition, and when the amount of purchase counter switch means is in the second defined switch position, and when the nozzle support actuated switch means is in the nozzle supported second defined position.

34. Means as defined in claim 33, together with digital printing elements movable with respect to a printing location harmoniously with corresponding digital indicating elements of the prepay counter, impression producing means cooperative with the digital printing elements at said printing location, and means to actuate said impression producing means, together with Twelfth Operation circuit connections including the key controlled current supply switch, the main current supply switch, the prepay counter switch means, the nozzle support actuated switch means, and the impression producing means, effective to actuate said impression producing mean when the key controlled current supply switch is in key operated position, and when the main current supply switch is in closed circuit condition, and when the prepay counter switch means is in the first defined switch position, and when the nozzle support actuated switch means is in the second defined position.

35. Means as defined in claim 34, together with manually operative printing impulse delivering means, together with Thirteenth Operation circuit connections including the key controlled current supply switch, the main current supply switch, the impression producing means, and the manually operative impulse delivering means, effective to actuate said impression producing means when the key controlled current supply switch is in key operated position, and when the main current supply switch is in closed circuit condition, and when the manually operative impulse delivering means is in operated position.

36. Means as defined in claim 33, together with digital printing elements movable with respect to a printing location harmoniously with corresponding digital indicating elements of the prepay counter, impression producing means cooperative with the digital printing elements at said printing location, and means to actuate said impression producing means, together with Fourteenth Operation circuit connections, including the key controlled current supply switch, the main current supply switch, the amount of purchase counter switch means, the nozzle support actuated switch means, and the impression producing means, effective to actuate said impression producing means when the key controlled current supply switch is in key operated position, and when the main current supply switch is in closed circuit condition, and when the amount of purchase counter switch means is in the second defined position, and when the nozzle support actuated switch means is in the second defined position.

37. Means as defined in claim 36, together with manually operative printing impulse delivering means, together with Fifteenth Operation circuit connections including the key controlled current supply switch, the main current supply switch, the impression producing means, and the manually operative impulse producing means, effective to actuate said impression producing means when the key controlled current supply switch is in key operated position, and when the main current supply switch is in closed circuit condition, and when the manually operative impulse delivering means is in operated position.

38. A self-service pre-pay liquid delivery unit including in combination an electric motor driven liquid delivery pump, a liquid delivery nozzle, a liquid conduit extending from the pump to the nozzle, a liquid delivery control valve in said conduit between the pump and the nozzle, a liquid volume measuring meter in said conduit between the pump and the nozzle and including an element movable in amount proportional to the volume of liquid measured by said meter, a pre-pay counter including digital indicating elements to indicate the prepaid value of non-delivered liquid, pre-pay counter switch means, said switch means having a first position when the pre-pay counter digital indicating elements indicate zero and having a second position when said pre-pay counter digital elements indicate a value other than zero, means to pre-set the pre-pay counter to zero indicating position, an amount of purchase counter including digital indicating elements to indicate the value of delivered liquid, amount of purchase counter switch means, said switch means having a first position when the amount of purchase counter digital elements indicate zero and having a second position when said amount of purchase counter digital elements indicate a value other than zero, means to preset the amount of purchase counter to zero indicating position, driving connections from the movable element of the meter to the pre-pay counter and to the amount of purchase counter to move the digital elements of said counters by digital amounts proportional to the values of the volumes of liquid measured by the meter, said driving connections to the amount of purchase counter being constituted to move the digital indicating elements of said counter to higher readings for successive volumes of liquid metered, said driving connections to the pre-pay counter being constituted to move the digital indicating elements of said counter to lower readings for successive volumes of liquid metered, means to preset the pre-pay counter to a pre-selected pre-pay value, operator-setter starting button switch means, a main current supply switch, means to move said main current supply switch to closed circuit position, and circuit connections including the means to move the main current supply switch to closed circuit position, the pre-pay counter switch means, the amount of purchase counter switch means, and the operator-setter starting button switch means, effective to move the main current supply switch to closed circuit position when both counters are at their zero setting positions and when the operator-setter starting button switch means is in operator moved position, together with circuit connections for supply of current to the pump motor including the main current supply switch.

39. Means as defined in claim 38, together with means to release said main switch to open circuit position, a support for the liquid delivery nozzle, switch means in proximity to the nozzle support and including a first position and second position, said switch means and nozzle support being constituted for movement of the switch means to said first position when the nozzle is supported by the support and for movement of the switch means to said second position, when the nozzle is non-supported by the support, and circuit connections including the main switch, the means to release the main switch to open circuit position, the switch means which is in proximity to the nozzle support, and the pre-pay counter switch means, effective to release the main switch to open circuit position when the main current supply switch is closed, and when the switch means which is in proximity to the nozzle support is in said first defined position, and when the pre-pay counter switch means is in said first defined position.

40. Means as defined in claim 39, together with means to release said main switch to open circuit position, a support for the liquid delivery nozzle, switch means in proximity to the nozzle support and including a first position and a second position, said switch means and nozzle support being constituted for movement of the switch means to said first position when the nozzle is supported by the support and for movement of the switch means to said second position, when the nozzle is non-supported by the support, and circuit connections including the main switch, the means to release the main switch to open circuit position, the switch means which is in proximity to the nozzle support, and the amount of purchase counter switch means, effective to release the main switch to open circuit position when the main current supply switch is closed, and when the switch means which is in proximity to the nozzle support is in said first defined position, and when the amount of purchase counter switch means is in said second defined position.

41. Means as defined in claim 39, wherein the circuit connections which are effective to release the main switch to open circuit position, also include the amount of purchase counter switch means, and wherein said circuit connections are effective to release the main switch to open circuit position when the main current supply switch is closed, when the pre-pay counter switch is in said first defined position, and when the amount of purchase counter switch means is in said second defined position.

42. Means as defined in claim 38, together with zero setting indicating means to indicate zero setting of both the pre-pay counter and the amount of purchase counter, and wherein there are circuit connections including the main current supply switch, the pre-pay counter switch means, the amount of purchase counter switch means, and the zero setting indicating means, effective to actuate said zero setting indicating means to give an indication of zero setting when the main current supply switch is in closed circuit position, and when the pre-pay counter and the amount of purchase counter are both at their zero indicating positions.

43. A self-service pre-pay liquid delivery unit including in combination an electric motor driven liquid delivery pump, a liquid delivery nozzle, a liquid conduit extending from the pump to the nozzle, a liquid delivery control valve in said conduit between the pump and the nozzle, a liquid volume measuring meter in said conduit between the pump and the nozzle and including an element movable in amount proportional to the volume of liquid measured by said meter, a pre-pay counter including digital indicating elements to indicate the pre-paid value of non-delivered liquid, pre-pay counter switch means, said switch means having a first position when the pre-pay counter digital indicating elements indicate zero and having a second position when said pre-pay counter digital elements indicate a value other than zero, means to preset the pre-pay counter to zero indicating position, an amount of purchase counter including digital elements to indicate the value of delivered liquid, amount of purchase counter switch means, having a first position when the amount of purchase counter digital elements indicate zero and having a second position when said amount of purchase counter digital elements indicate a value other than zero, means to preset the amount of purchase counter to zero indicating position, driving connections from the movable element of the meter to the pre-pay counter and to the amount of purchase counter to move the digital elements of said counters by digital amounts proportional to the values of the volumes of liquid measured by the meter, said driving connections to the amount of purchase counter being constituted to move the digital indicating elements of said counter to higher readings for successive volumes of liquid metered, said driving connections to the pre-pay counter being constituted to move the digital indicating elements of said counter to lower readings for successive volumes of liquid metered, means to pre-set the pre-pay counter to a pre-selected pre-pay value, a support for the liquid delivery nozzle, switch means in proximity to the nozzle support and including a first position and a second position, said switch means and nozzle support being constituted for movement of the switch means to said first position when the nozzle is supported by the support and for movement of the switch means to said second position when the nozzle is non-supported by the support, a main current supply switch, a pump motor switch, means to move said pump motor switch to closed circuit position, means to release said pump motor switch to open circuit position, and circuit connections including the main current supply switch, the amount of purchase counter switch means, the pre-pay counter switch means, the nozzle support switch means, and the means to move the pump motor switch to closed circuit position, effective to move the pump motor switch to closed circuit position when the main current supply switch is in closed circuit position, and when the amount of purchase counter switch is in said first defined position, and when the pre-pay counter switch is in said second defined position, and when the delivery nozzle support switch means is in said second defined position.

44. Means as defined in claim 43, together with circuit connections including the main current supply switch, the nozzle support switch means, and the means to release said pump motor switch to open circuit position, effective to release said pump motor switch to open circuit condition when the main current supply switch is in closed circuit position, and when the nozzle support switch means is in said first defined position.

45. Means as defined in claim 43, together with circuit connections including the main current supply switch, the pre-pay counter switch means, the amount of purchase counter switch means, and the means to release said pump motor switch to open circuit position, effective to release the pump motor switch to open circuit condition when the main current supply switch is in closed circuit position, and when the pre-pay counter switch means is in said first defined position, and when the amount of purchase counter switch means is in said second defined position.

46. A self-service pre-pay liquid delivery unit including in combination an electric motor driven liquid delivery pump, a liquid delivery nozzle, a liquid conduit extending from the pump to the nozzle, a liquid delivery shut-off valve in said conduit between the pump and the nozzle, said valve being normally closed, electrical means to open said valve, said means being constituted to retain the valve in open position while said electrical means is energized, a liquid measuring meter in said conduit between the pump and the nozzle and including an element movable in amount proportional to the volume of liquid measured by the meter, a pre-pay counter including digital indicating elements to indicate the prepaid value of non-delivered liquid, pre-pay counter switch means, said switch means having a first position when the pre-pay counter digital indicating elements indicate zero and having a second position when said pre-pay counter digital elements indicate a value other than zero, means to preset the pre-pay counter to zero indicating position, driving connections from the movable element of the meter to the pre-pay counter to move the digital elements of said counter by digital amounts proportional to the values of the volumes of liquid measured by the meter, said driving connections being constituted to move the digital indicating elements of said counter to lower readings for successive volumes of liquid metered, a main current supply switch, means to pre-set the pre-pay counter to a pre-selected pre-pay value, and circuit connections including the main current supply switch, the electrical means to open said valve, and the pre-pay counter switch means, effective to move and retain said valve in the open conduit position when the main current supply switch is in closed circuit position, and when the pre-pay counter switch means is in said second defined position.

47. A self-service pre-pay liquid delivery unit including in combination an electric motor driven liquid delivery pump, a liquid delivery nozzle, a liquid conduit extending from the pump to the nozzle, a liquid delivery shut-off valve in said conduit between the pump and the nozzle, said valve being normally closed, electrical means to open said valve, said means being constituted to retain the valve in open position while said electrical means is energized, a liquid measuring meter in said conduit between the pump and the nozzle and including an element movable in amount proportional to the volume of liquid measured by the meter, a pre-pay counter including digital indicating elements to indicate the prepaid value of non-delivered liquid, pre-pay counter switch means, said switch means having a first position when the pre-pay counter digital indicating elements indicate zero and having a second position when said pre-pay counter digital elements indicate a value other than zero, means to preset the pre-pay counter to zero indicating position, driving connections from the movable element of the meter to the pre-pay counter to move the digital elements of said counter by digital amounts proportional to the values of the volumes of liquid measured by the meter, said driving connections being constituted to move the digital indicating elements of said counter to lower readings for successive volumes of liquid metered, an amount of purchase counter including digital elements to indicate the value of delivered liquid, amount of purchase counter switch means having a first position when the amount of purchase counter digital elements indicate zero and having a second position when said amount of purchase counter digital elements indicate a value other than zero, means to preset the amount of purchase counter to zero indicating position, driving connections from the movable element of the meter to the amount of purchase counter to move the digital elements of said counter by digital amounts proportional to the values of the volumes of liquid measured by the meter, said driving connections being constituted to move the digital indicating elements of said counter to higher readings for successive volumes of liquid metered, a support for the liquid delivered nozzle, switch means in proximity to the nozzle support and including a first position and a second position, said switch means and nozzle support being constituted for movement of the switch means to said first position when the nozzle is supported by the support and for movement of the switch means to said second position when the nozzle is non-supported by the support, a pump motor switch, means to move said pump motor switch to closed circuit position, a main current supply switch, means to preset the pre-pay counter to a pre-selected pre-pay value, and circuit connections including the main current supply switch, the electrical means to open said valve, and the pre-pay counter switch means, effective to move and retain said valve in the open conduit position when the main current supply switch is in closed circuit position, and when the pre-pay counter switch means is in said second defined position, and other circuit connections including the main current supply switch, the amount of purchase counter switch means, the nozzle support switch means, and the pre-pay counter switch means, effective to move the pump motor switch to closed circuit position when the main current supply switch is in closed circuit position, and when the amount of purchase counter switch means is in said first defined position, and when the nozzle support switch means is in said second defined position, and when the pre-pay counter switch means is in said second defined position.

48. Means as defined in claim 47, together with means to release the pump motor switch to open circuit position, and circuit connections including the main current supply switch, the means to release the pump motor switch to open circuit position, and the nozzle support switch means, effective to release the pump motor switch to open circuit position when the main current supply switch is in closed circuit position, and when the nozzle support switch means is in said first defined position.

49. Means as defined in claim 47, together with means to release the pump motor switch to open circuit position, and circuit connections including the main current supply switch, the means to release the pump motor switch to open circuit position, the pre-pay counter switch means, and the amount of purchase counter switch means, effective to release the pump motor switch to open circuit position when the main current supply switch is in closed circuit position, and when the pre-pay counter switch means is in said first defined position, and when the amount of purchase counter switch is in said second defined position.

50. Means as defined in claim 48, together with circuit connections including the main current supply switch, the means to release the pump motor switch to open circuit position, the pre-pay counter switch means, and the amount of purchase counter switch means, effective to release the pump motor switch to open circuit position when the main current supply switch is in closed circuit position, and when the pre-pay counter switch means is in said first defined position, and when the amount of purchase counter switch means is in said second defined position.

51. A self-service pre-pay liquid delivery unit including in combination an electric motor driven liquid delivery pump, a liquid delivery nozzle, a liquid conduit extending from the pump to the nozzle, a liquid measuring meter in said conduit between the pump and the nozzle and including an element movable in amount proportional to the volume of liquid measured by the meter, a pre-pay counter including digital indicating elements to indicate the prepaid value of non-delivered liquid, pre-pay counter switch means having a first position when the pre-pay counter digital indicating elements indicate zero and having a second position when said pre-pay counter digital elements indicate a value other than zero, means to preset the pre-pay counter to zero indicating position, driving connections from the movable element of the meter to the pre-pay counter to move the digital elements of said counter by digital amounts proportional to the values of the volumes of liquid measured by the meter, said driving connections being constituted to move the digital indicating elements of said counter to lower readings for successive volumes of liquid metered, an amount of purchase counter including digital elements to indicate the value of delivered liquid, amount of purchase counter switch means having a first position when the amount of purchase counter digital elements indicate zero and having a second position when said amount of purchase counter digital elements indicate a value other than zero, means to pre-set the amount of purchase counter to zero indicating position, driving connections from the movable element of the meter to the amount of purchase counter to move the digital elements of said counter by digital amounts proportional to the values of the volumes of liquid measured by the meter, said driving connections being constituted to move the digital indicating elements of said counter to higher readings for successive volumes of liquid metered, a movable support for the liquid delivery nozzle movable between a nozzle supported position and a nozzle non-supported position, movable latch means to latch the support in the nozzle supported position including means to normally move the latch means to latching position, electrical means to move said latch means to position to release the nozzle support for movement of the support to the nozzle non-supported position, a latch control switch, means to move said switch to closed circuit position, means to release said switch to open circuit position, switch means in connection with the nozzle support and including a first position and a second position, said switch means and nozzle support being constituted for movement of the switch means to said first position when the support is in the nozzle supported position, and for movement of the switch means to said second position when the support is in the nozzle non-supported position, a pump motor switch, means to move said switch to closed circuit position, means to release the pump motor switch to open circuit position, a main current supply switch, means to preset the pre-pay counter to a pre-selected prepay value, preset switch means in connection with said pre-pay counter presetting means, said preset switch means having a signal position when the pre-setting means has preset the pre-pay counter to the pre-selected pre-pay value, and circuit connections including the main current supply switch, the means to move the latch control switch to closed circuit position, and the pre-set switch means, effective to move the latch control switch to closed circuit position when the main current supply switch is in closed circuit position, and when the pre-set switch means is in said signal position, together with other circuit connections including the main current supply switch, the means to release the latch control switch to open circuit position, and the amount of purchase counter switch means, effective to release the latch control switch to open circuit position when the main current supply switch is in closed circuit position, and when the amount of purchase counter switch means is in said second defined position.

52. Means as defined in claim 51, wherein the latch means and the nozzle support include cooperating cam shaped parts of form permitting movement of the nozzle support to the nozzle supported position when the movable latch means is in latching position.

53. Means as defined in claim 51, together with circuit connections including the main current supply switch, the pump motor switch releasing means, and the nozzle support switch means, effective to release the pump motor switch to open circuit position when the main current supply switch is in closed circuit position, and when the nozzle support switch means is in the first defined position.

54. Means as defined in claim 53, wherein the latch means and the nozzle support include cooperating cam shaped parts of form permitting movement of the nozzle support to the nozzle supported position when the movable latch means is in latching position.

55. Means as defined in claim 51, together with circuit connections including the main current supply switch, the pump motor switch releasing means, the pre-pay counter switch means, and the amount of purchase counter switch means, effective to release the pump motor switch to open circuit position when the main current supply switch is in closed circuit position, and when the pre-pay counter switch means is in said first defined position, and when the amount of purchase counter switch means is in said second defined position.

56. Means as defined in claim 55, wherein the latch means and the nozzle support include cooperating cam shaped parts of form permitting movement of the nozzle support to the nozzle supported position when the movable latch means is in latching position.

57. A self-service pre-pay liquid delivery unit including in combination an electric motor driven liquid delivery pump, a liquid delivery nozzle, a liquid conduit extending from the pump to the nozzle, a liquid delivery control valve in said conduit between the pump and the nozzle, a liquid volume measuring meter in said conduit between the pump and the nozzle and including an element movable in amount proportional to the volume of liquid measured by said meter, a pre-pay counter including digital indicating elements to indicate the pre-paid value of non-delivered liquid, a pre-pay counter switch means, said switch means having a first position when the pre-pay counter digital indicating elements indicate zero and having a second position when said pre-pay counter digital elements indicate a value other than zero, means to preset the pre-pay counter to zero indicating position, an amount of purchase counter including digital elements to indicate the value of delivered liquid, amount of purchase counter switch means, having a first position when the amount of purchase counter digital elements indicate zero and having a second position when said amount of purchase counter digital elements indicate a value other than zero, means to preset the amount of purchase counter to zero indicating position, driving connections from the movable element of the meter to the pre-pay counter and to the amount of purchase counter to move the digital elements of said counters by digital amounts proportional to the values of the volumes of liquid measured by the meter, said driving connections to the amount of purchase counter being constituted to move the digital indicating elements of said counter to higher readings for successive volumes of liquid metered, said driving connections to the pre-pay counter being constituted to move the digital indicating elements of said counter to lower readings for successive volumes of liquid metered, means to pre-set the pre-pay counter to a pre-selected pre-pay value, a support for the liquid delivery nozzle, switch means in proximity to the nozzle support and including a first position and a second position, said switch means and nozzle support being constituted for movement of the switch means to said first position when the nozzle is supported by the support and for movement of the switch means to said second position when the nozzle is non-supported by the support, a main current supply switch, digital printing elements movable with respect to a printing location harmoniously with corresponding digital indicating elements of the pre-pay counter, impression producing means cooperative with the digital printing elements at said printing location, and means to actuate said impression producing means, together with circuit connections including the main current supply switch, the pre-pay counter switch means, the nozzle support switch means, and the impression producing means, effective to actuate the impression producing means to produce a printing impression when the main current supply switch is in closed circuit position, and when the pre-pay counter switch means is in said first defined position, and when the nozzle support switch means is in said first defined position.

58. Means as defined in claim 57, together with circuit connections including the main current supply switch, the amount of purchase counter switch means, the nozzle support switch means, and the impression producing means, effective to actuate the impression producing means to produce a printing impression when the main current supply switch is in closed circuit position, and when the amount of purchase counter switch means is in said second defined position, and when the nozzle support switch means is in said first defined position.

59. A self-service pre-pay liquid delivery unit including in combination an electric motor driven liquid delivery pump, a liquid delivery nozzle, a liquid conduit extending from the pump to the nozzle, a liquid delivery control valve in said conduit between the pump and the nozzle, a liquid volume measuring meter in said conduit between the pump and the nozzle and including an element movable in amount proportional to the volume of liquid measured by said meter, a pre-pay counter including digital indicating elements to indicate the pre-paid value of non-delivered liquid, a pre-pay counter switch means, said switch means having a first position when the pre-pay counter digital indicating elements indicate zero and having a second position when said pre-pay counter digital elements indicate a value other than zero, means to pre-set the pre-pay counter to zero indicating position, an amount of purchase counter including digital elements to indicate the value of delivered liquid, amount of purchase counter switch means, having a first position when the amount of purchase counter digital elements indicate zero and having a second position when said amount of purchase counter digital elements indicate a value other than zero, means to preset the amount of purchase counter to zero indicating position, driving connections from the movable element of the meter to the pre-pay counter and to the amount of purchase counter to move the digital elements of said counters by digital amounts proportional to the values of the volumes of liquid measured by the meter, said driving connections to the amount of purchase counter being constituted to move the digital indicating elements of said counter to higher readings for successive volumes of liquid metered, said driving connections to the pre-pay counter being constituted to move the digital indicating elements of said counter to lower readings for successive volumes of liquid metered, means to pre-set the pre-pay counter to a pre-selected pre-pay value, a support for the liquid delivery nozzle, switch means in proximity to the nozzle support and including a first position and a second position, said switch means and nozzle support being constituted for movement of the switch means to said first position when the nozzle is supported by the support and for movement of the switch means to said second position when the nozzle is non-supported by the support, a main current supply switch, digital printing elements movable with respect to a printing location harmoniously with corresponding digital indicating elements of the pre-pay counter, impression producing means cooperative with the digital printing elements at said printing location, and means to actuate said impression producing means, together with circuit connections including the main current supply switch, the amount of purchase counter switch means, the nozzle support switch means, and the impression producing means, effective to actuate the impression producing means to produce a printing impression when the main current supply switch is in closed circuit position, and when the amount of purchase counter switch means is in said second defined position, and when the nozzle support switch means is in said first defined position.

60. A self-service pre-pay liquid dispensing unit including in combination an electric motor driven pump, pump motor switch means, means to move said switch means to closed circuit position, means to release the pump motor switch means to open circuit position, a liquid delivery nozzle, a conduit extending from the pump to the nozzle, a liquid delivery control valve in said conduit, an amount of liquid meter in said conduit, said meter including an element movable proportionately to amounts of liquid measured by said meter, a pre-pay counter including digital indicating elements, an amount of purchase counter including digital indicating elements, means to preset said pre-pay counter to zero indicating position, means to preset said amount of purchase counter to zero indicating position, connections from the movable element of the meter to both counters to move said counters by digital amounts corresponding to the values of liquid metered by the meter, said connections to the amount of purchase counter acting to move the digital indicating elements of said counter to higher reading values for successive amounts of liquid metered, said connections to the pre-pay counter acting to move the digital indicating elements of said counter to lower reading values for successive amounts of liquid metered, a zero counter-setting indicating device, pre-pay counter pre-setting means effective to preset said pre-pay counter to higher digital indicating positions, a receptacle for pre-pay coins, a coin chute having a coin delivery connection to the coin receptacle and also having a customer's coin insert opening, a coin reject passage in connection with the coin chute at a location between the customer's coin insert opening and the coin receptacle, a movable gate in the coin chute at the location of the coin reject passage with the chute, said gate being movable to a first position or to a second position and constituted to deliver customer inserted coins to the reject passage when in the first position and to deliver customer inserted coins to the coin receptacle when in the second position, means to release the coins from the receptacle one at a time, means to start release of the coins from the receptacle, a customer starting button, means to actuate the pre-pay counter pre-setting means by digital amounts proportional to the denominational values of coins released by said releasing means, signal means to indicate completion of the releasing operation for the last coin released from the receptacle, a support for the nozzle, nozzle support switch means having a first position when the nozzle is supported by said support and having a second position when the nozzle is non-supported by the support, a key lock operated switch including key actuated means to move said switch to closed circuit position, together with means to actuate the means to preset the pre-pay counter to zero and means to actuate the means to preset the amount of purchase counter to zero, means to move the coin chute gate to the second defined position and to actuate the zero counter-setting indicating device to give a signal when both the pre-pay counter and the amount of purchase counter are at their zero indicating positions when the key-lock operated switch is in closed circuit position, means to normally retain the movable coin chute gate in the first defined position, a main current supply switch, means to move said switch to closed circuit position, means to release the switch to open circuit position, means in connection with the customer starting button to make effective the means to move the main current supply switch to closed circuit position and to make effective the means to release the coins from the receptacle one at a time and means to make effective the means to actuate the pre-pay counter pre-setting means to preset said counter when said customer starting button is actuated, means to make effective the signal means which indicates completion of the coin releasing operation to give a signal when the last coin has been released, means to make effective the means to move the pump motor switch to closed circuit position when the pre-pay counter is in said preset condition and when the nozzle support switch means is in said second defined position, to thereby deliver pressure liquid through the conduit for delivery from the nozzle when the control valve is open with meter operation during such delivery of liquid and movement of the pre-pay counter to lower digital indicating positions and movement of the amount of purchase counter to higher digital indicating positions, together with means to make effective the means to release the pump motor switch to open circuit position.

61. Means as defined in claim 60, wherein the means to release the pump motor switch to open circuit position includes the nozzle support switch means when said switch means is in said first defined position.

62. Means as defined in claim 60, wherein the means to release the pump motor switch to open circuit position includes means in connection with the pre-pay counter when said counter is in zero indicating position and also includes means in connection with said amount of purchase counter when said counter is in non-zero indicating position.

63. Means as defined in claim 60, together with movable latch means to latch the nozzle support in the nozzle supported position including means to normally move the latch means to latching position, means to move said latch means to position to release the nozzle support for movement of said support to nozzle non-supported position, means in connection with the pre-pay counter presetting means effective to give a signal when said presetting means has preset the pre-pay counter for the last coin released from the receptacle and means in connection with said last named signal means effective to make inoperative said latch means for release of the nozzle support when the pre-pay counter has been preset for said last released coin.

64. Means as defined in claim 63, wherein the latch means and the nozzle support include cooperating cam shaped parts of form permitting movement of the nozzle support to the nozzle supported position when the movable latch means is in latching position.

65. Means as defined in claim 64, together with means in connection with the amount of purchase counter to make ineffective said inoperative making means when the amount of purchase counter is in non-zero indicating position.

66. Means as defined in claim 60, together with means to make effective the means to release the main current supply switch to open circuit position when the nozzle support switch is in the first defined position.

67. Means as defined in claim 60, together with means in connection with the amount of purchase counter when said counter is in non-zero indicating position, and when the nozzle support switch is in said first defined position, effective to make effective the means to release the main current supply switch to open circuit position.

68. A self-service pre-pay liquid dispensing unit including in combination an electric motor driven pump, pump motor switch means, means to move said switch means to closed circuit position, means to release the pump motor switch means to open circuit position, a liquid delivery nozzle, a conduit extending from the pump to the nozzle, a liquid delivery control valve in said conduit, an amount of liquid meter in said conduit, said meter including an element movable proportionately to amounts of liquid measured by said meter, a pre-pay counter including digital indicating elements, an amount of purchase counter including digital indicating elements, means to preset said pre-pay counter to zero indicating position, means to preset said amount of purchase counter to zero indicating position, connections from the movable element of the meter to both counters to move said counters by digital amounts corresponding to the values of liquid metered by the meter, said connections to the amount of purchase counter acting to move the digital indicating elements of said counter to higher reading values for successive amounts of liquid metered, said connections to the pre-pay counter acting to move the digital indicating elements of said counter to lower reading values for successive amounts of liquid metered, a zero counter-setting indicating device, pre-pay counter presetting means effective to preset said prepay counter to higher digital indicating positions, a support for the nozzle, nozzle support switch means having a first position when the nozzle is supported by said support, and having a second position when the nozzle is non-supported by the support, means to actuate the means to preset the pre-pay counter to zero and means to actuate the means to preset the amount of purchase counter to zero, a main current supply switch, means to move said switch to closed circuit position, means to release the switch to open circuit position, a customer starting button, means in connection with the customer starting button to make effective the means to move the main current supply switch to closed circuit position, means to make effective the means to actuate the pre-pay counter presetting means to preset said counter when said customer starting button is actuated, means to make effective the means to move the pump motor switch to closed circuit position when the pre-pay counter is in said preset condition and when the nozzle support switch means is in said second defined position, to thereby deliver pressure liquid through the conduit for delivery from the nozzle when the control valve is open with meter operation during such delivery of liquid and movement of the pre-pay counter to lower digital indicating positions and movement of the amount of purchase counter to higher digital indicating positions, means to make effective the means to release the pump motor switch to open circuit position, digital printing elements movable with respect to a printing location harmoniously with corresponding digital indicating elements of the pre-pay counter, impression producing means cooperative with the digital printing elements at said printing location, and means to actuate said impression producing means, together with means to make effective said impression producing means when the main current supply switch is in closed circuit position, and when the nozzle support switch means is in said first defined position.

69. Means as defined in claim 68, wherein the means to make effective said impression producing means also includes means in connection with the amount of purchase counter when said counter is in the zero digital indicating element position.

70. Means as defined in claim 68, wherein the means to make effective said impression producing means also includes means in connection with the pre-pay counter when said counter is in non-zero digital indicating position.

References Cited in the file of this patent

UNITED STATES PATENTS

| | | |
|---|---|---|
| 2,138,287 | Willers | Nov. 29, 1938 |
| 2,180,821 | Ginnel | Nov. 21, 1939 |
| 2,223,146 | Yoemans | Nov. 26, 1940 |
| 2,250,326 | Carroll | July 22, 1941 |
| 2,333,665 | Mills | Nov. 9, 1943 |
| 2,384,585 | Alexander | Sept. 11, 1945 |
| 2,394,528 | Alexander | Feb. 12, 1946 |
| 2,527,677 | Hazard | Oct. 31, 1950 |
| 2,540,617 | Hazard | Feb. 6, 1951 |
| 2,573,112 | Schneckenburger | Oct. 30, 1951 |
| 2,612,428 | Vroom | Sept. 20, 1952 |